US011536241B2

(12) United States Patent
Qu

(10) Patent No.: US 11,536,241 B2
(45) Date of Patent: Dec. 27, 2022

(54) WAVE-ACTIVATED POWER GENERATOR PROVIDED WITH ROPE-CONTROL HYDRAULIC CYLINDER

(71) Applicant: Yanming Qu, Weihai (CN)

(72) Inventor: Yanming Qu, Weihai (CN)

( * ) Notice: Subject to any disclaimer, the term of this patent is extended or adjusted under 35 U.S.C. 154(b) by 56 days.

(21) Appl. No.: 16/479,399

(22) PCT Filed: Aug. 8, 2017

(86) PCT No.: PCT/CN2017/096511
§ 371 (c)(1),
(2) Date: Jul. 19, 2019

(87) PCT Pub. No.: WO2018/028584
PCT Pub. Date: Feb. 15, 2018

(65) Prior Publication Data
US 2019/0360452 A1 Nov. 28, 2019

(30) Foreign Application Priority Data

Aug. 8, 2016 (CN) .......................... 201610647137.5
Aug. 31, 2016 (CN) .......................... 201610781334.6
(Continued)

(51) Int. Cl.
*F03B 13/18* (2006.01)
(52) U.S. Cl.
CPC ................ *F03B 13/1885* (2013.01)
(58) Field of Classification Search
CPC ... F03B 13/1875; F03B 13/1885; Y02E 10/38
See application file for complete search history.

(56) References Cited

U.S. PATENT DOCUMENTS 1,292,223 A * 1/1919 Anell ................. F03B 13/1885
60/504
5,889,336 A * 3/1999 Tateishi .............. F03B 13/1865
290/53
(Continued)

FOREIGN PATENT DOCUMENTS

CN 103343726 * 10/2013 ............. Y02E 10/30
WO WO-2013053321 A * 4/2013 ............. B63B 21/50
(Continued)

*Primary Examiner* — Jesse S Bogue
(74) *Attorney, Agent, or Firm* — Novoclaims Patent Services LLC; Mei Lin Wong

(57) ABSTRACT

The wave generator for a rope-controlled hydraulic cylinder in the present invention includes a Wave Energy Harvest and Conversion system (WEHCS), a rope control device and a gravity anchor. The rope control device includes two members which are controllable in relative motion, i.e., frame and an elongated member. When the frame is located above the elongated member, the top end of the frame serves as a connection point with the WEHCS, and the bottom end of the elongated member serves as a collection point with the gravity anchor; however, when the frame is located below the elongated member, the frame serves as a connection point with the gravity anchor, and the top end of the elongated member serves as, a connection point with the WEHCS. The wave generator is applicable for large waves and adapted to tidal changes, as well as effective in rope-retrieving.

20 Claims, 9 Drawing Sheets

(30) Foreign Application Priority Data

Jan. 19, 2017 (CN) .......................... 201710043204.7
Feb. 16, 2017 (CN) .......................... 201710083607.4

(56) References Cited

U.S. PATENT DOCUMENTS

| | | | | |
|---|---|---|---|---|
| 7,845,880 B2* | 12/2010 | Rasmussen | ......... | F03B 13/1885 405/76 |
| 8,004,103 B2* | 8/2011 | Brantingham | ...... | F03B 13/1845 290/53 |
| 8,310,077 B2* | 11/2012 | Pearce | .................. | F03B 13/264 290/54 |
| 8,581,433 B2* | 11/2013 | Sidenmark | .......... | F03B 13/1815 290/53 |
| 9,016,055 B2* | 4/2015 | Dragic | ................ | F03B 13/1875 60/507 |
| 9,181,932 B2* | 11/2015 | Edwards | ................... | F03G 7/05 |
| 10,174,740 B2* | 1/2019 | Kimura | ............... | F03B 13/1845 |
| 2006/0218917 A1* | 10/2006 | Abou-Raphael | ........ | F03B 13/14 60/495 |
| 2011/0084488 A1* | 4/2011 | Eder | ...................... | F03B 13/186 290/53 |
| 2013/0200626 A1* | 8/2013 | Sidenmark | ................ | F16H 1/46 290/53 |
| 2014/0117671 A1* | 5/2014 | Gregory | .................. | F03B 13/22 290/53 |
| 2015/0266549 A1* | 9/2015 | Qu | .......................... | B63B 21/50 248/550 |
| 2016/0265506 A1* | 9/2016 | Kimura | ............... | F03B 13/1845 |
| 2018/0100481 A1* | 4/2018 | Ohlsson | ............. | F03B 13/1885 |
| 2018/0363621 A1* | 12/2018 | Alm | ..................... | F03B 13/142 |

FOREIGN PATENT DOCUMENTS

| | | | | |
|---|---|---|---|---|
| WO | WO-2013174220 A1 | * | 11/2013 | ......... F03B 13/1885 |
| WO | WO-2017025012 A1 | * | 2/2017 | |
| WO | WO-2021203224 A1 | * | 10/2021 | |

* cited by examiner

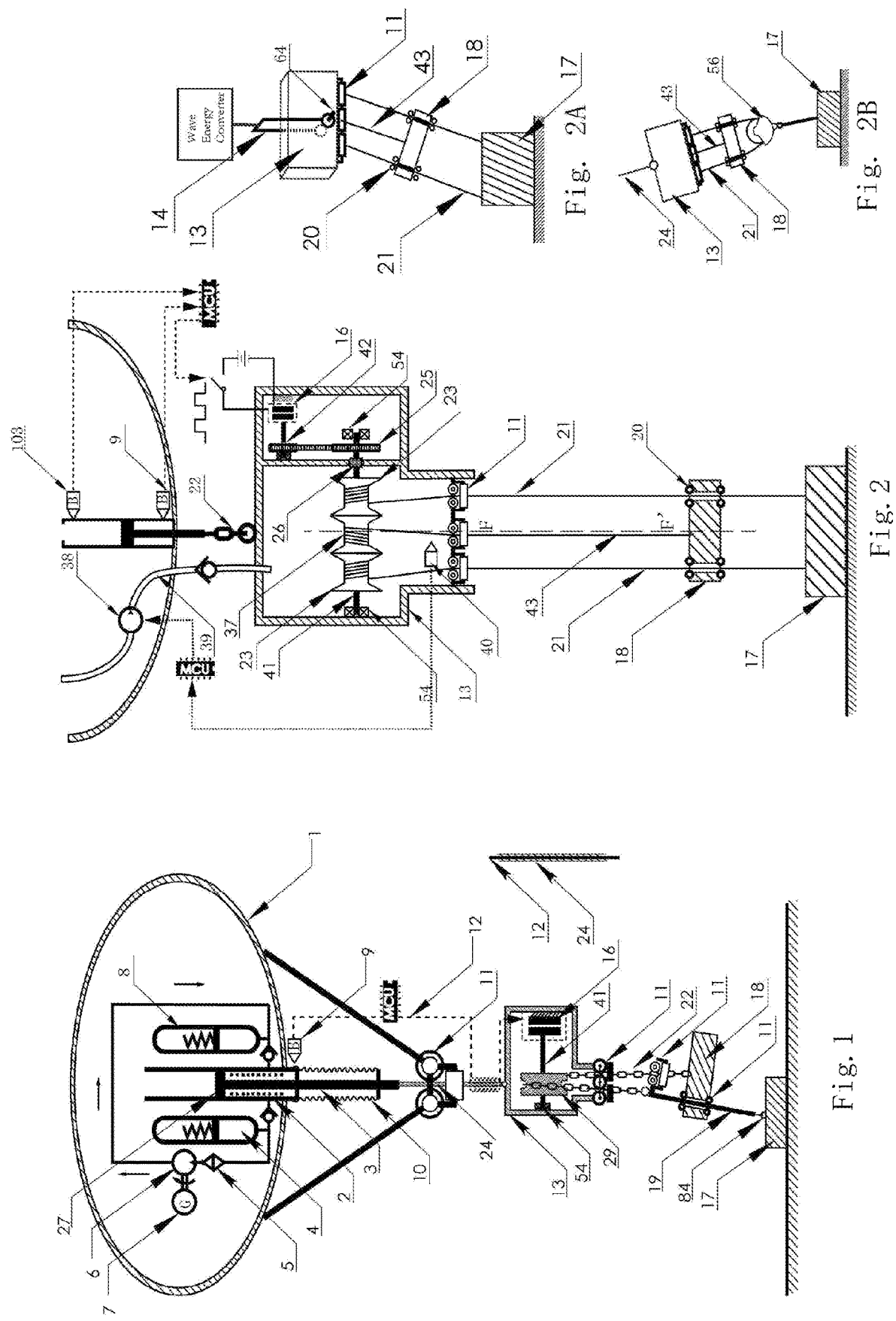

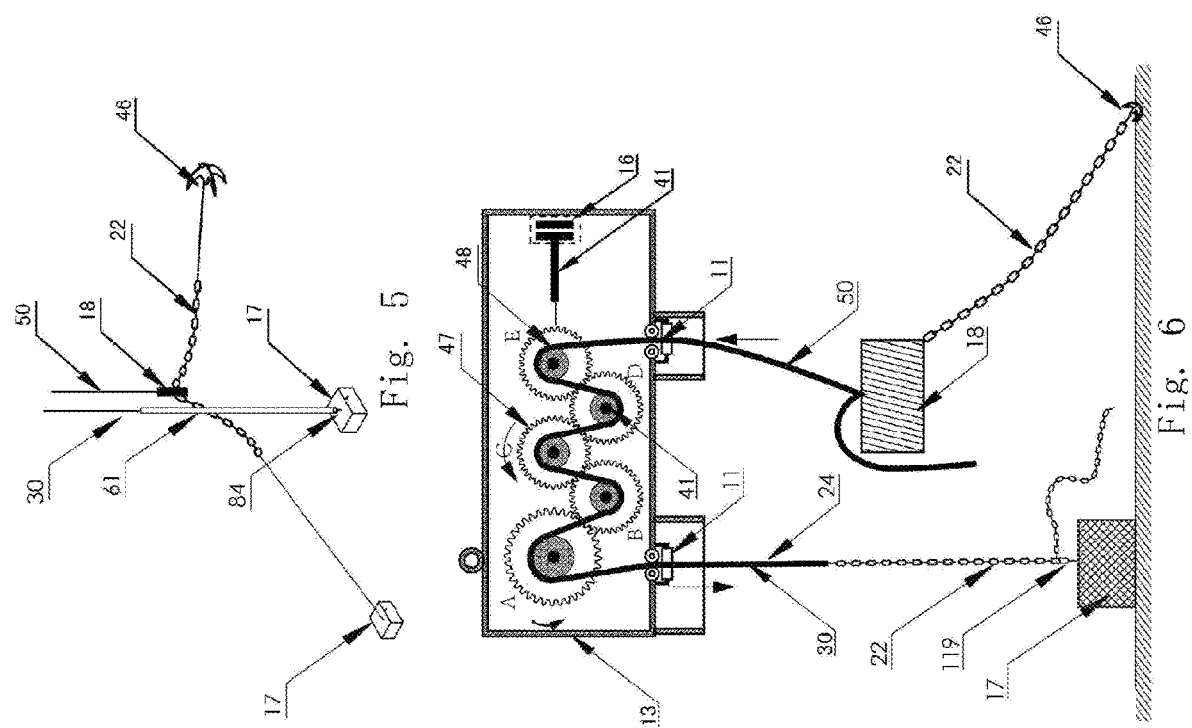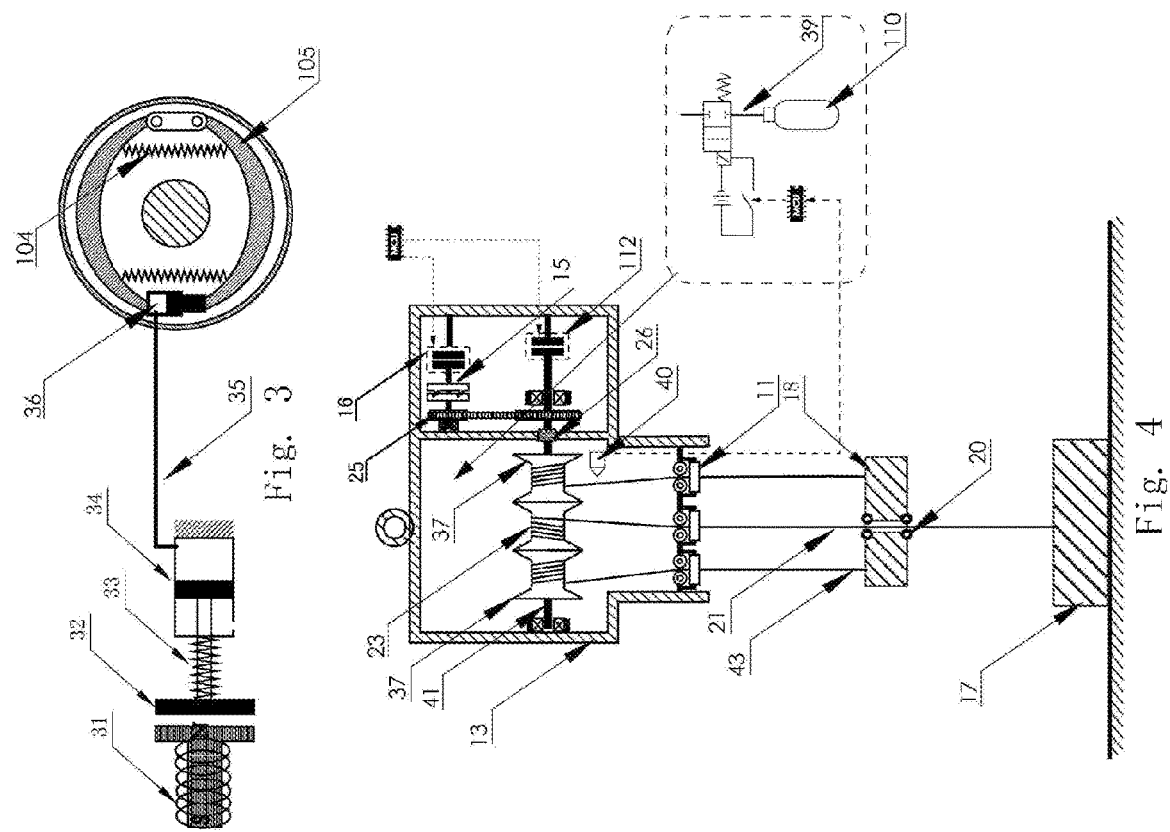

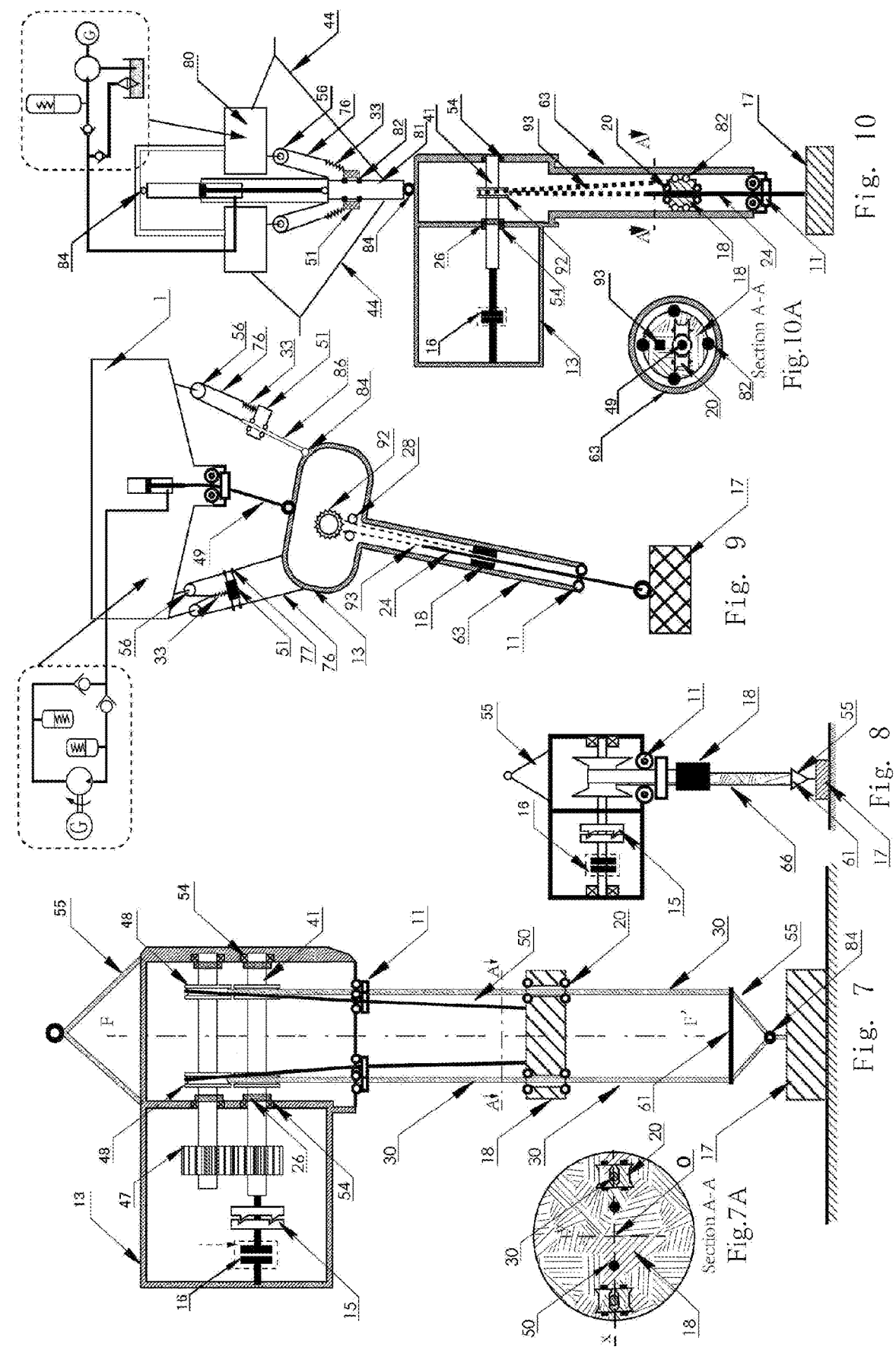

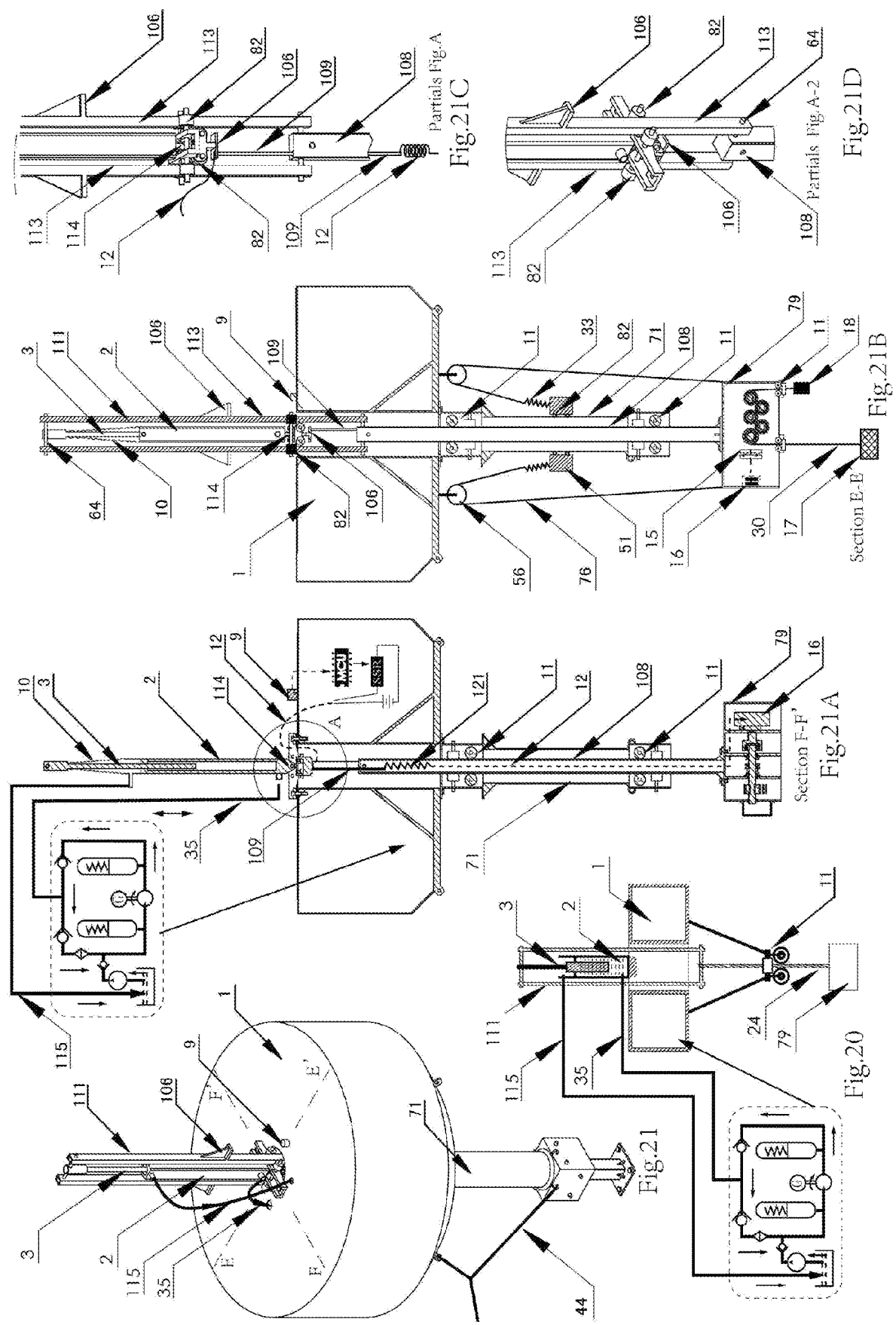

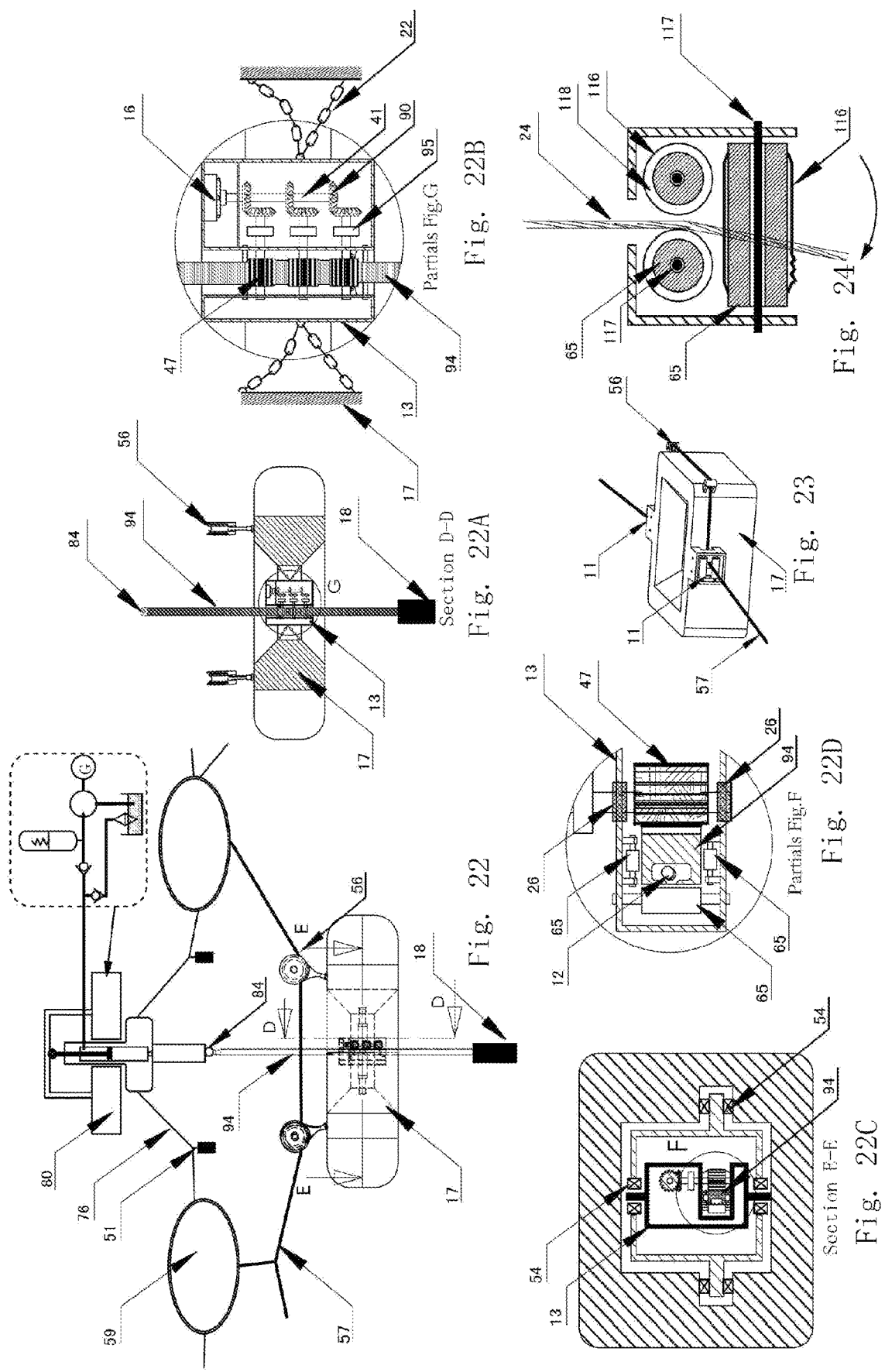

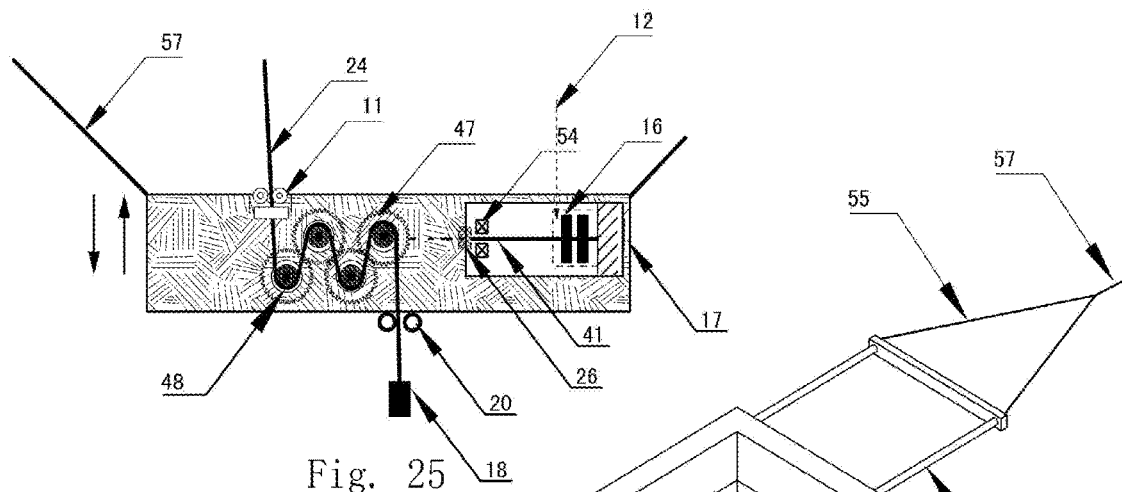
Fig. 25
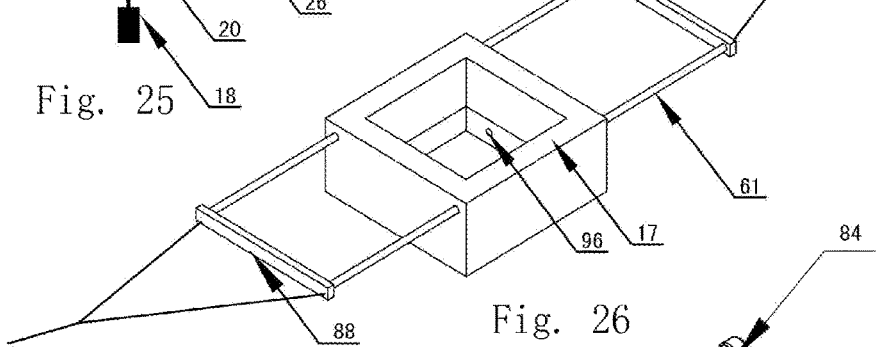
Fig. 26
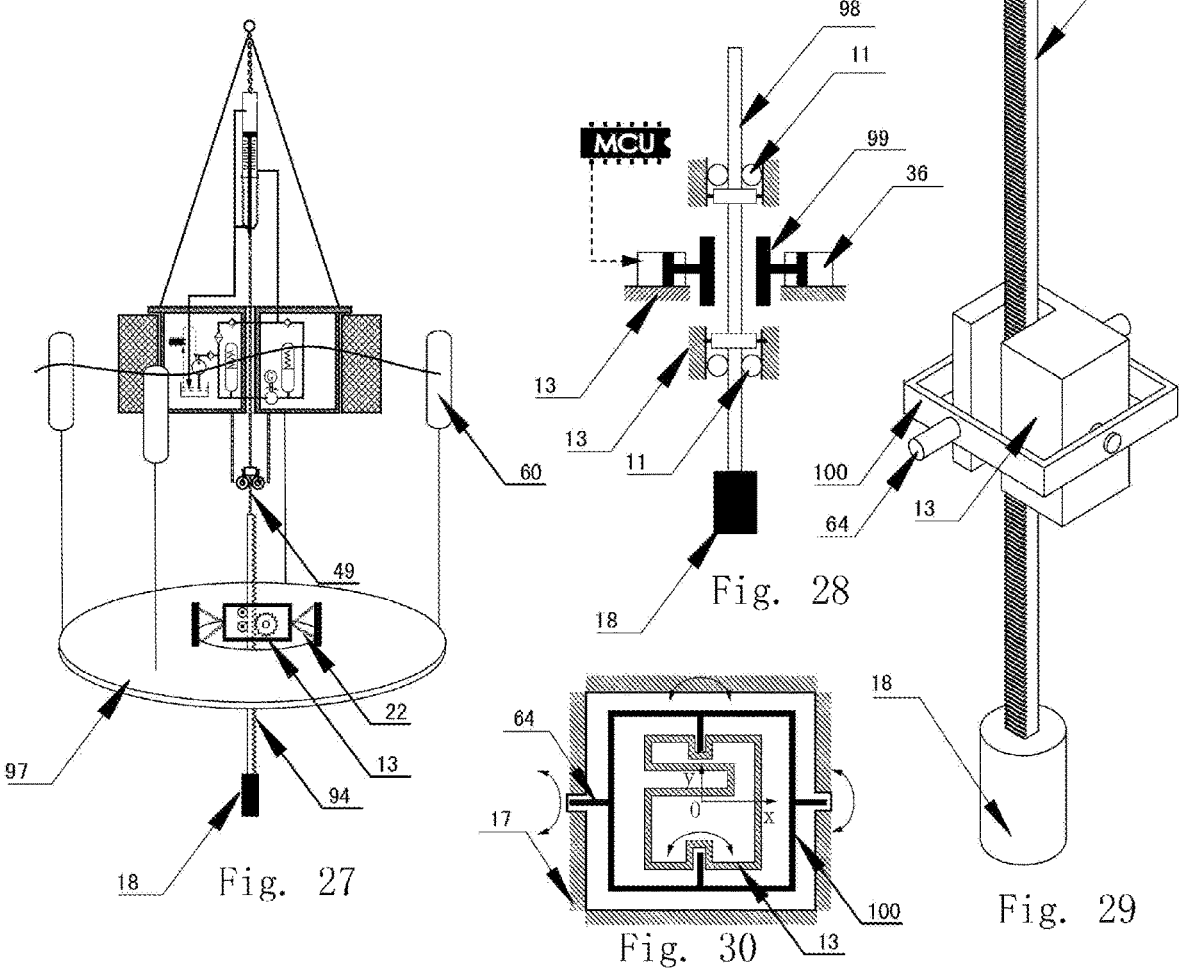
Fig. 27
Fig. 28
Fig. 29
Fig. 30

US 11,536,241 B2

WAVE-ACTIVATED POWER GENERATOR PROVIDED WITH ROPE-CONTROL HYDRAULIC CYLINDER

The present application is based on, and claims priority from, Chinese application number 2017100432047, filed on 19, January 2017, Chinese application number 2017100836074, filed on 16, February 2017, the disclosure of which is hereby incorporated by reference herein in its entirety.

FIELD

The present disclosure relates to the field of wave power generation, and more particularly relates to a wave power generation system.

BACKGROUND

CN 103104408 A is the prior art closest to the present disclosure.

SUMMARY

Technicians in the field after reading this specification, may understand more about the other benefits or other purposes of the invention described in the claims.

The technical proposal of the present disclosure:

Section I: A rope-controlled hydraulic cylinder wave generator includes a Wave Energy Collection & Conversion System (hereinafter referred to as WEC), a rope control device, and a gravity anchor. The WEC is located on the water surface, and the rope control device includes two members with controllable relative movement, which are a frame and an elongated member, respectively. When the frame is located above the elongated member, the top end of the frame serves as a connection point with the WEC, and the bottom end of the elongated member serves as a connection point with the gravity anchor; however, when the frame is located below the elongated member, the bottom end of the frame serves as a connection point with the gravity anchor, and the top end of the elongated member serves as a connection point with the WEC. It should be noted that the WEC and the gravity anchor may work together independently without the rope control device (only the effect may be relatively poor), so the rope control device is not necessary. The bottom end of the member on the WEC configured to connect the rope control mechanism in the present disclosure may also be directly connected to the gravity anchor (movable connection). There are two types of the WEC: a single floating body pressure difference reset type and a double floating body gravity reset type.

Section II:

As a single floating body pressure difference reset type, the WEC may be classified as type A and B. The type A with a piston cylinder includes a floating body and a hydraulic system. The structure of the floating body may be understood as: an enclosed hollow housing, and a straight tube vertically extends through in the center of the housing, then the portions of the housing inside the straight tube are removed to form a fully-enclosed housing with a through hole in the center.

A fairlead/double roller chock is installed at a lower opening of the through hole of the floating body. Three legs of a tripod are fixed on the top surface of the floating body. The top end of the tripod is directly over the through hole, and connected to the top end of a single-acting piston cylinder body. A rope connected to the bottom end of the piston rod of the single-acting piston cylinder, successively passes through the center hole of the floating body and the fairlead/double-roller chock installed on the bottom surface of the floating body, and is finally connected to the rope control device. The hydraulic tube connected to the piston cylinder extends into the chamber of the floating body through the top cover of the floating body, the generator and the hydraulic system excluding the single-acting piston cylinder are all inside the chamber of the floating body. The hydraulic system is a closed circulation in a route of: a rod chamber of the single-acting piston cylinder, a exit-only valve, a high-pressure accumulator, a hydraulic motor, a low-pressure accumulator, an enter-only valve, and the rod chamber of the piston cylinder. The hydraulic motor drives the generator to generate electricity. The above is the scheme 2-1.

According to the scheme 2-1, a preferred scheme 2-1-1 is provided. A telescopic tube is sleeved on the piston rod of the hydraulic cylinder, and one end of the telescopic tube is in sealed connection with the side of the piston rod handle, and the other end is connected with the side of the piston cylinder body, while there should be a gap on the top of the telescopic tube to communicate with the outside. One branch of an oil drain tube of the piston cylinder starts from the top of the non-rod chamber of the piston cylinder, and the other branch starts from the bottom of the cavity of the telescopic tube. The two branches are combined together and extend downward into the floating body chamber through the top cover of the floating body, and finally enter the open oil tank. More preferably, hydraulic oil is extracted from the open oil tank and injected into the closed hydraulic circulation system by an electrically charge pump, which is driven by the electricity generated by the wave generator in the present disclosure. More preferably, the electrically charge pump is under start-stop control and rotational speed control by a Microcontroller Unit (MCU), according to a liquid level sensor of the open oil tank/pressure transducer of the closed hydraulic system.

According to the scheme 2-1, a preferred scheme 2-1-2 is provided. The aforementioned floating body acts as an equipment chamber, and an extra annular floating body is added acting as a buoyancy chamber, and the inner hole axis is vertical. Following are two connection types to connect the buoyancy chamber and the equipment chamber.

One type is an embedded connection, namely, the inner hole of the buoyancy chamber is slightly larger than an outer profile of the equipment chamber, and the equipment chamber is embedded in the inner hole of the buoyancy chamber. The buoyancy chamber and the equipment chamber may be bolted together. Alternatively, a limit flange is defined on an outer edge of the top cover of the equipment chamber or the bottom of the inner hole of the buoyancy chamber. Alternatively, the surface of the inner hole of the buoyancy chamber, or the outer side of the equipment chamber is a tapered surface with a wider top and a narrower bottom, and the widest part of the outer profile of the equipment chamber is larger than the narrowest part of the inner hole of the buoyancy chamber, so that the equipment chamber may be wedged into the inner hole of the buoyancy chamber.

The other type is an overlap connection, namely, the inner hole of the buoyancy chamber is smaller than the outer profile of the equipment chamber. The bottom surface of the equipment chamber is fixed onto the top surface of the buoyancy chamber. In addition, the fairlead/double-roller chock is modified to be installed at the outlet below the inner hole of the buoyancy chamber. The rope at the bottom end of the piston rod of the single-acting piston cylinder successively passes through the center hole of the equipment chamber, the inner hole of the buoyancy chamber, and the fairlead/double-roller chock installed at the bottom end of the buoyancy chamber to connect the rope control mechanism.

Specifically, the single floating body pressure difference reset type B is: a floating body, of which the structure may be understood as: an enclosed housing, and a vertical straight tube extends through in the center, then the housing portions inside the straight tube are removed to form a fully-enclosed housing with a through hole in the center. A plunger rod vertically stands on a plunger cylinder body, and the bottom end of the plunger cylinder body is fixed at the hole on the top surface of the floating body, and the top end of the plunger rod is connected to the center of the top border of a rectangular steel frame, and a plane where the rectangular steel frame located coincides with an axial section of the plunger cylinder. When the plunger rod is telescopically moved, the plunger cylinder and the plunger rod thereof are always surrounded by four sides of the rectangular steel frame, and the two vertical borders and the bottom border of the rectangular steel frame are not in contact with the top surface and the inner wall of the central hole of the floating body (alternatively, the center hole of the floating body is larger than the width of the rectangular steel frame, and the rectangular steel frame is inserted in the center of the floating body hole. Alternatively: the rectangular steel frame is always above the floating body). The center of the bottom border of the rectangular steel frame is connected with the top end of a rope, and the other end of the rope successively passes through the vertical central hole of the floating body and a fairlead installed at the bottom of the central hole of the floating body, then extends downward to connect the rope control mechanism.

The bottom end of the plunger cylinder body and the position of the hole on the top surface of the floating body, as well as the top end of the plunger rod and the top border of the rectangular steel frame may also be connected by lugs/hinges/earrings. If the plunger cylinder is unconstrained in a certain direction, a guiding roller set shall be needed. The bracket of the guiding roller set is installed on the top surface of the floating body. The guiding roller set is two identical cylindrical rollers separated by a certain distance, of which two axes are horizontal and parallel to each other, and end faces are aligned. The axes of the two cylindrical rollers are perpendicular to the direction of the unconstrained degree of freedom. The two cylindrical rollers respectively abut the two sides of outside/inside of the two vertical borders of the rectangular steel frame, or both sides of one of the vertical border. The hydraulic system is a closed circulation in a route of: the chamber of the plunger cylinder, a exit-only valve, a high pressure accumulator, a hydraulic motor, a low-pressure accumulator, an enter-only valve, to the chamber of the plunger cylinder. The hydraulic motor drives the generator to generate electricity. A hydraulic tube connected to inlet outlet oil ports at the bottom end of the plunger cylinder extends into the chamber of the floating body through the top cover of the floating body. The generator and the hydraulic system excluding the plunger cylinder are all inside the chamber of the floating body.

The above is the scheme 2-2. According to the scheme 2-2, a preferred scheme 2-2-1 is provided. The top of the plunger cylinder body is fixedly connected with a bottom end of a vertical short tube bottom with the seam being sealed, and the plunger rod passes through the short tube. There is a hole on the side of the short tube, and the hole is butt-jointed with an end of an oil drain tube. The other end of the oil drain tube extends downward and extends into the chamber of the floating body through the top cover of the floating body, and finally enters an open oil tank. More preferably, hydraulic oil is extracted from the open oil tank and injected into the closed hydraulic circulation system by an electric charge pump, which is driven by the electricity generated by the wave generator in the present disclosure. More preferably, the start-stop/rotational speed of the electric charge pump is under control by an MCU, according to a liquid level sensor of the open oil tank.

The rope and the fairlead through which the rope passes in the aforementioned schemes 2-1 and 2-2, may be replaced by a square tube and two fairleads, leaving the others being unchanged, therefore a scheme 2-3 is obtained: according to the single floating body pressure difference reset type A, the bottom end of the piston rod extending below the single rod piston cylinder is modified to be connected with the top end of a vertical square tube; the square tube passes through two fairleads, which are spaced apart from each other with a certain vertical distance and installed at the bottom of the floating body, and the bottom end of the square tube is fixedly connected with the top surface of the rope control mechanism: four rollers of the fairleads abut four sides of the square tube one by one. The scheme 2-3 may also be applied to the Chinese Patent Application CN 103104408 A, the square tube and the two fairleads replace rope 31 and fairlead 19 therein, in which the bottom end of the piston rod of the hydraulic cylinder is connected with the top end of the square tube, and the square tube passes through two fairleads, which are spaced apart from each other at a certain vertical distance and installed at the bottom of the floating body, then the bottom end of the square tube is connected to a rope control mechanism (the rope control mechanism may adopt various types in the present disclosure).

According to the single floating body pressure difference reset type B, the midpoint of the bottom border of the rectangular steel frame is modified to be connected to a vertical square tube. The vertical square tube passes through two fairleads, which are spaced apart from each other at a certain vertical distance and installed at the bottom of the floating body, and the bottom end of the square tube is fixedly connected with the top surface of the rope control mechanism. Four rollers of the fairleads abut the four sides of the square tube one by one.

According to the scheme 2-3, a preferred scheme 2-3-1 is provided. A electric cable connecting the rope control mechanism enters the square tube from the top inlet of the square tube, and comes out from the bottom outlet of the square tube. More preferably, one of the segments of the electric cable in the square tube is a spiral spring cable.

According to the scheme 2-3, a preferred scheme 2-3-2 is provided. According to the single floating body pressure difference reset type A or type B, the top end of a vertical tube is fixed to the bottom of the floating body, and the axis of the vertical tube coincides with the central axis of the central through hole of the floating body, and the upper and lower two hair-leads are respectively installed at the top and bottom inside the vertical tube.

Section III: The WEC is a double floating body gravity reset type, which may be classified as type A and B. The double floating body gravity reset type A includes a column ensemble, an annular floating body, a H-shaped bracket/three-leg bracket, and a hydraulic system. Following are four types of the column ensemble:

1) a hollow column placed vertically, with a cylinder or a polygonal cylinder shape, of which the top end is opened and the bottom end is closed. 2) an ensemble formed after the bottom surface of the hollow column being fixedly connected with the top surface of an underwater buoyancy chamber, and the underwater buoyancy chamber is a hollow housing or foamed plastic with a cylindrical shape (vertical axis) or an ellipsoidal shape. 3) an ensemble formed after the bottom surface of the column being fixedly connected with the top surface of a vertical rod/vertical tube. 4) an ensemble formed after the bottom surface of the column being fixedly connected with the top surface of the underwater buoyancy chamber, and the bottom surface of the underwater buoyancy chamber being fixedly connected with the top surface of the vertical rod/vertical tube.

The weight of the water discharged when the column ensemble is vertically inserted in the water is greater than its own weight of the column ensemble, namely, the column ensemble has a floating force. According to the column ensemble, preferably, central lines of the column, the underwater buoyancy chamber, and the vertical rod/vertical tube in the vertical direction coincide with each other.

The annular floating body is sleeved on the column, and a certain gap exists between the inner wall of the annular floating body and the side of the column. A vertical H-shaped bracket/three-leg bracket is fixed on the top surface of the annular floating body, and the central line of the H-shaped bracket/three-leg bracket coincides with the axis of the column. The piston rod handle of a vertical single-acting hydraulic cylinder is connected to the center of the bottom surface of the beam of the H-shaped bracket/three-leg bracket beam, and the bottom end of the hydraulic cylinder body is connected with the inner bottom surface of the cavity of the column. The hydraulic system is an open circulation in a route of: an open oil tank, an enter-only valve, the rod chamber of the single-acting piston cylinder, a exit-only valve, an accumulator, to a hydraulic motor. The hydraulic motor drives the generator to generate electricity. The above is the scheme 3-1.

Specifically, the double floating body gravity reset type B WEC is a vertically placed column ensemble, the top end of which is opened and the bottom end is closed. An annular floating body is sleeved on the column, and a certain gap exists between the inner wall of the annular floating body and the side of the column. A vertical H-shaped bracket/three-leg bracket is fixed on the top surface of the annular floating body, and the central line of the H-shaped bracket/three-leg bracket coincides with the axis of the column. The piston rod handle of a vertical single-acting hydraulic cylinder is connected to the center of the bottom surface of the beam of the H-shaped bracket/three-leg bracket, and the bottom end of the hydraulic cylinder body is connected with the inner bottom surface of the cavity of the column. The circulation in the hydraulic system is: an open oil tank, an enter-only valve, the rod chamber of the single-acting piston cylinder, a exit-only valve, an accumulator, a hydraulic motor, to the open oil tank. The hydraulic motor drives the generator to generate electricity. The column ensemble does not have to be floating, and the bottom end of the column ensemble is lower than the bottom surface of the annular floating body. The bracket of a pulley is connected with the bottom surface of the annular floating body. One end of a rope is connected to a weight, and the other end extends upward to pass around the pulley, and then extends downward to be tied to the column ensemble. the above is the scheme 3-2.

According to the scheme 3-2, preferably, the weight in an annular shape is sleeved on the lower part of the column ensemble, and a gap exists between the inner side of the weight and the side of the column ensemble. Ends of two ropes are tied with the weight, the other ends of the two ropes extend upward to pass around a pulley above them, and then extend downward to be tied to the column ensemble. The brackets of the two pulleys are connected to the bottom surface of the annular floating body, and the two connection points are symmetrical with respect to the axis of the column. More preferably, upper and lower layers of guiding roller groups are installed inside the weight, and at least three guiding rollers are evenly distributed on each layer.

Section IV: The WEC further includes a spring oscillator mechanism. Specifically, according to the single floating body pressure difference reset type WEC, one end of a rope is connected to a connection point of the rope control mechanism, and the other end of the rope extends upward to pass around a pulley and then extends downward to be tied to one end of a extension spring, and the other end of the extension spring is connected with a weight, and a pulley bracket of the pulley is connected with a bottom surface of the floating body. The above is the scheme 4-1. According to the single floating body pressure difference reset type WEC with a rope and a single fairlead, a preferred scheme 4-1-1 is provided: the bottom of the floating body is fixedly connected with a top end of a vertical tube, and the fairlead/double-roller chock is installed at an outlet of a bottom end of the vertical tube. The pulley is installed at an opening in the upper portion of the vertical tube, and an axis of the pulley is perpendicular to a shaft section of the vertical tube where the hole is located, and one half of the pulley is exposed outside the vertical tube and another half is inside the vertical tube. An annular weight is sleeved on the vertical tube, and a gap exists between an inner side of the weight and an outer wall of the vertical tube. One end of the extension spring is connected to the weight, and the other end of the extension spring is connected to a rope. The other end of the rope extends upward to pass around the pulley installed at the opening, and extends downward to pass through the vertical tube and another fairlead at the bottom end of the vertical tube, and then be connected to a connection point of the rope control mechanism. According to the single floating body pressure difference reset type WEC with a square tube and two fairleads, a preferred scheme 4-1-2 is provided, namely: a top end of a vertical tube top is fixed to the bottom of the floating body, and an axis of the vertical tube coincides with the central axis of the central through hole of the floating body, and the upper and lower two fairleads are respectively installed at a top and a bottom inside the vertical tube. The weight in an annular shape is sleeved on the vertical tube, and a gap exists between the inner side of the weight and the vertical tube. One end of a rope is connected to a connection point of the rope control mechanism, and the other end of the rope extends upward to pass around a pulley and then extends downward to be tied to one end of a extension spring, and the other end of the extension spring is connected with a weight, and a pulley bracket of the pulley is connected with a bottom surface of the floating body.

According to the double floating body gravity reset type WEC, a scheme 4-2 is provided, specifically: one end of an extension spring is connected with a weight, and the other end of the extension spring is connected with one end of a rope. The other end of the rope extends upward to pass around a pulley, and then extends downward to be tied to the column ensemble. A pulley bracket of the pulley is connected with the bottom surface of the annular floating body. Preferably, the weight in an annular shape is sleeved on the lower part of the column ensemble, and a gap exists between the inner side of the weight and the side of the column ensemble. More preferably, upper and lower layers of guiding roller groups are installed inside the weight, and at least three guiding rollers are evenly distributed on each layer.

Section V: This section describes a floating-body-based rope control device. The rope control device includes a rope-control electrical module and a rope control mechanical mechanism (referred to as a rope control mechanism). The rope control mechanism includes a frame, a linear-rotary motion conversion mechanism and an auxiliary mechanism thereof, and an electric brake, and the top end of the frame of the rope control mechanism is connected with the WEC located above. The rotating member of the linear-rotary motion conversion mechanism is coupled to a rotor of the electric brake by a main shaft, and may also be linked with the rotor of the electric brake through a chain/gear/belt transmission mechanism. A stator of the electric brake is fixed on the frame, and the main shaft of the rotating member of the linear-rotary motion conversion mechanism is installed on the frame through the bearing & housing. The linear-rotary motion conversion mechanism and the auxiliary mechanism thereof may be classified to the following three types:

Type 1: the linear-rotary motion conversion mechanism is a roller sprocket+a roller chain. A vertical cylinder is fixed at a bottom end of the frame of the rope control mechanism, and a counterweight is inside the vertical cylinder and has a certain gap with an inner wall of the vertical cylinder. One end of the roller chain is connected to the counterweight, and the other end of the roller chain extends upward to pass around the roller sprocket, then extends downward and enters into the vertical cylinder to be connected to one end of a rope, and the other end of the rope extends downward, to successively pass through the vertical through hole on the counterweight and a fairlead/double-roller chock installed at an inlet of the bottom end of the vertical cylinder, and is finally tied to the gravity anchor.

Type 2: the linear-rotary motion conversion mechanism is a round link sprocket+a welded chain, or a friction wheel and a rope. One end of the welded chain is connected to the gravity anchor, and the other end extends upward to passed through a fairlead/double-roller chock installed at the bottom end of the frame of the rope control mechanism, then passes around a round link sprocket, and extends downward to pass through another fairlead/double-roller chock installed at the bottom end of the frame, and continues to extend downward to be finally connected to a counterweight that acts as a rope-retrieving member. The round link sprocket and the welded chain may also be replaced by a friction wheel and a rope. One end of the rope is connected to the gravity anchor, and the other end extends upward to pass through a fairlead/double-roller chock installed at the bottom end of the frame, then passes around a friction wheel, and extends downward to pass through another fairlead/double-roller chock installed at the bottom end of the frame, and continues to extend downward to be finally connected to a counterweight.

Type 3: the linear-rotary motion conversion mechanism is main & secondary drum+main & secondary rope, specifically: a main drum and a secondary drum are coupled through a main shaft or linked through a gear/chain transmission mechanism. One end of the main rope is fixed and wound on the main drum, and the other end of the main rope extends downward to pass through a fairlead/double-roller chock installed at the bottom end of the frame of the rope control mechanism, and continues to extend downward to be finally connected to the gravity anchor. One end of the secondary rope is fixed and wound on the secondary drum, and the other end of the secondary rope extends downward and passes through another fairlead/double-roller chock installed at the bottom end of the frame of the rope control mechanism to be connected to a counterweight. The counterweight acts as a rope-retrieving member, and the torques of pulling forces of the main rope and the secondary rope generated on the main shaft are opposite. The rope-retrieving member may also be replaced with an extension spring, and the other end of the extension spring is fixed on the frame, and the fairlead through which the secondary rope passes may be omitted.

The rope/welded chain/main rope between the aforementioned rotating member (namely the sprocket/round link sprocket/friction wheel/main drum) of the linear-rotary motion conversion mechanism and the gravity anchor of the rope-controlled hydraulic cylinder wave generator is defined as an energy harvesting line. The rope/welded chain/secondary rope between the rotating member of the linear-rotary motion conversion mechanism and the counterweight is defined as a reset line. The above section is the scheme 5. According to the scheme 5, preferably, a lower segment of the energy harvesting line is a chain, and a point on the chain is connected to the gravity anchor by a quick link.

Section VI: According to the rope control mechanism in the scheme 5, of which the linear-rotary motion conversion mechanism is the round link sprocket and the welded chain type, or the friction wheel and the rope type, or the main drum and the secondary drum type with the counterweight as the rope-retrieving member, preferably, an anti-entanglement mechanism is added, and following are several types of the anti-entanglement mechanism:

Type 1—a single catenary chain side-pull type: one end of a suspended chain is connected to the counterweight, and the other end extends downward to one side, and is finally connected to another anchor. The suspended chain may also be replaced with a rope with a weight tied in the middle.

Type 2—an anchor chain side-pull type: one end of a rope is connected to the counterweight, and the other end extends to one side for a distance, then passes around a pulley and extends downward to be finally connected with a weight. The pulley bracket of the pulley is in a flexible/universal connection at a certain portion of the middle of a anchor chains. The anchor chain is one of the mooring systems of the floating body of the WEC, or another floating body nearby. The counterweight may also be omitted, so that the end of the reset line is directly connected to one end of the rope, and the weight acts as a counterweight for rope-receiving.

Type 3—a side buoy side-pull type: a buoy is added at a certain distance around the floating body of the wave generator, and the floating body and the buoy are anchored at a certain position by a mooring system. One end of a rope is tied to the counterweight, and the other end extends below the buoy to pass around a pulley, then extends downward to be finally connected to a weight. The pulley bracket of the pulley is connected to the bottom surface of the buoy through a second rope. The counterweight may also be omitted, so that the end of the reset line is directly connected to one end of the rope, and the weight acts as a counterweight for rope-retrieving.

Type 4—a submerged float side-pull type: one end of a rope is connected to the counterweight, and the other end extends downward to one side, then passes around a pulley and extends upward to be finally connected to a submerged float. The pulley bracket of the pulley is in a flexible/ universal connection with the top end of another anchor. Or the counterweight is omitted, namely the end of the reset line extending from the floating body is directly connected with one end of a rope, and the other end of the rope extends downward to one side to pass around a pulley, then extends upward to be finally connected with a submerged float. The pulley bracket of the pulley in a flexible/universal connection with the top end of another anchor. Preferably, according to the above four types of anti-entanglement mechanisms with counterweight, the rope/catenary chain that side-pulling the counterweight may not be directly connected to the counterweight, but connected through a rigid straight rod, namely, one end of the rigid straight rod is connected with the end of the rope/catenary chain, and the other end of the rigid straight rod is in a flexible/universal connection with the counterweight.

Type 5- a single energy harvesting line & double reset line type: the linear-rotary motion conversion mechanism of the rope control mechanism, including: one main drum and two sets of identical secondary drums and secondary ropes on left and right sides of the main drum, respectively. The three drums are coaxial. The lower ends of the two secondary rope are tied to the left and right sides of the counterweight, and the main rope passes through the vertical through hole on the counterweight. Preferably, fairleads/double-roller chocks are installed at upper and lower entrances of the through hole, and the main rope passes through the fairleads/double-roller chocks.

Type 6—a multi-rope guiding type (scheme 6-6): the rope control mechanism has two sets of coaxial and identical round link sprockets/friction wheels/main drums that spaced apart by a certain axial distance from each other, and matching energy harvesting lines thereof. After passing through the respective corresponding fairlead/double-roller chock installed at the bottom end of the frame, the two energy harvesting lines continue to extend downward to pass through two vertical through holes that spaced apart by a certain distance in the counterweight, respectively, and are finally connected to the gravity anchor. Preferably, a scheme 6-6-1 is provided: fairleads/double-roller chocks configured to guide the ropes are installed at upper and lower openings of the vertical hole in the counterweight. According to the scheme 6-6, a preferred scheme 6-6-2 is provided: the following two designs may also be available for the connection between the energy harvesting line and the gravity anchor:

Design 1: the two energy harvesting lines that extend downward from the rope control mechanism, instead of being directly connected to the gravity anchor, are modified to be combined to one and pass around a pulley, and the pulley bracket of the pulley is in a flexible/universal connection with the gravity anchor. Design 2: instead of being directly connected to the gravity anchor, the two energy harvesting lines are connected to two ends of a rigid straight rod, respectively, then the rigid straight rod is connected to the gravity anchor through a V-shaped rope, namely: two top ends of the V-shaped rope are connected to the two ends of the rigid straight rod, respectively, and the bottom end of the V-shaped rope is in a flexible/universal connection with the gravity anchor.

According to the scheme 6-6, a preferred scheme 6-6-3 is provided as follows. The WEC is connected to the frame of the rope control mechanism through a single rope/U-ring/V-shaped rope connection. The single rope connection is: one end of a rope is connected to the WEC, and the other end is connected to a tie point at the top end of the frame of the rope control mechanism. The tie point coincides with an intersection of the center line of the two straightened energy harvesting lines and the top end of the rope control mechanism.

The U-ring connection is: the WEC and the rope control mechanism are connected through a U-ring, namely, the left side of the frame of the control rope mechanism is fixedly connected with one end of a short shaft, and the right side of the frame of the control rope mechanism is fixedly connected with the other short shaft. The two short shafts are coaxial, and inserted into two holes of the U-ring, respectively. The outer side of the middle portion of the U-ring is connected with the WEC. The axis of the two short shafts are perpendicular to a connection line of positions of the two fairleads/double-roller chocks that the two energy harvesting lines passing through, and coincide with the midpoint of the connection line.

The V-shaped rope connection is: the plane where the V-shaped rope is located firstly parallel to the two straightened energy harvesting lines, then the bottom end of the V-shaped rope is placed on the extension line of the center line of the two energy harvesting lines, and the bottom end of the V-shaped rope is connected to the WEC. Then top ends of the V-shaped rope are connected to the top end of the frame of the rope control mechanism. Preferably, the plane of the V-shaped rope coincides with the plane of the two energy harvesting lines.

Type 7—a double catenary chain & retaining rod type: each side of the counterweight that connected to the reset line is tied to an anchor chain. The other end of each anchor chain extends downward to each side, and is connected to another anchor. The anchor chain may also be replaced by an anchor rope, but a weight should be tied in the middle of the anchor rope. The counterweight may also be omitted, so that the reset line and the two anchor chains/anchor ropes are directly connected to form an inverted Y-shaped structure. Preferably, a lower half of the energy harvesting line may be replaced by a rigid straight rod, and the bottom end of the rigid straight rod is in a flexible/universal connection with the gravity anchor.

Type 8—a vertical cylinder guiding type: the frame of the rope control mechanism is a half-enclosed housing having an opening only at the bottom surface. The bottom surface of the housing is fixedly connected with a vertical cylinder, and the inner cavity of the vertical cylinder is in communication with the cavity of the housing through an opening of the top end of the cylinder. The counterweight is inside the vertical cylinder, and a gap exists between the counterweight and the inner wall of the vertical cylinder. The fairlead/double-roller chock through which the reset line passes and above the counterweight is omitted, and the fairlead/double-roller chock through which the energy harvesting line passes is modified to be installed on the outer side of the lower portion of the vertical cylinder.

Type 9- a passing-through suspended anchor type: in case that the rotation of the frame of the rope control mechanism is restrained, this type of anti-entanglement mechanism may be applied. A suspended anchor is namely the gravity anchor suspended in the water (there is an explanation later). The bottom end of the energy harvesting line is connected to the suspended anchor, and the reset line passes through the vertical through hole in the suspended anchor, then continues to extend downward to be connected the counterweight. However, it should be noted that if the suspended anchor is a pulley suspended anchor, the pulley bracket should be fixedly connected with the suspended anchor. Preferably, fairleads/double-roller chocks are installed at upper and lower openings of the vertical through hole of the suspended anchor, and the reset line passes through the fairleads/double-roller chocks.

Type 10—a F-shaped guiding rod type: in case that the rotation of the frame of the rope control mechanism is restrained, this type of anti-entanglement mechanism may be applied. Specifically, the lower half of the energy harvesting line is replaced by a F-shaped guiding rod, namely, the bottom end of the energy harvesting line is firstly connected to the right angle inflection point of the F-shaped guiding rod, then the bottom end of the long rod portion of the F-shaped guiding rod is connected to the gravity anchor through a pair of lock rings that hooked to each other, and the reset line passes through a third fairlead/double-roller chock, which is installed on the outer end of the short rod portion of the F-shaped guiding rod. The counterweight defines a vertical guiding hole, and the long rod portion of the F-shaped guiding rod passes through the fairleads that installed at upper and lower openings of the vertical guiding hole. The cross section of the long rod portion of the F-shaped guiding rod is rectangular, and the four sides of the long rod portion abut four rollers of the fairlead one by one. wet weight of the counterweight is greater than total wet weight of the energy harvesting line and the F-shaped guiding rod.

Section VII: this section relates to a controllable device for braking and loosening the rope. Namely, a Scheme 7-1 is provided as: a friction wheel and a gear are connected in a shaft, and the friction wheel, the gear, the shaft and its bearing & housing form a friction wheel & gear unit. The shaft is installed on the frame through the bearing & housing. The two identical friction wheel & gear units are successively installed closely on the frame, with axes being parallel and in the same direction, and end faces being aligned. The gears of the two friction wheel & gear units are in mesh, and outer diameters of the friction wheels are smaller than the diameter of the reference circle of the gears, so that the friction wheels shall not contact with each other and a gap exists between them. The gear of one of the friction wheel gear units is coupled to a rotor of the electric brake through a shaft, and the stator of the electric brake is fixed on the frame. The rope passes around the friction wheel of each friction wheel & gear unit successively like a snake, and the so-called passing around like a snake means that the direction of the rope passing around the first friction wheel and the direction of the rope passing around the second friction wheel are opposite (clockwise/counterclockwise). In addition, the diameters of the gears of the two friction wheel & gear units may also be different, and the diameters of the friction wheels of the two friction wheel & gear units may also be different, while the ratio of the diameter of the friction wheel to the diameter of the reference circle of the gear of each friction wheel & gear unit is the same. In practical applications, usually one end of the rope is subjected to a large pulling force, and a small pulling force is applied to the other end of the rope to resist.

According to the scheme 7-1, a preferred scheme 7-1-1 is provided as follows. At least two of the friction wheel gear units are installed according to the above rules, and the gears of the friction wheel gear units mesh in series. One rope passes around the friction wheel of each friction wheel gear unit like a snake in the order of mesh, and the rotor of the electric brake is coupled to only the shaft of one of the friction wheel gear units. According to the scheme 7-1, a more preferred scheme 7-1-2 is provided: the shaft that the rotor of the electric brake being coupled to is: the shaft of the friction wheel gear unit that farthest from the side where the pulling force is large, namely, starting from the side of the rope with a small pulling force, the shaft of the first friction wheel gear unit is it. According to the scheme 7-1, a preferred scheme 7-1-3 is provided: a fairlead is installed on the frame at the position that the rope approaches or leaves the friction wheel gear unit, and the rope passes through the fairlead. According to the scheme 7-1, a preferred scheme 7-1-4 is provided: the electric brake may also be replaced with a manual brake, so that release of the rope is manually controlled. According to the scheme 7-1, a preferred scheme 7-1-5 is provided: the small pulling force applied to the other end of the rope may be generated by the gravity of a counterweight, namely, the other end of the rope is connected to the counterweight. The schemes of this section may be applied to the rope control mechanism, specifically: according to the scheme 5, for a rope control mechanism with a friction wheel and a rope, the rope is one, and the friction wheel can be two in series to form a friction wheel set; the friction wheel is coupled to a gear through a shaft; the friction wheel, the gear, the shaft and its bearing & housing form a friction wheel gear unit; the shaft is mounted on the frame of the rope control mechanism through the bearing & housing; two identical friction wheel gear units have parallel axes, same directions and aligned end faces and are sequentially and adjacently mounted on the frame, and the gears of the two friction wheel gear units are meshed with each other; however, the diameter of the rim of each friction wheel is not greater than the diameter of the reference circle of the gear, the friction wheels do not interfere with each other; the gear of one unit in the friction wheel gear set is coupled to the rotor of the electric bake, and the rope successively passes by the friction wheels in each friction wheel gear unit in a zigzagged manner, namely the direction of the rope passing around the first friction wheel and the direction of the rope passing around the second friction wheel are opposite; in addition, the gears of the two friction wheel gear units may be different in diameter and the two friction wheels may also be different in diameter, but the ratio of the diameter of the friction wheel to the diameter of the gear in each friction wheel gear unit is the same. Preferably, more than two friction wheel gear units are mounted according to the said rules of parallel, the same direction and aligned end faces, and the gears of the friction wheel gear units are meshed in series; the rope passes by the friction wheels of each friction wheel gear unit in the meshing order in a zigzagged manner, and the shaft of only one friction wheel gear unit in the whole friction wheel gear set is coupled to the rotor of the electric brake; the said friction wheel gear unit coupled to the rotor is the first friction wheel gear unit on the side where the reset line is located. More preferably, the meshing transmissions of the all gears have a clearance.

Section VIII: this section relates to a suspended anchor scheme for suspending a gravity anchor in water (disengaged from the sea floor, so that the gravity anchor shall be movable), which may be applied to the wave generators that use relative motion between the floating body and the gravity anchor to do work. The following are several types:

Type 1—a direct-connection suspended anchor scheme 8-1: specifically, a buoy is moored at a certain distance on each side of the floating body of the wave generator, and each buoy is tied with a cable, and the other ends of the two cables are connected to the gravity anchor of the wave generator.

Type 2—a pulley suspended anchor scheme 8-2: two buoys are moored on the sea surface spacing apart from each other by a certain distance, and the floating body of the wave generator is placed in the middle between the two buoys. Two ends of a cable are tied to the two buoys, respectively, and the middle of the rope passes around a pulley, which is near to the top of the gravity anchor of the wave generator, and the bottom end of the pulley bracket of the pulley is connected with the gravity anchor.

Type 3—a double-ropeway suspended anchor scheme 8-3: the gravity anchor of the wave generator is a cube, and four vertexes of top surface of the gravity anchor are installed with a pulley, respectively, so that there are two pulleys on each side of two opposite sides of the gravity anchor, respectively, and the two pulleys of each opposite side roll on one ropeway, respectively. The two ropeways are combined into one on the left side of the gravity anchor, then passes around a pulley, and the bracket of the pulley is connected to one end of the cable that configured to suspend the gravity anchor on the left side. Similarly, the two ropeways are also combined into one on the right side of the gravity anchor, then passes around the other pulley, and the bracket of the other pulley is connected to one end of the other cable that configured to suspend the gravity anchor on the right side. The other ends of the two cables on both sides of the gravity anchor are connected to two buoys moored on the sea surface spacing apart from each other by a certain distance, respectively, and the floating body of the wave generator is placed in the middle between the two buoys.

Type 4—a side-around suspended anchor scheme 8-4: the gravity anchor of the wave generator is a lay-flat cube, and a fairlead is installed at the upper position of the front and back sides of the gravity anchor, respectively, and two vertical edges on the right side of the gravity anchor are installed with two guiding pulleys. A cable configured to suspend the gravity anchor successively passes through the rear fairlead, and passes around the guiding pulley on the right rear edge and the guiding pulley on the right front edge, then passes through the front fairlead. The two ends of the cable are connected to two buoys moored on the sea surface spacing apart from each other by a certain distance, respectively, and the floating body of the wave generator is placed between the two buoys.

Type 5—a stretcher-shaped suspended anchor scheme 8-5: two identical parallel rigid straight rods with end surfaces aligned respectively pass through two parallel horizontal through holes, which are spaced apart from each other with a certain horizontal distance in the gravity anchor, and a gap exists between the side of the rigid straight rod and an inner wall of the horizontal through hole. Left and right ends of the two rigid straight rods are fixedly connected with left and right steel frames, respectively, and a suspended cable on each side is connected to the middle of the steel frame on each side, respectively. The two cables on both sides of the gravity anchor are connected to two buoys moored on the sea surface spacing apart from each other by a certain distance, respectively, and the floating body of the wave generator is placed between the two buoys.

According to the schemes 8-3 and 8-4, the gravity anchor is not limited to a cube and may have other shapes, while the positions of the pulley, the fairlead, and the guiding pulley are unchanged. According to the schemes 8-4 and 8-5, the center of gravity of the gravity anchor is lower than the cable/rigid straight rod to maintain stability.

According to the various suspended anchor schemes described above, preferred schemes 8-*-1 is provided (* represents any number herein, refers to multiple, here includes 1 to 5): the floating body of the wave generator and the buoy are connected by a rope.

According to the schemes 8-*-1, preferred schemes 8-*-1-1 is provided: the middle of the rope connecting the floating body of the wave generator and the buoys is tied with a weight or is replaced by a tension spring. Preferably, according to the scheme 8-*-1-1: if the weight acts as a buffer, a float is tied to the rope close to the buoy at a certain distance to lift the rope here.

According to the schemes 8-*-1, preferred schemes 8-*-1-2 is provided: the floating body of the wave generator is connected to the rope through a V-shaped rope, that is, the rope is connected with the bottom end of the V-shaped rope, and the two top ends of the V-shaped rope is connected with top and bottom ends of the floating body, respectively.

According to the schemes 8-*, preferred schemes 8-*-2 is provided: when a plurality of wave generators work together, the floating bodies of the plurality of wave generators are arranged in a row, and a buoy is placed between the adjacent floating bodies and at the beginning and the end of the queue, respectively. The gravity anchor of each of the wave generators is suspended in the water by two buoys on both sides of the floating body through the cables, and the suspension method may be the several types listed in the schemes 8-*. Each of the buoys at the first and the last of the floating bodies queue is tied to one end of an anchor chain, and the other end of the anchor chain extends downward toward the outside of the queue and is finally connected to an anchor. According to the schemes 8-*-2, more preferred schemes 8-*-2-1 is provided: the adjacent floating body and the buoy are connected by a rope.

According to the schemes 8-*-2-1, preferred scheme 8-*-2-1-1 is provided: a manual or MCU controlled windlass/winch is installed on the buoy/floating body to retrieve or release the rope/anchor chain according to the wave condition. According to the schemes 8-*-2, preferred schemes 8-*-2-2 is provided: the floating bodies and the buoys in the queue may also be tied to anchor chains perpendicular to the direction of the queue, and the bottom ends of the anchor chains are connected to anchors.

According to the schemes 8-*, preferred schemes 8-*-3 is provided: the buoy is an axial horizontal streamlined droplet-shaped type (similar to a submarine) to reduce the current impact, and an empennage (a vertical plate coincidentally with the buoy axis, shaped like the tail of a vane) is installed at the tip end of the buoy, so that the buoy may be automatically adjusted directions by means of the current. A lifting swivel ring/8-shaped rotating ring is installed at the bottom of the buoy, and the bottom end of the lifting swivel ring/8-shaped rotating ring acts as the connection point of the buoy and the other ropes/cables, or mooring chains/cables (if the buoy is connected to the mooring chains/cables).

Section IX: the section relates to a suspended-anchor-based rope control mechanism, of which the frame is installed on the suspended anchor and the top of the elongate member is connected to the WEC.

Scheme 9-1 relates to a rack-type suspended-anchor-based rope control mechanism: the gravity anchor is a suspended anchor with a vertical through hole in the center. The frame of the rope control mechanism is inside the vertical through hole, and is connected with the inner wall of the hole through an X-shaped chain or an annular cross universal connection.

Specifically, the X-shaped chain connection is: ends of two chains are connected to the left side of the frame of the rope control mechanism, and the other ends of the two chains extend along the upper left direction and the lower left direction, respectively, and are finally connected to left the inner side of the gravity anchor hole. Ends of the other two chains are connected to the right side of the frame of the rope control mechanism, and the other ends of the two chains extend along the upper right direction and the lower right direction, respectively, and are finally connected to right inner side of the gravity anchor hole. The four chains form an X shape, and the frame of the rope control mechanism is at the center.

The annular cross universal connection is: a two-dimensional square ring/circular ring is laid flat on the XY coordinate plane, and the center point of the square ring/circular ring is at the origin of the XY coordinate. A shaft extends outward from each of the two sides of the square ring/circular ring along the X direction, respectively, and bearings & housings fitted with the two shafts are installed on opposite inner walls of the vertical hole of the gravity anchor, respectively. A shaft extends inward from each of the two sides of the square ring/circular ring along the Y direction, respectively, and bearings & housings fitted with the two shafts are installed on two sides of the frame of the rope control mechanism, respectively.

The frame of the rope control mechanism has the same shape as a lay-flat U-shaped magnet, but is hollow. A rack is vertically placed and half-enclosed by the U-shaped frame of the rope control mechanism. A guide rail configured to guide the up and down movement of the rack is installed on the frame, and the shaft of the gear meshing with the rack is installed on the frame of the rope control mechanism through the bearing & housing. The rotor of the electric brake is coupled to the shaft of the gear, or linked with the shaft of the gear through a bevel gear transmission/chain transmission mechanism, and the stator of the electric brake is fixed on the frame. The top end of the rack is connected with the WEC. The shaft of the gear passes through a seal ring embedded in a hole in the inner side wall of the U-shaped frame, and enters inside the cavity of the U-shaped frame, and the electric brake, the bevel gear/chain transmission mechanism (if any) are all inside the cavity.

According to the scheme 9-1, a preferred scheme 9-1-1 is provided: at least two of the aforementioned gears in the same size are provided, and at least two first bevel gears in the same size are provided correspondingly. Each of the gears and each of the first bevel gears are connected in one shaft, respectively. A plurality of second bevel gears that meshed with the first bevel gears are coaxial by a main shaft, and the rotor of the electric brake is coupled to the main shaft. According to the scheme 9-1-1, preferably, the main shaft is vertical placed, and the rotor of the electric brake is coupled to top end of the main shaft. The position of the electric brake is higher than any hole in the inner side wall of the U-shaped frame.

Scheme 9-2, a brake-bar-type suspended-anchor-based rope control mechanism: the gravity anchor is a suspended anchor with a vertical through hole in the center. The frame of the rope control mechanism is inside the vertical through hole, and is connected with the inner wall of the hole through the X-shaped chain or the annular cross universal connection. The outer contour of the frame of the rope control mechanism has the same shape as a lay-flat U-shaped magnet, but is hollow. A brake bar having a section of square steel shape is placed vertically, and is half-enclosed by the U-shaped frame of the rope control mechanism. Top and the bottom ends of the U-shaped frame are respectively installed with two fairleads configured to guide the brake bar to move up and down, and four rollers of the fairleads abut four sides of the brake bar, respectively. An electric caliper corresponding to the brake bar is installed on the frame, and the top of the brake bar is connected with the WEC.

Section X: According to the schemes 5 and 9-1, preferably, an overrunning clutch/torque limiter is inserted into the power transmission path from the rotating member of the linear-rotary motion conversion mechanism to the electric brake. Specifically, the rotating member of the linear-rotary motion conversion mechanism and one end of the overrunning clutch/torque limiter are coupled by the shaft or linked with each other through a chain/gear/belt transmission mechanism, and the other end of the overrunning clutch/torque limiter and the rotor of the electric brake are coupled by the shaft . . . . The stator of the electric brake is fixed on the frame. If the overrunning clutch is introduced, the rotatable direction of the rotating member of the linear-rotary motion conversion mechanism should be the same as the direction of the torque generated by the pulling force of the reset line, when the electric brake is in the braking mode. More preferably, if the rope control mechanism is already provided with the aforementioned overrunning clutch, a second electric brake is installed, and the stator of the second electric brake is installed on the frame of the rope control mechanism. The rotor of the second electric brake and the rotating member of the linear-rotary motion conversion mechanism are coupled by the shaft, or linked through a chain/gear/belt transmission mechanism.

Section XI: Preferably, according to the scheme 5, the frame of the rope control mechanism is a semi-enclosed housing with an opening only at its bottom. According to the schemes 9-1 and 9-2, the frame of the rope control mechanism is a fully-enclosed housing. The rotating member of the linear-rotary motion conversion mechanism, the main shaft and its bearing & housing, and the electric brake are all installed inside the inner cavity of the frame. More preferably, an air supply system is further included, and following are several types of the air supply system.

Type 1: the air supply system includes a gas tube, a waterlogging sensor, a Microcontroller Unit module, an electric air pump and an auxiliary power supply. The electric air pump is installed in the air environment of the floating body on the sea surface. One end of the gas tube is connected to the air outlet of the air pump, and the other end extends into the cavity of the rope control mechanism. The waterlogging sensor is installed on the frame below the shaft of the linear-rotary motion conversion mechanism inside the cavity of the rope control mechanism, and the waterlogging sensor sends information to the MCU module through a signal line. The MCU module performs switching control of the power supply of the electric air pump. If the gas returns after the air pump is stopped, the air outlet of the air pump is connected to the air tube through a exit-only valve.

Type 2: the air supply system includes a waterlogging sensor, a MCU and an auxiliary power supply, a solenoid valve, and a high-pressure gas tank, and all of which except the waterlogging sensor are installed on an upper part inside the cavity of the semi-enclosed housing. The waterlogging sensor is installed inside the cavity of the rope control mechanism and on the frame below the shaft of the linear-rotary motion conversion mechanism. Once the water is detected, the waterlogging sensor immediately sends a signal to the MCU. The MCU controls opening and closing of the solenoid valve, and the gas tube connected to the outlet of the high-pressure gas tank is in communication with the cavity of the housing of the rope control mechanism through the solenoid valves.

Type 3: Place a chemical solid, such as calcium carbide, which reacts with water to generate a large amount of gas on the frame below the shaft of the linear-rotary motion conversion mechanism inside the cavity of the frame of the rope control mechanism.

Type 4: two outer insulation electric cables with positive and negative of DC voltage are arranged on the rope control mechanism. The negative electric cable leads into the cavity of the frame to connect a graphite electrode. The graphite electrode is bare but insulated from the frame, and is installed on the frame below the shaft of the linear-rotary motion conversion mechanism. The other graphite electrode connected to the positive electric cable is installed outside the frame housing and insulated from the frame.

In addition, according to the fairlead configured to guide the rope as mentioned in the present disclosure, a preferred scheme 12-1 is provided: the fairlead is a four-roller fairlead, and the first pair of the rollers that the rope is contacted with when just enters in the fairlead are sleeved with circular tubes. The circular tubes are made of a soft and wear-resistant material, and both ends of the soft wear-resistant tubes are in fixed and sealed connection with the two ends of cylindrical surfaces of the rollers, respectively. The gaps between the inner wall of the soft wear-resistant circular tube and the cylindrical surfaces of the rollers are small and filled with lubricating oil.

According to the fairlead configured to guide the rope as mentioned in the present disclosure, a preferred scheme 12-2 is provided: the fairlead is a four-roller fairlead, and the first pair of rollers that the rope is contact with when just enters in the fairlead are sleeved with barrel-shaped sleeves. The barrel-shaped sleeves are woven by ultra high molecular weight polyethylene (UHMWPE) fibers, and the surfaces of the barrel-shaped sleeves are externally coated with rubber. Both ends of the barrel-shaped sleeves are connected to both ends of the cylindrical surfaces of the rollers, respectively. The rollers are made of polytetrafluoroethylene (PTFE) material, and the self-lubrication between the UHMWPE sleeves and the PTFE rollers allow the sleeves to oscillate with the rope, so between the rope and the UHMWPE sleeves externally coated with rubber there is always static friction.

The present disclosure has the following advantages:

1) According to the schemes of connecting the frame of the rope control mechanism with the WEC in the present disclosure, the distance between the floating body and the frame of the rope control mechanism is short and basically stable, so that the rope control electric cable may be short, and thereby the reliability is improved. Meanwhile, the rope control mechanism is close to the water surface, making it convenient for maintenance.

2) According to the single floating body pressure difference reset scheme of the present disclosure, the hydraulic cylinder is placed above the floating body, so that the drain oil of the hydraulic cylinder may flow into the open oil tank under the action of gravity, thereby reducing the risk of polluting seawater. The equipment chamber is the fully-enclosed housing, so that the hidden danger of seawater entering the equipment chamber is eliminated. The detachable structure of the floating body as the combination of the equipment chamber and the buoyancy chamber makes the maintenance more convenient. The scheme of arranging the hydraulic cylinder on the outside of the floating body also makes the maintenance of the hydraulic cylinder and the replacement of the seal ring easier. According to the single floating body pressure difference reset B type WEC in the present disclosure, the position of the drainage port of the plunger cylinder is stable with respect to the floating body, and the tube configured to recover the drain oil does not shake.

3) According to the square tube applied to the single floating body pressure difference reset WEC of the present disclosure, the rope control mechanism and the WEC are connected as a whole, thereby avoiding the instability and the rope bending problem caused by suspending the rope control mechanism by only one rope, and reducing the tilt of the rope control mechanism to improve safety. The design of wiring inside the square tube can protect the wires.

4) According to the double-floating gravity reset WEC, the reset of the single-acting hydraulic cylinder no longer requires the pressure of the low-pressure accumulator, which can directly extract the oil from the open oil tank by gravity, thereby eliminating the oil replenishment system and reducing the system complexity.

5) According to the spring oscillator system composed of the spring and weight in the present disclosure, the energy harvesting line may be subjected to a larger pulling force when at the trough, thereby reducing the wave height utilization loss caused by the flexible bending of the energy harvesting line.

6) In the present disclosure, the rope control mechanism uses the counterweight to retrieve the rope, which makes it has a long service life, a long stroke, high reliability, and a large rope-retrieving force, and eliminates the problems such as fatigue and small force of rope-retrieving by springs. The anti-entanglement mechanism avoids the direct entanglement of the energy harvesting line and the reset line. According to the linear-rotary motion conversion mechanism composed of the round link sprocket and the welded chain or the friction wheel and the rope, since the diameter is invariable (the diameter of the drum often has to be changed), the reset pulling force of the energy harvesting line is equal to the gravity of the counterweight, which makes the rope control mechanism is simple in structure and small in size.

7) Instead of the drum, the friction wheel set is used as the linear-rotary motion conversion mechanism, in which the rope is only wound once, which avoids the problem that the rope being wound too wide on the drum in the axial direction. The multi-friction wheel set may greatly enhance the operating pulling-force of the single rope, and enable the rope to be operated at a smaller bending radius, which reduces the torque output to the electric brake, reduces the cost, and reduces the volume of the rope control mechanism. According to the scheme where the electric brake and the friction wheel-gear unit of the reset line side are connected through one shaft, the wear of the rope is reduced.

8) According to the rope control mechanism where the frame is connected with the WEC in the present disclosure, the frame is a half-enclosed housing having a opening only at the bottom. The energy harvesting line/reset line may enter from the bottom, and air may be stored inside, thereby easily solving the waterproof problem of the internal parts of the rope control mechanism. The air supply system in the present disclosure further improves the waterproof support capability.

9) According to the suspended anchor scheme, the gravity anchor is allowed to be suspended in the water and the water depth restriction is eliminated (if the water depth is too deep, the length of the energy harvesting line is too long, then the elastic deformation becomes large, which will cause part of the wave height to be used on elongating the rope, Instead of doing work). In addition, the gravity anchor may always be under the floating body, so that the energy harvesting line is nearly vertical, thereby avoiding the impact of currents on the acquisition and generation.

10) According to the rack-type/brake bar-type rope control mechanism in the present disclosure, the elongated and long member is rigid and does not bend, so that the flexible deformation caused by the using of the rope as the energy harvesting element is avoided, thereby avoiding the loss of wave height utilization.

11) The fairlead with soft wear-resistant lubricating tube/ UHMWPE sleeve in the present disclosure further reduces the wear of the rope.

BRIEF DESCRIPTION OF THE DRAWINGS

FIG. 1: a schematic diagram of a rope-controlled hydraulic cylinder wave generator (being a single floating body pressure difference reset type, with a round link sprocket and a F-shaped guiding rod shown);

FIG. 2: a structural diagram of a double-rope guiding rope control mechanism (with drums shown, and with air injection by an air pump shown);

FIG. 2A: a structural diagram of a U-ring suspended rope control mechanism;

FIG. 2B: a structural diagram of a pulley balanced double-energy harvesting line;

FIG. 3: a structural diagram of an electric brake (with an electromagnet, a spring, a brake master cylinder, and a drum brake shown);

FIG. 4: a structural diagram of a drum-type rope control mechanism with single-energy harvesting line & double-reset line anti-entanglement mechanism;

FIG. 5: a schematic diagram of a double-catenary chain & retaining rod type anti-entanglement mechanism;

FIG. 6: a side view of a friction wheel group type rope control mechanism with a single catenary chain anti-entanglement mechanism;

FIG. 7: a schematic diagram of a friction wheel group type rope control mechanism with a double rope guiding type anti-entanglement mechanism (connected up and down by a V-shaped rope);

FIG. 7A: a sectional view indicated by arrows A-A on FIG. 7;

FIG. 8: a webbing & friction wheel type rope control mechanism (connected up and down by V-shaped ropes);

FIG. 9: a schematic diagram of a roller sprocket type rope control mechanism and a pressure difference reset type WEC (with a piston cylinder shown);

FIG. 10: a schematic diagram of a roller sprocket type rope control mechanism and a double floating body gravity reset type WEC;

FIG. 10A: a sectional view indicated by arrows A-A on FIG. 10;

FIG. 20: a schematic diagram of a single floating body pressure difference reset type B WEC (with a rope shown);

FIG. 21: a schematic diagram of a single floating body pressure difference reset type B WEC (with a square tube shown);

FIG. 21A: a sectional view indicated by arrows F-F' on FIG. 21;

FIG. 21B: a sectional view indicated by arrows E-E' on FIG. 21;

FIG. 21C: a local view A of FIG. 21 A;

FIG. 21D: an enlarged perspective view of the portion A of FIG. 21 A;

FIG. 22: a front view of a suspended-anchor-based rack type rope control mechanism;

FIG. 22A: a sectional view indicated by arrows D-D on FIG. 22;

FIG. 22B: a local view G of FIG. 22 A;

FIG. 22C: a sectional view indicated by arrows E-E on FIG. 22;

FIG. 22D: a local view F of FIG. 22 C;

FIG. 23: a structural view of a side-wound type suspended anchor;

FIG. 24: a schematic diagram of a fairlead with soft wear-resistant tube;

FIG. 25: a structural diagram of a rope control mechanism installed on a suspended anchor;

FIG. 26: a structural diagram of a double-rigid straight rod suspended anchor;

FIG. 27: an installation structure diagram of a damping disc-based rope control mechanism and a X-shaped chain;

FIG. 28: a structural diagram of a brake bar type rope control mechanism;

FIG. 29: a perspective view of the brake bar type rope control mechanism;

FIG. 30: a plan view of an annular cross universal connection.

Figure 12:
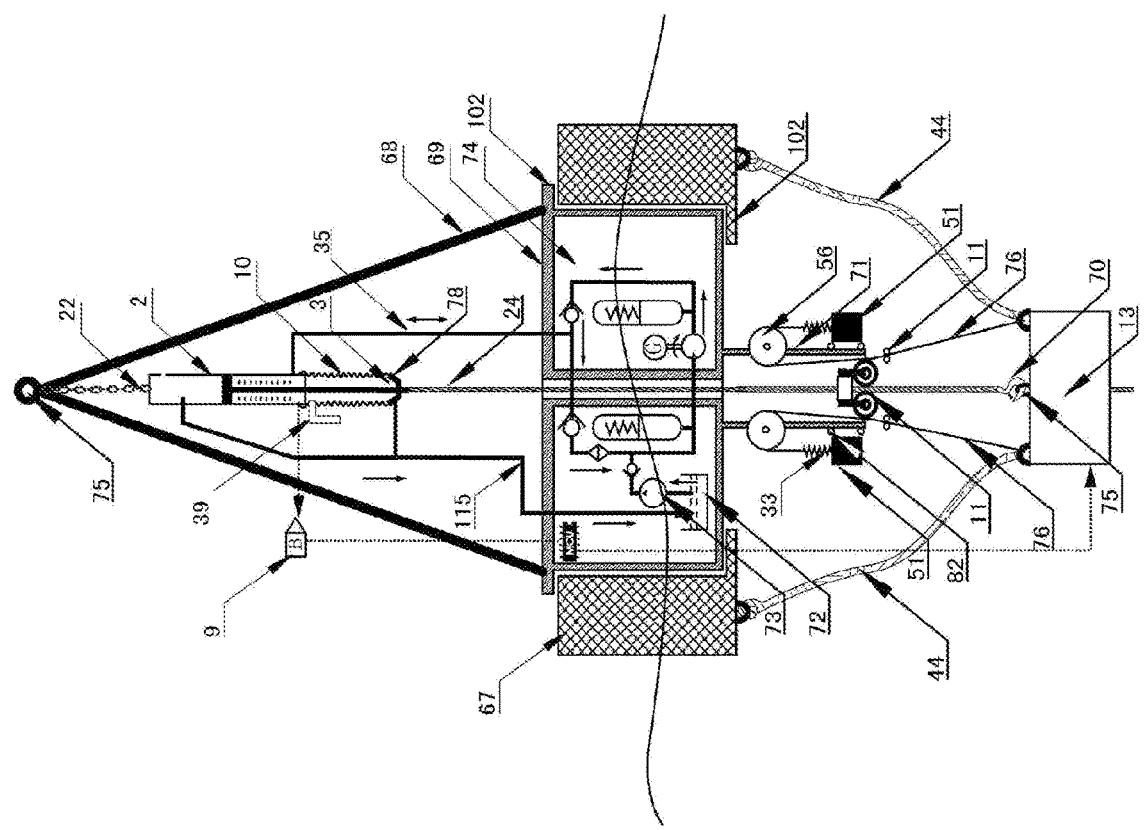
FIG. 12: a sectional view of a single floating body pressure difference reset type A WEC (with an equipment chamber and a buoyancy chamber shown, and with a piston cylinder placed above shown)

1-floating body: steel/fiber reinforced plastics housing; 2-hydraulic cylinder; 3-piston rod; 4-high pressure accumulator; 5-oil filter; 6-hydraulic motor; 7-generator; 8-low pressure accumulator; 9-working stroke ending probe: a sensor configured to sense a piston to reach the end of its stroke, may be a Hall Sensor (a magnet is needed to be linked with the piston rod)/an inductive proximity switch configured to induct the proximity of metal; 10-telescopic tube: a bellows-shaped telescopic rubber tube; 11- fairlead: a four-roller type fairlead, a pair of rollers with parallel axes and aligned end-faces are installed together with a gap between each other, and the two pairs of such rollers are installed on a bracket with each other perpendicularly stacked without in contact, the rollers may rotate freely, and a guided object passes through the gaps between each pair of rollers; 12-electric cable; 13-housing of a rope control mechanism: may also be a frame of a rope control mechanism; 14-U-ring: the shape is the same as a shackle (also called D shackle) for lifting with its pin removed, with coaxial holes at both ends; 15-overrunning clutch; 16-electric brake: a rotary type brake which may be controlled by electricity, including a rotor and a stator; the electric brake is divided into two categories: a direct control type or an indirect control type, and the direct control type electric brake includes: electromagnetic clutches and electromagnetic brakes, while in an Antilock Brake System (ABS) of an automobile, a solenoid valve is controlled by an Engine Control Unit (ECU) to control the disc brake, which is the indirect control type electric brake; 17-gravity anchor; 18-counterweight: with its specific gravity being greater than water, and its gravity acting as the rope-retrieving power; 19-Γ-shaped guiding rod: a r-shaped steel frame with the section of its long rod part being rectangular; 20-double-roller chock: the same two groove pulleys are installed with axes parallel, end faces aligned and rims tightly abutted, and the rope is sandwiched between the two pulleys, and the double-roller chock with strong resistance to axial force is interchangeable with the fairlead; 21-main rope; 22-welded chain; 23-main drum; 24-rope; 25-chain transmission; 26-seal ring: a rotary seal ring; 27-piston; 28-tightener sprocket: pressing the chain by spring force, may maintain the tension of the chain when the counterweight is losing weight; 29-round link sprocket; 30-energy harvesting line; 31-electromagnet; 32-armature; 33-extension spring; 34-brake master cylinder; 35-hydraulic tube; 36-slave cylinder; 37-secondary drum; 38-electric air pump; 39-air tube; 40-waterlogging sensor; 41-main shaft; 42-secondary shaft; 43-secondary rope; 44-*a* third rope; 45-torque overload protector: providing torque overload protection, may be a delayed recoverable type, a manual recovery type and a non-recoverable replacement-needed type, in case it is overloaded, it will be detached or invalid; 46-grip anchor; 47-gear; 48-friction wheel: fixedly connected to its main shaft by a key, with a groove similar to the groove of a V-belt pulley, while the bottom of the groove is semi-circular, and the surface of the groove of the friction wheel is covered with polyurethane or rubber material to enhance friction and wear resistance, and the rope passes around inside the groove; 49-*a* second rope; 50-reset line; 51-weight: specific gravity is greater than water; 52-underwater buoyancy chamber; 53-vertical rod: for increasing the arm of force of a rope at the tension point, which may increase a return torque and reduce swing of the floating body, when the vertical rod is tilted; 54-bearing & housing: a bearing and its related bearing housing; 55-V-shaped rope; 56-pulley; 57-cable; 58-anchor chain; 59-buoy; 60-float; 61-rigid straight rod: a straight hard rod; 62-pulley bracket; 63-straight cylinder: a straight tube; 64-short shaft; 65-roller: a freely rotatable cylinder; 66-webbing; 67-buoyancy chamber: a hollow housing with a short thick circular tube outer profile, and the revolved section is rectangular, and the interior may be filled with foam, and the specific gravity is less than water to provide buoyancy; 68-tripod: three steel rods are fixedly connected together at one end, and the other ends are separated at the same angle, which is similar to a camera tripod; 69-upper cover of the equipment chamber; 70- hook; 71-vertical tube: a vertical round or square tube; 72-open oil tank; 73-charge pump; 74-equipment chamber: a fully sealed hollow housing with a short thick round tube shape, the rotating section is rectangular, and equipment may be installed internally; 75-lifting eye; 76-cord; 77-guiding slip ring: annular shape, with a rope passing through to guide rope; 78-oil bowl: a bowl-shaped object made of steel or plastic; 79-rope control device; 80-annular floating body: a hollow housing with a short thick tube shape, and the rotating section is rectangular; 81-upright column; 82-guiding roller: shaped like a rigid caster, and guide the moving direction of members by rolling; 83-Π-shaped bracket: a Π-shaped bracket made of steel, or the same tripod as OPT's Powerbuoy, namely, each end of the lay-flat Y-shaped beam extends downward to form a three-leg structure bracket; 84-flexible/universal connection: may be a chain/rope, or a pair of lock rings that are hooked to each other, or a ball joint, a connection method that allows the two components connected to each other to have a certain angle change; 85-cylindrical rain-proof cover: with a vertical tube shape, open at the bottom, closed at the top and fixedly connected to the bottom of the beam of the Π-shaped bracket/three-leg bracket, and sleeved on the column; 86-guide rail; 87-circular disk-shaped end cover; 88-steel frame; 89-cushion block; 90-bevel gear transmission mechanism; 91-knot: a limit solid object tied on the rope, the profile of the knot is larger than the gap of the pulley bracket and cannot pass through; 92-roller sprocket; 93-roller chain; 94-rack; 95-friction coupling: a coupling that transmits power by a pair of friction pairs, and the friction pairs will slip when overloaded; 96-hole; 97- damping disc; 98-brake bar: a straight, long rigid square column, of which the two opposite sides with large friction coefficient act as friction surfaces; 99-brake caliper; 100-annular cross universal connection; 102-flange: a convex edge, configured to limit position; 103-reset ending probe: a proximity switch or sensor configured to monitor the end of the reset stroke; 104-second extension spring; 105-brake shoes; 106-limit block; 107- windlass; 108-square tube; 109-thin straight tube; 110-high pressure gas tank; 111-rectangular steel frame, which is vertically installed and the shape is like "□"; 112-second electric brake; 113-square steel; 114-lug; 115-oil drain tube; 116-rubber tube; 117-polished shaft; 118-lubricating oil; 119-quick link; 120-lifting swivel ring; 123-empennage; 122-graphite electrode; 121-spiral cable.

DETAILED DESCRIPTION OF THE PRESENT INVENTION

The present invention will be further described below with reference to the accompanying drawings. All illustrations of the drawings are for the purpose of describing selected versions of the present invention and are not intended to limit the scope of the present invention.

Section I: The wave generator for a rope-controlled hydraulic cylinder in the present disclosure includes a Wave Energy Collection and Conversion System (WEC), a rope control device and a gravity anchor. The WEC is located on a water surface, and is connected to the gravity anchor through the rope control device below the WEC. The rope control device includes two members which are controllable in relative motion, i.e., frame and an elongated member. When the frame is located above the elongated member, the top end of the frame serves as a connection point with the WEC, and the bottom end of the elongated member serves as a collection point with the gravity anchor; however, when the frame is located below the elongated member, the frame serves as a connection point with the gravity anchor, and the top end of the elongated member serves as a connection point with the WEC. The rope control device is equivalent to a benchmark point having an adjustable distance from the gravity anchor. The WEC generates electricity by using the relative motion between a floating body and the benchmark point under water.

The WEC is classified into two categories, i.e., a pressure difference reset WEC with a single floating body and a gravity reset WEC with double floating bodies. The WEC can absorb wave energy to generate electricity by using the change in distance between the floating body and the gravity anchor.

Section II: The pressure difference reset WEC with a single floating body is classified into two types, i.e., a type A using a piston cylinder (the hydraulic cylinder is tensioned during working) and a type B using a plunger cylinder (the hydraulic cylinder is compressed during working). The upper part of FIG. 1 shows the A-type pressure difference reset WEC with a single floating body.

FIG. 12 shows an A-type pressure difference reset WEC with a single floating body. The floating body in FIG. 12 is a combination of a buoyancy chamber 67 and an equipment chamber 74 (as explained below). Tentatively, the equipment chamber 74 is used as the floating body without considering the buoyancy chamber 67. The structure of the floating body (i.e., the equipment chamber 74) may be an enclosed housing with a straight tube vertically penetrated through its center, and the portions of the housing inside the straight tube are removed to form a fully-enclosed housing with a through hole in the center. The equipment chamber 74 in this figure may be regarded as thin-walled hollow shell structure (called a swimming ring structure with a square cross section) which is formed by rotating a rectangle about an axis. The axis is parallel to one side of the rectangle and has a certain distance from the rectangle. A fairlead 11 is mounted at a lower outlet of the through hole of the equipment chamber 74 (the fairlead is mounted through the vertical tube 71; of course, the vertical tube 71 may also be omitted). Three feet (only two feet are shown) of a tripod 68 are fixed on the top surface of the floating body. The top end of the tripod 68 is located directly above the through hole. The top end of the tripod is connected to the top end of a cylinder body of a single-action hydraulic cylinder 2 through a welded chain 22. A rope 24 connected to a handle of a piston rod of the single-action hydraulic cylinder 2 successively passes through the center hole of the floating body and the fairlead 11, and is finally connected to the frame 13 of the rope control device. The generator and the hydraulic system (except for the single-action hydraulic cylinder 2) are all arranged in the equipment chamber 74.

The scheme shown in this figure is reset by differential pressure. During operation, the pressure in the high pressure accumulator >>the pressure in the low pressure accumulator >the atmospheric pressure. The detailed operating principle of the WEC of this type may refer to Patent No. CN 103104408A. When the rope control device 13 is locked, the equipment chamber 74 rises with the wave, the distance from the equipment chamber 74 to the rope control device 13 is enlarged, and the rope 24 generates tension to pull the piston cylinder 2. The output high-pressure hydraulic oil passes through a exit-only check valve (through which oil is only allowed to exit from the rod chamber), is then stabilized by the high pressure accumulator, and pushes the hydraulic motor, and then reach the low pressure accumulator. When the equipment chamber 74 falls with the wave, the distance from the equipment chamber 74 to the rope control device 13 is shortened, and the rope 24 is relaxed. Since the pressure in the low pressure accumulator is higher than the atmospheric pressure, the piston rises due to the pressure difference between the two pressures, and the rope 24 is retracted. Meanwhile, the hydraulic oil enters the rod chamber from the low pressure accumulator through a enter-only check valve (through which oil is only allowed to enter the rod chamber). In all accompanying drawings herein, the flow of the hydraulic oil is indicated by the arrow.

The highlight of this design is that the hydraulic cylinder 2 is arranged above the floating body. The handle of the piston rod of the hydraulic cylinder 2 is connected fixedly to the bottom of an oil bowl with an upward-faced mouth. To protect the piston rod of the hydraulic cylinder from corrosion by salty water vapor in the outside, a telescopic tube is sheathed on the piston rod. The lower portion of the telescopic tube 10 is butt-jointed and sealed with the outer edge of the oil bowl 78, and the upper portion of the telescopic tube 10 is sheathed on the cylinder body of the hydraulic cylinder 2 and then is connected and sealed with the side face of the cylinder body. In this way, a chamber (called a corrugated cavity) is formed inside the telescopic tube 10. An orifice of an air tube 39 is communicated with the upper portion of the corrugated cavity in the telescopic tube, while another orifice thereof faces downwards, so that the corrugated cavity is communicated with the atmosphere to maintain the balance between internal and external pressures and the hydraulic oil drained from the hydraulic cylinder can flow downwards. The orifice faces downwards to prevent rainwater or seawater from entering the corrugated cavity, so the hydraulic oil drained is collected by the oil bowl 78 on the bottom. An oil drain tube 115 of the hydraulic cylinder 2 is led out from the upper portion of the interior of the non-rod chamber of the cylinder body and the oil bowl 78, respectively, and then merged into one path. The oil drain tube 115 penetrates into the equipment chamber from an upper cover 69 of the equipment chamber, and finally enters an open oil tank 72. A charge pump 73 sucks the hydraulic oil from the open oil tank 72 and then injects the hydraulic oil into the closed hydraulic circulation line. The charge pump 73 is driven by a motor. An MCU (Microprogrammed Control Unit) acquire information from a liquid level sensor in the open oil tank or a pressure sensor in the closed hydraulic system to control the turn-on/turn-off of the motor. The telescopic tube 10 is in the air. Even if the telescopic tube 10 is torn, no seawater will enter the corrugated cavity, and no oil will enter the sea. The equipment chamber 74 is completely sealed, and only the upper portion is connected to the oil drain tube, so the risk of seawater entering the buoyancy chamber is reduced.

Figure 14:
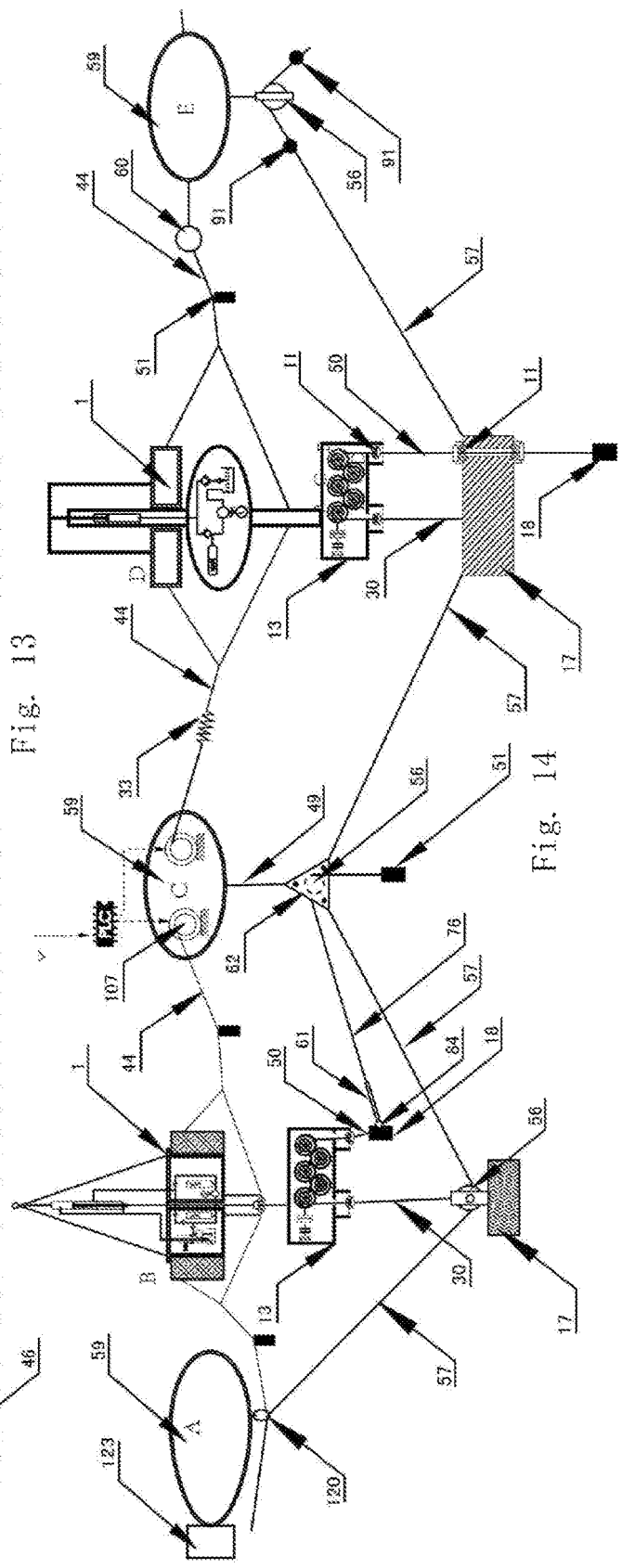
FIG. 14: a schematic diagram of a row of WECs with suspended anchors (with side buoy side-pull type anti-entanglement mechanisms and passing-through suspended anchor type anti-entanglement mechanisms shown)

In addition, the left part of FIG. 14 also shows a pressure difference reset WEC with a single floating body as shown in FIG. 12. The structure combined by the equipment chamber and the buoyancy chamber will be explained now, with reference to FIG. 12. On the basis of the equipment chamber 74 described above, a buoyancy chamber 67 is additionally provided. The buoyancy chamber 67 may be an annular floating body (it is a circular ring body with a rectangular section in this figure). The buoyancy chamber 67 and the equipment chamber 74 may be connected in two ways.

The first way is an embedded way (FIG. 12). That is, the intra-ring hole of the buoyancy chamber 67 is slightly greater than the outer contour of the equipment chamber 74, and the equipment chamber 74 is embedded into the intra-ring hole of the buoyancy chamber 67, so that the buoyancy chamber 67 and the equipment chamber 74 may be connected together by a bolt. It is possible that a limiting flange 102 is provided on the upper cover 69 of the equipment chamber or the bottom of the intra-ring hole of the buoyancy chamber 67 to prevent the equipment chamber 74 from falling relative to the buoyancy chamber 67; or, the inner surface of the intra-ring hole of the buoyancy chamber or the outer side face of the equipment chamber is a conical surface with a thicker upper part and a thinner lower part, and the equipment chamber is wedged into the intra-ring hole of the buoyancy chamber.

Another way is an overlay way (not shown). That is, the intra-ring hole of the buoyancy chamber should be smaller than the outer contour of the equipment chamber, the bottom surface of the equipment chamber 74 is fixed on the top surface of the buoyancy chamber 67, and the fairlead on the bottom surface of the equipment chamber is mounted at the lower outlet of the intra-ring hole of the buoyancy chamber; and, the rope at the bottom end of the piston rod of the single-action hydraulic cylinder successively passes through the center hole of the equipment chamber, the intra-ring hole of the buoyancy chamber and the fairlead mounted at the bottom end of the buoyancy chamber, and is extended downwards to be connected to the rope control device.

The reason why the floating body is designed as two separable parts (i.e., the equipment chamber and the buoyancy chamber) is mainly for the convenience of maintenance. With reference to FIG. 12, when it is necessary to maintain the equipment chamber, the bottom surface of the buoyancy chamber 67 only need to be connected with the rope control frame 13 by a rope 44, and joint pieces below the rope 24 and on the frame 13 of the rope control mechanism, i.e., a lifting eye 75 and a hook 70, are separated from each other, so that a crane on board hooks the lifting eye at the top end of the tripod 75 so as to hoist the equipment chamber onto the board. The rope control mechanism 13 is suspended in the water by the rope 44 without sinking. In order to avoid the inclination of the annular floating body 67, it is preferable that there are a plurality of ropes 44 and the mooring points of the ropes are distributed circumferentially and evenly.

FIG. 20 shows a pressure difference reset B-type WEC with a single floating body. The WEC includes a plunger cylinder 2, a floating body 1 and a fairlead 11. Specifically, the floating body 1 is a swimming ring structure with a square section. The cylinder body of the plunger cylinder 2 is erected above the plunger rod 3. The tail end of the cylinder body of the plunger cylinder 2 is fixed at a hole on the top surface of the floating body 1, and the top end of the plunger rod 3 of the plunger cylinder 2 is connected to the center of the top edge of a rectangular steel frame 111. The plunger cylinder 2 and the plunger rod 3 thereof are always enclosed by four sides of the rectangular steel frame 111. Two upright borders and the bottom border of the rectangular steel frame 111 always do not contact with the top surface and the wall of the center hole of the floating body 1. The center on the bottom side of the rectangular steel frame 111 is connected to the top end of a rope 24, and the other end of the rope 24 successively passes through a vertical center hole of the floating body 1 and the fairlead 11 mounted below the center hole of the floating body and is then extended downwards to be connected to the rope control mechanism 79. In FIGS. 20 and 21 and attached atlas thereof, the generator G and the hydraulic system (except for the plunger cylinder) are all arranged in the chamber of the floating body (in all the accompanying drawings herein, the content enclosed by the rounded rectangular dashed box should be indicated by an arrow at its corresponding position). The principle is as follows: the pressure in the high pressure accumulator>>the pressure in the low pressure accumulator>the atmospheric pressure. When the rope control mechanism 79 is locked, the rectangular steel frame 111 and the plunger rod 3 connected thereto do not move in the vertical direction, the floating body 1 drives the cylinder body of the plunger cylinder 2 to move up and down, and the plunger cylinder 2 moves up and down relative to the plunger rod 3. When the plunger cylinder 2 moves up, the high pressure hydraulic oil extruded by the plunger successively passes through the exit-only check valve (through which oil is only allowed to exit from the plunger cylinder chamber), an oil filer and the high pressure accumulator, then pushes the hydraulic motor to rotate so as to drive the generator to generate electricity, and enter the low pressure accumulator. When the floating body 1 falls with the wave, the pressure difference between the pressure in the low pressure accumulator and the atmospheric pressure will generate an upward thrust on the piston. Since the height of the plunger rod 3 remains unchanged and the plunger cylinder 2 moves down relative to the plunger cylinder 3, the plunger is reset, and the hydraulic oil will enter the plunger cylinder 2 from the low pressure accumulator through a enter-only check valve (through which oil is only allowed to enter the plunger cylinder). Such a cycle is repeated.

As described above, the bottom end of the cylinder body of the plunger cylinder 2 may also be connected at a hole on the top surface of the floating body by a lug/hinge shaft/ earring. With reference to FIG. 21 and the attached sectional views F-F', E-E' and partial views A-1, A-2 thereof, the bottom end of the cylinder body of the plunger cylinder 2 is connected to the top surface of the floating body 1 through a lug 114. If the plunger cylinder 2 is not constrained in a direction F-F', a guiding roller set 82 is additionally provided on two opposite sides perpendicular to the unconstrained/ degree-of-freedom direction F-F' on the vertical border of the rectangular steel frame 111 (upper and lower sides of the rectangular steel frame are short shafts 64, left and right sides are square steels 113, and the short shafts 64 penetrates into holes of the square steels 113). The bracket of the guiding roller set 82 is mounted on the top surface of the floating body 1. The guiding roller set 82 is a pair of cylindrical rollers, whose axes are parallel to each other and whose end faces are aligned at a certain distance. The two cylindrical rollers closely abut (but there is also a certain gap such as 2 mm to allow the rectangular steel frame to be slightly inclined) two opposite sides of the vertical border of the rectangular steel frame 111, so that the vertical border is sandwiched between the two cylindrical rollers.

The design principle is as follows: the connection of the bottom end of the plunger cylinder 2 with the floating body 1 may be designed to be movable (lug/hinge shaft/earring), the top edge of the rectangular steel frame passes through a hole at the top end of the plunger rod 3, and the top edge is in clearance fit with the hole so that the top edge is allowed to rotate in the hole. However, this will cause the plunger cylinder 2 to be free and unconstrained in a certain direction. Once the rectangular steel frame 108 is pressed, the plunger cylinder 2 will be immediately inclined. Therefore, it is necessary to additionally provide the guiding roller set 82. The guiding roller set 82 limits the horizontal swing of the rectangular steel frame 111 in the degree-of-freedom direction, so that the rectangular steel frame 111 always coincides with the section of the axis of the plunger cylinder 2. When the rectangular steel frame is pressed and if the top end of the rope 24/square tube 108 shakes, the rectangular steel frame will be finely adjusted in the angle of inclination along with the plunger cylinder 2 to avoid the bending moment and protect the plunger cylinder 2.

In FIG. 21, the bottom end of the cylinder body of the plunger cylinder 2 is connected to the floating body 1 through a lug 114. With reference to the partial view A-1, a pair of guiding rollers 82 is located between two vertical borders 113 of the rectangular steel frame, and closely abuts inner side faces of the left and right vertical borders 113, respectively. Axes of the two rollers 82 are horizontal, and this pair of rollers 82 limits the swing of the rectangular steel frame 111 relative to the cylinder body of the plunger cylinder 2 in the direction E-E'. Although the lug has a certain rigidity to resist against the swing in this direction, since the tension of the rectangular steel frame is too large, and the width of the lug is limited, and thus the anti-overturn torque is limited, it is preferable to additionally provide the guiding roller set in the direction EE'. Two pairs of guiding rollers 82 are provided in the direction FF', and two vertical borders of the rectangular steel frame pass through the two pairs of guiding rollers (referring to FIG. 21A-2) to limit the swing of the rectangular steel frame relative to the hydraulic cylinder 1 in the direction FF'. It is to be noted that the guiding roller set 82 may be replaced with a pair of limiting rods. The limiting rods may be rigid solids of any shape and arranged at the positions of the rollers 82 to achieve the same limiting effect. However, the limiting rods should have smooth surface to reduce the friction between the limiting rods and the rectangular steel frame 111.

In FIGS. 20 and 21, a hydraulic tube 35 connected to an oil inlet/outlet port at the bottom end of the plunder cylinder penetrates from the top cover of the floating body 1. Preferably, the cylinder cover at the top end of the cylinder body of the plunger cylinder 2 is securely fixed to a bottom port of a vertical short tube with a sealed joint. The vertical tube is sheathed on the plunger rod with a gap to the plunger rod. The oil drain tube 115 is led out from the side face of the vertical tube and then penetrates into a chamber from the top cover of the floating body 1, and finally enters an open oil tank. The hydraulic oil drained from the plunger cylinder 2 oozes from a seal ring on the top, is then accumulated in the vertical short tube, and flows away along the oil drain tube 115 on the side face. Since the cylinder body of the plunger cylinder 2 is stationary relative to the floating body 1, the oil drain tube 115 will not swing up and down like the oil drain tube shown in FIG. 12. Preferably, the electric charge pump driven by the electricity generated by the wave generator sucks the hydraulic oil from the open oil tank and then injects the hydraulic oil into the closed hydraulic circulation system. Further, an MCU and an auxiliary power supply circuit are additionally provided. The MCU controls the turn-on/turn-off of the electric charge pump according to the signal sent by the liquid level sensor in the open oil tank/the pressure sensor in the closed hydraulic circuit system.

With reference to FIG. 21 and the attached atlas thereof, the rope 24 and the fairlead 11 in FIG. 20 are replaced with a square tube 108 and double fairleads 11 (i.e., schemes 2-3). Specifically, the midpoint of the bottom border of the rectangular steel frame 111 is changed to be connected to a vertical square tube 108. The square tube 108 passes through upper and lower fairleads 11 mounted on the bottom of the floating body 1. The bottom end of the square tube 108 is securely fixed to the top surface of the rope control mechanism 79. Four rollers of the fairleads 11 closely abut four side faces of the square tube 108 one by one.

For the single floating body & pressure difference reset type A, a square tube and double fairleads may also be used. For example, in FIG. 12 (the scheme of the square tube is not shown), the bottom end of the piston rod 3 extended below the single-rod piston cylinder is changed to be connected to the top end of a vertical square tube. The square tube passes through upper and lower fairleads mounted on the bottom of the floating body 67, and the bottom end of the square tube is securely fixed to the top surface of the rope control mechanism. Four rollers of the fairleads closely abut four side faces of the square tube one by one.

The schemes 2-3 may also be applied to various WECs in the Application No. CN 103104408 A. For example, in FIG. 1, the rope 24 and the fairlead 11 are replaced with a square tube and double fairleads. The bottom end of the piston rod 3 of the hydraulic cylinder is connected to the top end of the square tube, the square tube passes through two fairleads mounted at a certain vertical distance on the bottom of the floating body 1, and the bottom end of the square tube is connected to the frame 13 of a rope control device (the schemes 2-3 are not shown in FIG. 1 and the rope control device may be various types therein).

The principle is as follows: taking the section B/–B' of FIG. 21 as example, the upper and lower fairleads 11 serve as guide rails for limiting the swing of the square tube 108 and guiding the upward and downward movement. The square tube 108 transfers the tension, and the rope control mechanism 79 and the WEC are integrated into a whole. In this way, the stability of the rope control mechanism 79 in the water is greatly improved; and for the semi-closed housing only with an opening only at the bottom, the leakage of gas inside is reduced. Meanwhile, since the lead from the floating body to the rope control mechanism may also pass through the square tube, so the lead is protected.

The electric cable 12 is a twisted-pair cable. The electric cable 12 starts from the chamber of the floating body 1, penetrates out the floating body 1, then extends from the top end port of the square tube 108 to the bottom end port of the square tube 108, enters the semi-closed housing of the rope control mechanism, and is finally connected to an electric brake 16. In order to avoid the friction between the electric cable 12 and the top end port of the square tube 108, a vertical thin straight tube 109 is sheathed outside the electric cable. The top end of the thin straight tube is connected to the bottom end of the cylinder body of the plunger cylinder 2, and the thin straight tube is inserted into the square tube 108. When the distance from the cylinder body of the plunger cylinder 2 to the square tube 108 is maximal, the thin straight tube 109 should still be partially inserted into the square tube 108, so that the electric cable 12 is protected. A segment of the electric cable 12 is a spiral cable 121 to adapt to the change in the distance from the thin straight tube 109 to the rope control mechanism.

For the single floating body & pressure difference reset type A or B, preferably, a vertical tube may be additionally provided on the bottom of the floating body, the fairleads are mounted in the vertical tube, and the space not occupied by other components in the tube is filled with a foam material. With reference to FIG. 21 and the attached atlas thereof, a vertical tube 71 is mounted on the bottom of the floating body 1, the axis of the vertical tube 71 coincides with the center line of the center through hole of the floating body 1, and the upper and lower fairleads 11 are mounted on the top and bottom in the vertical tube 71, respectively. The vertical tube is made into a cylindrical shape, so it is easy to clean attachments, and it is easy to paint. Since the foam material is filled in the vertical tube, the buoyancy can be enhanced, and the space that can be attached by marine organisms can be reduced.

In addition, in FIG. 21 and the attached atlas thereof, there are two limit blocks, wherein one limit block is fixed on an outer side face of two vertical borders of the rectangular steel frame 111, and another limit block is fixed at the bottom end of the cylinder body of the plunger cylinder 2. When the rope control device is not triggered, the rope control mechanism 79 and the square tube 108, the rectangular steel frame 111 and the plunger rod 3 connected thereto remain unchanged in height, and the floating body 1 drives the plunger cylinder 2 to move up and down. When the floating body 1 rises and the plunger cylinder 2 moves close to the endpoint of the working stroke, the top surface of the floating body 1 collides with the limit block 106 on the rectangular steel frame 111. At this time, the limit block 106 made of steel exactly abuts a stroke ending sensor 9 (i.e., a metal proximity switch), the stroke ending sensor 9 sends a signal to the MCU, and the MCU controls a Solid State Relay (SSR) of a closed-loop circuit to be turned on. At this time, the current of the power supply drives the electric brake 16 of the rope control mechanism through the electric cable 12, and the rope control mechanism 79 releases the rope.

When the floating body 1 drives the plunger cylinder 2 to fall and the plunger cylinder 2 approaches the endpoint of the reset stoke, the limit block 106 at the bottom end of the cylinder body of the plunger cylinder 2 collides with the top end of the square tube 108, achieving the limiting effect and avoiding the damage to the plunger cylinder.

Section III: Another rope control hydraulic cylinder WEC refers to a double floating body gravity reset type WEC, which is divided into Type A and Type B. The structure of the Type A (refer to FIG. 18) is as follows: a hollow upright column 81 (cylindrical) is vertically placed, with its top-end opened and bottom-end closed. An annular floating body 80 is sleeved on the upright column 81, and a certain gap is left between the inner wall of the annular floating body 80 and the side surface of the upright column 81. At the top surface of the annular floating body 80, an upright Π bracket 83/(or a three-legs bracket) is fixed, so that the center line of the Π bracket 83/three-legs bracket coincides with the axis of the upright column 81, a piston rod handle of an upright single-acting piston cylinder 2 is connected to the center flexible/universal 84 at the surface of beam bottom of Π bracket 83 (or three-legs bracket). The end of the cylinder of the single-acting piston cylinder 2 and the bottom surface inside the column cavity can be connected by a flexible/universal connection, and a chain+pad connection is also used. Specifically, the end of the cylinder of the piston cylinder 2 is connected to the bottom of the cavity of the upright column 81 by the chain 22 (or two locking rings hooked to each other). On both sides of the chain 22, two cushion blocks 89 are fixed on the bottom of the cavity of the upright column 81. Because the chain 22 can be pulled but can not be pressed, if it is pressed, the piston cylinder 2 may be biased to one side, and the piston cylinder 2 will move up and down, resulting in loss of wave height utilization. After the cushion blocks 89 is used, when the piston cylinder 2 is pressed downward, the cushion blocks 89 can support the cylinder of the piston cylinder 2. Similarly, the cushion blocks 89 may also be applied to other places in the present specification that have flexible connections and are under stress conditions. The hydraulic system circulation route is: an open oil tank 72, an enter-only check valve, a rod chamber of the single-acting piston cylinder, a exit-only check valve, an accumulator, a hydraulic motor. The hydraulic motor drives the generator to generate electricity;

Preferably, if the diameter of the upright column 81 is too small, and the buoyancy is insufficient, the bottom end of the upright column 81 can be fixedly connected to a cylindrical/ellipsoidal underwater buoyancy chamber 52 to increase the buoyancy, and their center lines coincide. Preferably, the upright column 81, or the bottom end of the underwater buoyancy chamber 52 (if any) is fixedly connected to the top end of a vertical rod/vertical tube 71, and their centerlines are coincident; The upright column 81, the underwater buoyancy chamber 52, and the vertical rod/vertical tube 71 is a unit that is consolidated together and is the column assembly. The bottom end of the column assembly is connected to the rope control device 13.

Figure 19:
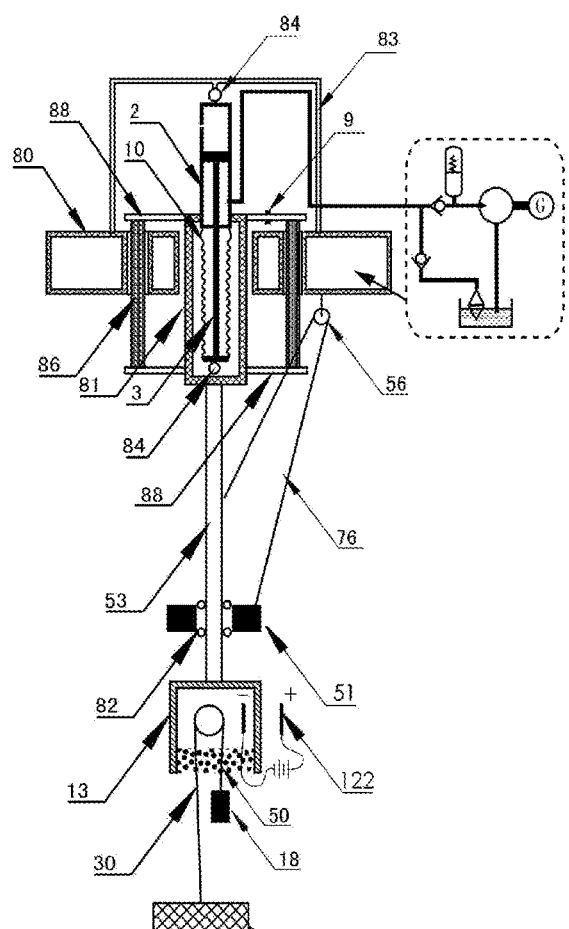
FIG. 19: a schematic diagram of a double floating body gravity reset type B WEC (with a hydraulic system mainly installed on an annular floating body shown)

The hydraulic system is mounted within the upright column 81 or within the underwater buoyancy chamber 52. If the piston cylinder 2 is inverted, the hydraulic system is installed in the annular floating body 80. As shown in FIG. 19, the hydraulic tube from the port of the piston cylinder 2 extends upwardly against the cylinder of the piston cylinder 2 to the top beam of the Π bracket 83, and then One side extends, then goes down along the Π bracket leg 83 on one side, and finally enters the chamber of the annular float 80.

Figure 18:
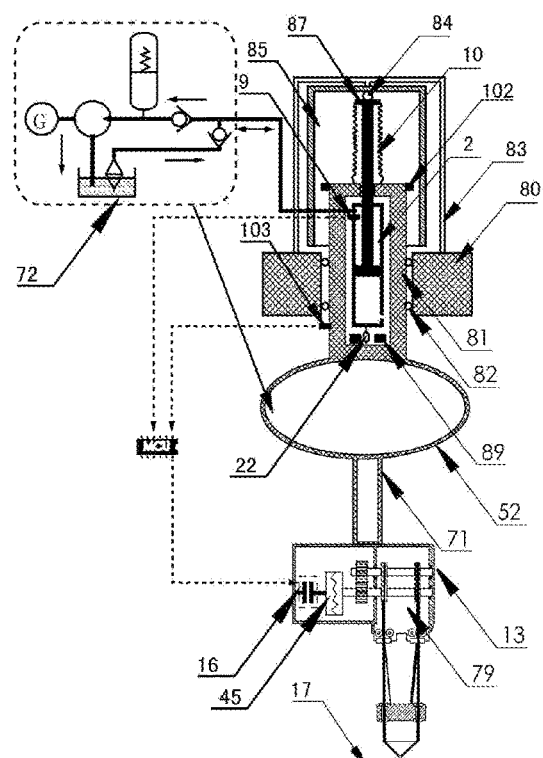
FIG. 18: a schematic diagram of a friction wheel group rope control mechanism and a double floating body gravity reset type A WEC.

Principle: As shown in FIG. 18, in the small wave, when the rope control device 79 is in the braking state, the up and down movement of the annular floating body 80 does not reach the end point of the up and down stroke; when the wave falls, the annular floating body 80 will fall with the wave. However, the column assembly and the rope control mechanism 79 should have sufficient net buoyancy together to ensure that the upright column 81 does not fall with the wave at such a small wave height. Thus, the annular floating body 80 falls relative to the column ensemble. Because the piston rod of the piston cylinder 2 and the cylinder body end are connected to the Π bracket 83 and the bottom of the upright column 81, respectively, so that the piston cylinder 2 is compressed, so that the piston cylinder extracts hydraulic oil from the open oil tank 72 through the check valve. When the wave rises, the annular floating body 80 applies an upward pulling force to the column assembly through the Π bracket 83 and the piston cylinder 2, Since the rope control device 79 locks the length of the rope between the frame of the rope control mechanism 13 and the gravity anchor 17, the upright column 81 cannot move upward, so the annular floating body 80 rises relative to the column assembly. At this time, the piston cylinder 2 is pulled to extrude the high-pressure hydraulic oil, and the high-pressure hydraulic oil passes through the outlet valve and the accumulator, drives the hydraulic motor to rotate and flow to the open oil tank 72, successively. The hydraulic motor drives generator to generate electricity.

However, if the amplitude of the waves exceeds the above conditions, the rope control device will respond. For example, if the wave rises, the annular floating body 80 has risen to reach the stroke limit, and the rope control device releases the rope (about the rope control device, which is explained later). At this time, the upright column 81 floats up (according to the design, the net buoyancy of the column assembly and the rope control mechanism is greater than the pull-down force generated by the rope retrieving member of the rope control mechanism. Since the annular floating body 80 follows the wave surface and rises slowly, and the column assembly floats rapidly under the water, the annular floating body 80 moves downward relative to the column assembly, so that the piston cylinder 2 is compressed and reset, and then the rope control device locks the rope again. When the wave falls, first, the annular floating body 80 falls to the lowest point of the working stroke, and at this piston cylinder 2 is compressed and reset. Then if the water surface continues to fall, the net buoyancy of the annular float 80, the column ensemble and the rope control mechanism 79 will be smaller, so small that it will not be able to maintain sufficient buoyancy and has to fall with the waves. At this time, the entire WEC will have to fall, and the rope control device will take back the rope under the action of the rope retrieving member.

Figure 11:
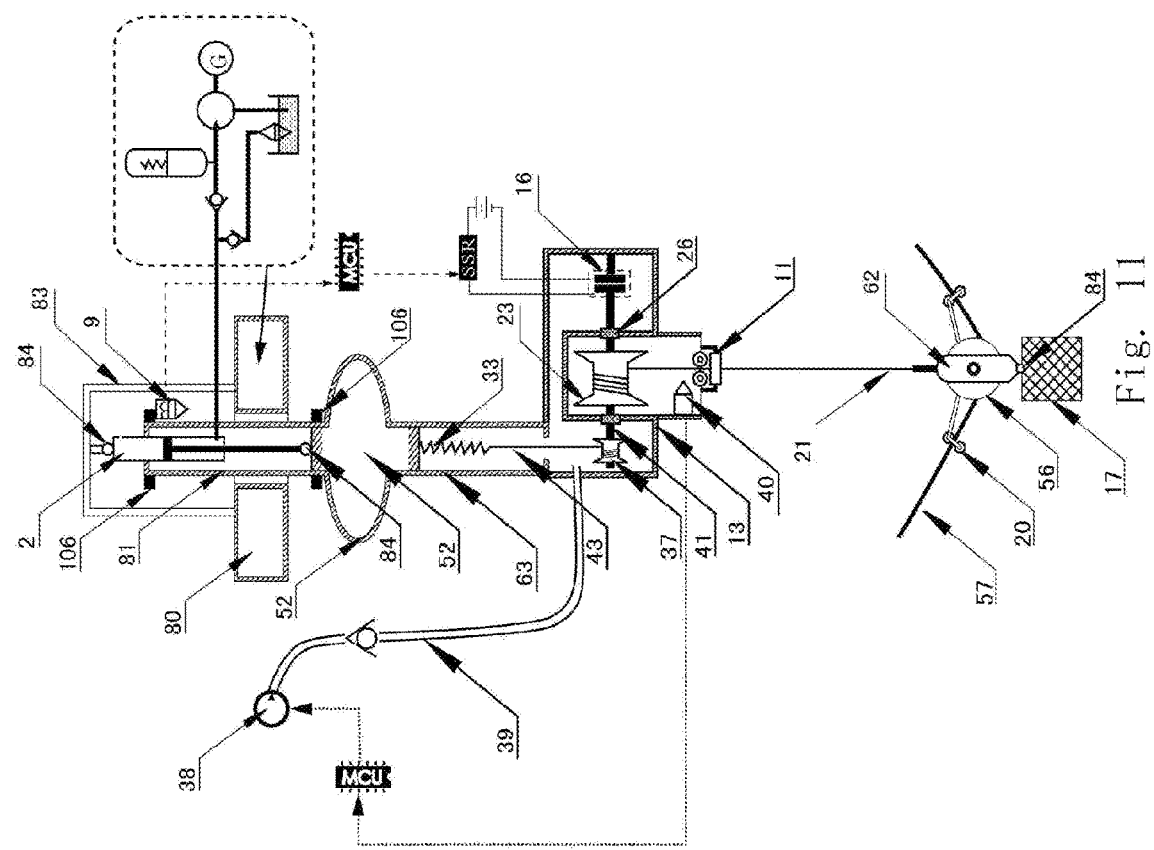
FIG. 11: a schematic diagram of a extension spring rope-retrieving type rope control mechanism, a double floating body gravity reset type WEC, and a suspended anchor.

Since the reset of the piston of the piston cylinder 2 is driven by the gravity of the annular floating body 80, it is called the double floating body gravity reset type, and the structure of the double-floating body mechanism (excluding the hydraulic system) is almost the same as the PowerBuoy of the OPT company. In addition, FIGS. 10, 11, and 14D are also such a structure.

Preferably, in order to reduce friction, two upper and lower guiding rollers 82 (FIG. 18) may be mounted on the inner ring wall of the annular floating body 80, and three or more guiding rollers 82 are evenly distributed at each layer. Thus, when the annular floating body 80 moves up and down, the guide roller 82 can roll up and down the upright column 81 to reduce the frictional resistance. Alternatively, rails can be used, as shown in FIG. 19. The upper and lower ends of the vertical two guide rails 86 are fixedly connected to the upright column 81 through the steel frame 88, and respectively pass through two vertical straight holes on the annular floating body 80. On the surface of the guide rail 86 and the inner wall of the vertical straight holes of the annular floating body 80, a material (such as polytetrafluoroethylene) having a low coefficient of friction is coated.

In addition, for the up and down movement of the annular floating body 80 a limited position mechanism is supposed to be installed. Of course, the piston cylinder itself can also have a limited ability. When the annular floating body 80 rises/falls to a certain extent, the piston will hit the cylinder. However, this is not good for the piston cylinder, so the limit block should be specially set (see the limit block 106 mounted on the upright column 81 in FIG. 11). For FIG. 18, The top of the underwater buoyancy chamber 52 or the H shaped bracket 83 can serve as a lower stroke limit block, and the upper limit of the stroke of the annular float 80 can be a flange 102 added to the top end of the upright column 81. For FIG. 19, the upper and lower steel arms 88 of the guide rail 86 can serve as the upper and lower limit blocks of the annular floating body 80.

A double-floating gravity reset B type WEC is illustrated in FIG. 19, which is mostly the same as the structure of the A-type. The difference is: The column ensemble and the rope control mechanism 79 may not necessarily maintain a sufficient net buoyancy, or even a specific gravity greater than water, but adds a pulley weight mechanism. Specifically, the pulley bracket of the pulley 56 is connected to the bottom surface of the annular floating body 80. One end of the rope 76 is connected to a weight 51, and the other end extends upward, and bypasses the pulley 56 and then extends downward, and finally is attached to the column ensemble 81. (only one side pulley 56 and rope 76 is shown, Actually it should be 2 sets of pulley and rope, and they are symmetrical with respect to the axis of the column.). The top end of the rope control device 79 is connected to the bottom end of the column ensemble.

Principle: As shown in FIG. 19, the rope control device 79 is in braking state in the small waves, and the length of the rope between the column and the gravity anchor 17 is fixed. The up and down motion of the annular floating body 80 does not reach the end of the up and down motion stroke. At this time, the wet weight of the weight 51 (its gravity minus the buoyancy in the water) exerts a pulling force on the rope 76. The pulling force is along the rope 76, and pulls upwards the column 81 after passing around the fixed pulley 56. As long as the wet weight of the weight 51 is large enough, it can be guaranteed: rope 76 provides sufficient upward pull to the column ensemble, so that the column ensemble and the rope control device 79 does not sink, even if the column ensemble and the rope control device 79 has a specific gravity greater than water. In this way, the column can neither be up nor down (the rope control device locks the length of the rope which cannot be stretched). Therefore, the column ensemble becomes a stable relative motion reference point. The annular floating body 80 fluctuates with the waves, and moves up and down with respect to the column 81, and It drives the piston cylinder 2 to stretch or retract through the Π bracket 83. When the piston rod of the piston cylinder 2 is stretched, the high-pressure hydraulic oil is exported from the piston cylinder 2, and stabilized by the accumulator, and drivers the hydraulic motor driven to rotate to generate electricity. When the piston rod of the piston cylinder 2 retracts, the pressure of the rod chamber of the piston cylinder 2 drops, the hydraulic oil enters the piston cylinder 2 from the open tank through the enter-only check valve under the action of atmospheric pressure.

Let me talk about the case where the movement of the annular floating body 80 exceeds the working stroke in the case of a large wave. When the wave rises, the annular float 80 reaches the highest point of the stroke. At this point the rope control device is activated and releases the rope. (For the rope control device, please see the following explanation). The column ensemble is released, and rises (Because, according to the design, the upward pulling force of the wet weight of the weight 51 on the column ensemble is greater than the pull-down force generated by the rope-retrieving member 18 of the rope control device against the column), The annular floating body 80 follows the wave surface upwards and slowly, and the column ensemble quickly floats upwards under water, so the annular floating body 80 moves downward relative to the column ensemble. Therefore, the piston cylinder 2 can be compressed and reset. After a while, the rope control device enters the braking state again.

And when the surface of the big waves falls, first, the annular floating body 80 falls to the lowest point of the stroke, and the piston cylinder 2 is stopped at the end of the stroke. IF the water surface continues to drop, the annular floating body 80 cannot continue to descend relative to the column ensemble due to the limit. When doing mechanical analysis, the annular floating body 80, the column ensemble, the rope control mechanism frame and the weight 51 can be simplified into an object. When the water level drops, the subject's buoyancy drops and will have to fall. At this time, the rope control device retrieves the rope under the action of the rope retrieving member.

Preferred: see FIG. 19, the weight 51 is annular and sleeved on the vertical rod 53. And the inner side of the ring of the weight 51 maintains a gap with the side of the vertical rod 53. Each of the two sides of the weight 51 is connected with a rope 76 (only one set is shown). The other ends of the two ropes 76 extend upward, and then extend downwardly after passing around a pulley 56 above it, respectively. Finally the two ends of the two ropes are connected to the vertical rod 53 below the column 81. The pulley bracket of the two pulleys 56 is connected to the bottom surface of the annular floating body 80, and the two connection points are symmetrical with respect to the axis of the column 81. Further preferably, two upper and lower layers of guiding roller sets 82 are installed in the inner of the ring of the weight 51, and more than three guiding rollers are installed on each layer evenly. The purpose of the design is to let the vertical rod 53 serve as guide rail for the weight 51 to avoid unconstrained swaying of the weight 51.

Section IV: according to the above-mentioned double-floating weight-reset type WEC, single-float pressure-difference-reset type WEC, preferred: also includes a tension spring oscillator mechanism. The purpose is to let the spring oscillator mechanism resonates with a certain wave condition, thereby, the floating body 1 falls deeper and rise higher, Specifically:

For double-floating weight reset type B WEC, a tension spring is inserted between the weight and the rope, That is, the weight is connected to one end of the tension spring, and the other end of the tension spring is connected to one end of the rope. For the double-floating gravity reset type A WEC, see FIG. 10, the structure is: one end of a tension spring 33 is connected to the weight 51, and the other end of the tension spring 33 is connected with the rope 76. The other end of the rope 76 extends upward, passing around a pulley 56 and then extending downward to attached to the column 81 finally, The pulley bracket of the pulley 56 is connected to the bottom surface of the annular floating body 80.

For a single floating body differential pressure reset type A WEC, see the left side of FIG. 9, the structure is: one end of a cord 76 is attached to the frame 13 of the rope control device, and the other end of the cord 76 extends upwardly around a pulley 56 and then extends downwardly and is attached to one end of the tension spring 33. The other end of the tension spring 33 is connected to a weight 51. The pulley bracket of the pulley 56 is connected to the bottom surface of the floating body 1.

For the single-float differential pressure reset type A WEC in FIG. 12, the center of the bottom of the floating body is fixedly connected with a vertical pipe 71, The weight 51 is annular and is sleeved on the vertical tube 71; Two upper and lower guiding rollers 82 are mounted on the inner wall of the ring of the weight 51, More than 3 guide rollers are distributed at each layer evenly. The weight 51 moves up and down with the upright pipe 71 as a guide rail. Since the floating body and the rope control mechanism are connected by the rope 24, the equipment chamber 74 with vertical tubes 71 may perform various tilting movements. To avoid wearing the rope 76, add the following design: the pulley 56 is mounted at the hole in the upper portion of the vertical tube 71, and the axis section vertical tube which the hole is located in is perpendicular to the axis of the pulley 56. The pulley 56 is half exposed outside the vertical tube and half is in the vertical tube. The tension spring 33 is connected to the weight 51 at one end and to the rope 76 at the other end. The other end of the rope 76 extends upwards and passes around the pulley 56 in the hole, and then enters the vertical tube 71 and extends downwardly, passes through the respective fairlead 11 (all fairleads 11/double roller chocks 20 in this disclosure are not multi-rope shared) at the bottom end of the vertical tube 71, and then extends downward to finally be connected with the housing of the control rope control mechanism 13.

In addition, the weight 51 can also adopt other constraint mechanisms. AS shown in the left side of FIG. 9, the upper and lower two guiding slip rings 77 are installed on the left and right sides of the left weight 51. A cord 76 passes through each of the slip rings 77 on each side, One end of each rope 76 is connected to the frame 13 of the rope control mechanism, and the other end extends upward, and passes around the respective pulleys 56, and then extends downward to be connected to one end of the same tension spring 33. The other end of the tension spring 33 is connected to the weight 51. The pulley bracket of the two pulleys 56 is connected to the bottom surface of the floating body. The weight 51 is prevented from swinging and rotating by the two tensioned ropes 76. For the right d block 51, it is mounted on the guide rail 86, the bottom end of the guide rail 86 is connected to the rope control mechanism through a flexible/universal connection 84. The top end of the guide rail 86 is connected to one end of a cord 76. The other end of the cord 76 extends upwards and passes around the pulley 56, and then extends downward to be connected to one end of a tension spring 33. The other end of the tension spring 33 is connected to the weight 51. The pulley bracket of the pulley 56 is connected to the bottom surface of the floating body 1 by a flexible/universal connection 84. The guide rail 86 is a restraining mechanism that guides weight 51. Of course, the two restraining mechanisms of FIG. 9 can also be applied to a single floating body differential pressure reset type B, double floating body weight reset type WEC.

For a single floating body differential pressure reset type B WEC, as shown in FIG. 21B cross-sectional view E-E', the structure is: one end of a rope 76 is attached to the frame 79 of the rope control device, and the other end extends upward. After bypassing a pulley 56. it extends downward to be connected to one end of the tension spring 33. The other end of the tension spring 33 is connected to a weight 51. The pulley frame of the pulley 56 is connected to the bottom surface of the floating body 1. Preferably, the weight 51 is annular and is sleeved on a vertical pipe 71 fixed at the bottom of the center hole of the floating body 1, and there is a certain gap between the inner ring wall of the weight 51 and the vertical pipe 71.

For the above-mentioned spring-oscillator system applied to single-float differential pressure type A, B type, and double-floating body force reduction type A and B, if the weight as a spring vibrator moves up and down along the vertical tube, it is further preferred: two upper and lower layers of guiding rollers 82 are mounted on the inner ring wall of the weight 51, and each layer of guide rollers 82 is more than three and evenly distributed. This will reduce the resistance to exercise.

Section V: The WEC part of the rope-controlled hydraulic cylinder has been mainly described above, and the rope control device will be described below. The rope control device includes a rope control electrical module and an actuator. The rope control electrical module is a control portion, and the actuator also called a rope control mechanism is a mechanical portion of the rope control device. The rope control mechanism includes a linear-rotary motion conversion and auxiliary mechanism and an electric brake. The frame of the rope control mechanism in this section is connected to the WEC above the rope control mechanism. This is different from CN103104408A. A main shaft of a rotating member of the linear-rotary motion conversion mechanism is mounted on the frame by the bearing & housing. There are three types of the linear-rotary motion conversion and auxiliary mechanism.

The first type is a roller sprocket and roller chain type. With reference to FIGS. 9 and 10, the rope control mechanism has the following structure: the bottom end of the frame 13 of the rope control mechanism is securely fixed to the top end of a vertical straight cylinder 63; a counterweight 18 is arranged in the straight cylinder 63 with a gap to the inner wall of the straight cylinder 63; one end of a roller chain 93 is connected to the counterweight 18 serving as a rope retracting member, while the other end thereof upwardly bypasses the roller sprocket 92 and continuously extends downward into the straight cylinder 63 to be connected to one end of a rope 24; and, the other end of the rope 24 continuously extends downward after passing through a vertical through hole on the counterweight 18, and then continuously extends downward to be tied onto a gravity anchor 17 after passing downward through a fairlead 11 at a bottom inlet of the straight cylinder 63.

The second type is a round link sprocket and welded chain type, or a friction wheel and rope type. Referring to FIG. 1, one end of a welded chain 22 is connected to the gravity anchor 17 of the wave generator with the rope-controlled hydraulic cylinder (the welded chain 22 in this figure is connected to the gravity anchor by a F-shaped guiding rod), while the other end thereof passes upward through a fairlead 11 mounted at the bottom end of the frame 13 of the rope control mechanism, then bypasses the round link sprocket 29, passes downward through another fairlead 11 mounted at the bottom end of the frame 13 of the rope control mechanism, and continuously extends downward to be connected to a counterweight 18.

The round link sprocket and the welded chain may also be replaced with a friction wheel and a rope. With reference to FIG. 6, one end of a rope 34 is connected to the gravity anchor 17 of the wave generation system with the rope-controlled hydraulic cylinder, while the other end thereof passes upward through a fairlead 11 mounted at the bottom end of the frame 13 of the rope control mechanism, then bypasses the friction wheel 48 (there are a plurality of friction wheels in this figure, but they may be regarded as one friction wheel for the moment), passes downward through another fairlead 11 mounted at the bottom end of the frame of the rope control mechanism 13, and continuously extends downward to be connected to a counterweight 18.

The third type is main and secondary drums type. With reference to FIG. 2, specifically, a main drum 23 and a secondary drum 37 are coupled through a main shaft 41 (or linked through a gear/chain transmission); one end of a main rope 21 is fixed and wound on the main drum 23, while the other end thereof passes downward through a fairlead 11 mounted at the bottom end of the frame 13 of the rope control mechanism and continuously extends downward to be eventually connected to the gravity anchor 17 of the wave generator with the rope-controlled hydraulic cylinder; one end of a secondary rope 43 is fixed and wound on the secondary drum 37, while the other end thereof passes through another fairlead 11 mounted at the bottom end of the frame 13 of the rope control mechanism, and finally is connected to a counterweight 18; and, the torque generated on the main shaft 41 by the tension of the main rope 21 and the torque generated on the main shaft 41 by the tension of the secondary rope 43 are opposite in direction. The counterweight 18 may also be replaced with an extension spring (referring to FIG. 11, the other end of the extension spring 33 is fixed on the frame 13, and the fairlead through which the secondary rope passes may be omitted in this case).

In the above drawings, the rotating member (roller sprocket/friction wheel/round link sprocket/main drum) of each of the three types of linear-rotary motion conversion mechanisms is coupled to the rotor of the electric brake 16 through the main shaft 41 or linked with the rotor of the electric brake 16 through a transmission (referring to FIG. 2), and the stator of the electric brake 16 is fixed on the frame 13. The rope 24/welded chain 22/main rope 21 between the rotating member of the linear-rotary motion conversion mechanism and the gravity anchor 17 of the rope-controlled hydraulic cylinder wave generator is defined as an energy harvesting line, which is "the elongated member that is controllable member during the relative motion between the elongated member and the frame" mentioned above. The rope 24/welded chain 22/secondary rope 43 between the rotating member of the linear-rotary motion conversion mechanism and the counterweight 18 is defined as a reset line.

The principle is as follows: the rope control electrical module energizes/de-energizes the electric brake 16, so that the electric brake 16 is in a braked/released state. In the braked state, the rotor of the electric brake 16 is locked and unable to rotate, and the rotating member of the linear-rotary motion conversion mechanism coupled or linked thereto is also unable to rotate. Therefore, the energy harvesting line 30 cannot be pulled out or retracted relative to the frame 13 without changing the length. As a result, the length of the energy harvesting line between the frame 13 of the rope control mechanism and the gravity anchor 17 is fixed, and the height of the frame 13 of the rope control mechanism is stabilized, so that the offshore floating body of the WEC can use the frame 13 as a relative motion reference point to collect and convert the wave energy.

When the electric brake 16 is in the released state, the rotor can rotate, and the rotating member of the linear-rotary motion conversion mechanism coupled or linked thereto can also rotate. At this time, the energy harvesting line can be retracted or pulled out relative to the frame 13. The torque generated on the main shaft 41 by the tension of the rope retracting member (counterweight 18/extension spring 33) through the reset line and the torque generated by the tension of the energy harvesting line are opposite, just like a tug-of-war, where the rotation will turn to a side that is stronger. When the floating body of the WEC rises with the frame of the rope control mechanism, the tension of the energy harvesting line wins. Thus, the energy harvesting line is elongated while the reset line is shortened. In this case, if the electric brake 16 is locked by the rope control electrical module, the height between the frame 13 of the rope control mechanism and the gravity anchor 17 is higher than before, so that the reference point (i.e., the frame of the rope control mechanism) reaches a new height. However, when the floating body of the WEC falls with the frame of the rope control mechanism, the distance between the frame 13 of the rope control mechanism and the gravity anchor 17 is shortened, and the tension of the energy harvesting line disappears. At this time, the rotating member of the linear-rotary motion conversion mechanism is rotated under the action of the rope retracting member so as to tension the energy harvesting line. If the electric brake is locked by the rope control electrical module at this time, the distance between the frame 13 of the rope control mechanism and the gravity anchor 17 is fixed and shorter than before. The operating principle of the rope control mechanism has been described above.

Section VI: For the rope control mechanisms of the round link sprocket+welded chain type, the friction wheel+rope type, and the main and secondary drum type using a counterweight as a rope retracting member, preferably, an anti-entanglement mechanism for preventing the entangling of the energy harvesting line and the reset line is additionally provided, mainly including:

The first type is a single catenary chain lateral pulling type. With reference to FIG. 6, one end of a catenary chain 22 is tied onto the counterweight 18, while the other end thereof extends downward to one side to be eventually connected to a gripping anchor 46. The catenary chain may be placed with a rope, and the counterweight is tied in the middle of the rope.

Figure 13:
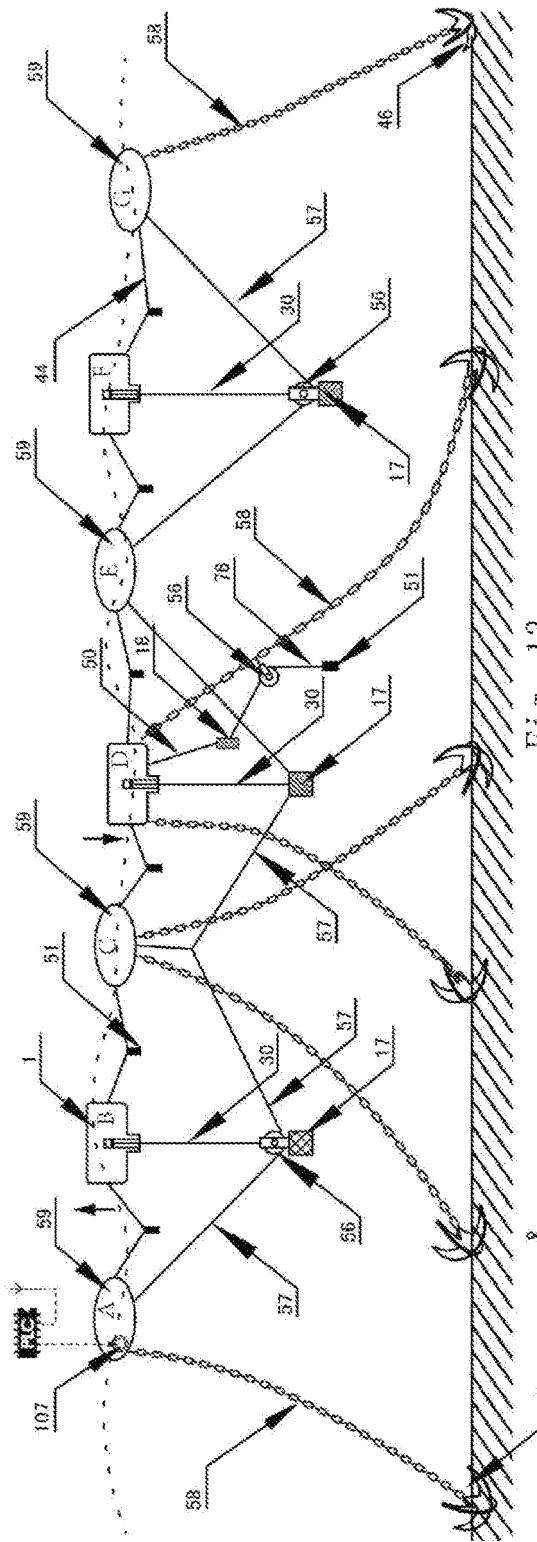
FIG. 13: a schematic diagram of a series of multi-wave generators with suspended anchors when working.

The second type is an anchor chain pulley lateral pulling type. With reference to FIG. 13, below the floating body D of the WEC: one end of a cord 76 is connected to the counterweight 18, while the other end thereof extends downward to one side at a certain distance and then extends downward after passing by a pulley 56 to be eventually connected to a weight 51. The pulley bracket of the pulley 56 is flexiblebly/universally connected to a middle segment of an anchor chain 58 in a mooring system used for anchoring the floating body (which may be other buoys) of the WEC. The counterweight 18 may also be omitted, so the reset line 50 is directly connected to one end of the rope 76, and the weight 51 serves as the counterweight for collecting the rope.

The third type is a side-buoy pulley lateral pulling type. The side buoy is a buoy near the floating body of the WEC. With reference to FIG. 14, a buoy C (the buoy C belongs to a suspended anchor array, and other buoys around the floating body B may also be used as a side buoy) is additionally provided at a certain distance around the floating body B of the rope-controlled wave generator. The floating body B and the buoy C are moored somewhere. One end of a rope 76 is tied on the counterweight 18, while the other end thereof extends below the buoy C and then extends downwards after passing by a pulley 56 to be eventually connected to a weight 51. The pulley bracket of the pulley 56 is connected to the bottom surface of the buoy C through a second rope 49. The counterweight 18 may also be omitted, the reset line 50 is directly connected to the rope 76, and the weight 51 serves as a counterweight for retrieving the rope.

The fourth type is a submerged-buoy pulley lateral pulling type. One end of a rope is connected to the counterweight, while the other end thereof extends downward to one side and then extends upward after passing by a pulley to be eventually connected to an underwater float. The pulley bracket of the pulley is connected to another anchor through a second rope. Or, the counterweight is omitted. That is, the reset line from the floating body is directly connected to one end of a rope; the other end of the rope extends downward to one side, then bypasses a pulley and is eventually connected to an underwater float; and the pulley bracket of the pulley is connected to another anchor through a second rope.

For the above four types of the anti-entanglement of double ropes mechanism which applies lateral tension to the counterweight 18 by the weight 51/underwater float, the principle is as follows: the wet gravity of the weight 51/the catenary chain 22 generates tension on the rope 76, the tension has a component force on the counterweight 18 in the horizontal direction, and the horizontal component force always makes the counterweight 18 deviate to this side, so that the reset line and the energy harvesting line are separated apart to avoid entangle each other.

Preferably, for the above four types, the rope 76 (or catenary chain 22) for laterally pulling the counterweight 18 may be connected to the counterweight 18 through a rigid straight rod 61, rather than being directly connected to the counterweight 18. With reference to FIG. 14, the rope 76 is connected to one end of the rigid straight rod 61, and the other end of the rigid straight rod 61 is in flexible/universal connection 84 to the counterweight 18. The advantage of doing this is that, even if the counterweight 18 occasionally swings to the left side of the energy harvesting line 30, the counterweight 18 still cannot rotate about the energy harvesting line 30 as long as the right end of the rigid straight rod 61 is still located on the right side of the energy harvesting line 30. This is because the rigid straight rod 61 is not bendable. The addition of the rigid straight rod 61 further improves the entanglement resistance, and the flexible/universal connection 84 enables the rigid straight rod 61 to change angle along with the rope 76 so as to avoid the generation of bending moment on the counterweight 18.

The fifth type is a type using a single energy harvesting line and double reset lines. With reference to FIG. 4, the linear-rotary motion conversion mechanism is the main and secondary drum type and includes a main drum 23 and two coaxial and identical secondary drums 37. The main rope 21 passes through a vertical through hole on the counterweight 18, and the through hole passes through the geometrical center and the center of mass of the counterweight. The counterweight is cylindrical or cubic or other eudipleural solids, and two secondary ropes are tied onto left and right sides of the counterweight, respectively.

The principle is as follows: since the vertical hole passes through the geometrical center of the counterweight 18, the impact force from the sea current will not generate torque. Meanwhile, since the vertical hole passes through the center of mass of the counterweight 18, the inertia force of the counterweight will also not generate torque when the main rope 21 shakes. In a case where the counterweight 18 is rotated, the two secondary ropes 43 will be entangled with each other, but will be automatically unentangled due to the gravity of the counterweight 18. Preferably, fairleads/double-roller chocks 20 are mounted at upper and lower inlets of the through hole, and the main rope passes through the fairleads/double-roller chocks 20 to reduce the friction.

The sixth type is a multi-rope guiding type. With reference to FIG. 2, the rope control mechanism has two sets of main drums 23 (or round link sprockets/friction wheels) which are identical and coaxial and arranged at a certain axial distance, and the related energy harvesting lines 21. The two energy harvesting lines 21 pass through the respective fairleads 11/double-roller chocks mounted at the bottom end of the frame 13, then continuously extend downward, and pass through two vertical holes formed at a certain distance on the counterweight 18 to be eventually connected to the gravity anchor 17. The principle is as follows: the two tensioned energy harvesting lines 21 are used as guide rails to guide the counterweight 18 to move up and down. During the self-rotation of the counterweight 18, the two energy harvesting lines 21 apply a reverse torque to the counterweight 18 to prevent the rotation of the counterweight 18.

Preferably, double-roller chocks 20 (or fairleads) for guiding the rope to enter or exit are mounted at upper and lower outlets of the vertical hole on the counterweight 18 to reduce the friction of the rope. However, this design in FIG. 2 may result in uneven tension of the two energy harvesting lines 21 since the frame 13 of the rope control mechanism swings and inclines in the water. To address this problem, preferably, a tension equipartition mechanism is introduced. The tension equipartition mechanism has the following three designs.

Design 1: a pulley is used. With reference to FIG. 2B, the two energy harvesting lines 21 that extends downward from the rope control mechanism and are to be connected to the gravity anchor 17 are instead merged into one line above the gravity anchor 17 and pass by a pulley 56. The pulley bracket of the pulley 56 is then connected to the gravity anchor 17 through a rope, and the pulley 56 allows the tension of the two energy harvesting lines 21 to be always the same.

Design 2: with reference to FIG. 7, the two energy harvesting lines 30 are not connected to the gravity anchor 17 first and are instead connected to two ends of a rigid straight rod 61 first, and the rigid straight rod 61 is connected to the gravity anchor 17 through a V-shaped rope. That is, two top ends of the V-shaped rope 55 are connected to two ends of the rigid straight rod 61, respectively, and the bottom end of the V-shaped rope 55 is in flexible/universal connection 84 to the gravity anchor 17. In this design, it is also required that the rope control mechanism is connected to the WEC through a U-ring/a single rope/a V-shaped rope (see below) to realize the uniform distribution of the tension.

Design 3: with reference to FIG. 2A, the two energy harvesting lines 21 are directly connected to the gravity anchor 17; the WEC is connected to the rope control mechanism through a U-ring 14; the front side of the frame 13 of the rope control mechanism is securely fixed to one end of a short shaft 64, while the rear side thereof is also securely fixed to one end of another short shaft; the two short shafts are coaxial, and the two short shafts are inserted into two holes on the U-ring 14, respectively; the outer side of the middle segment of the U-ring 14 is connected to the WEC; the axes of the short shafts are perpendicular to a connection line between the positions of the two fairleads 11 through which the two energy harvesting lines 21 pass, and coincides with the midpoint of the connection line. It can be known from the mechanical analysis that the point of force application is always on the center line of the two energy harvesting lines, and the two energy harvesting lines are equal in tension.

For the design 2, the connection between the WEC and the frame of the rope control mechanism may employ a U-ring/single rope/V-shaped rope connection mode. The U-ring connection is the connection mode in the design 3. The single rope connection (FIG. 2) is as follows: one end of a welded chain 22 is connected to the WEC while the other end thereof is connected to a mooring point at the top end of the frame 13 of the rope control mechanism, and the mooring point should be located at an intersection of the center line FF' of the two energy harvesting lines (the two straightened energy harvesting lines 21 determines a plane, and a straight line in this plane is located between the two energy harvesting lines, is parallel to the both and has an equal distance from the both, and this straight line is a center line FF') with the top end of the frame of the rope control mechanism. The V-shaped rope connection mode is as follows: with reference to FIG. 7, the plane of the V-shaped rope 55 above the frame 13 of the rope control mechanism should be parallel to the two straightened energy harvesting lines 30, the bottom end of the V-shaped rope 55 is placed on the extension line of the center line FF', and the two top ends of the V-shaped rope are connected to the top end of the frame 13 of the rope control mechanism. It can be known from the mechanical analysis that, in this scheme, the point of force application is always on FF' and the two energy harvesting lines are equal in tension.

IF both the connection between the rope control mechanism and the WEC and the connection between the rope control mechanism and the gravity anchor employ the scheme using the V-shaped rope, the plane of the V-shaped rope 55 and the plane of the two parallel energy harvesting lines may be at any angle, but they are coincident in FIG. 7. In this figure, the linear-rotary motion conversion mechanism is a friction wheel 48 and energy harvesting lines 30. It is likely that the lengths of the two energy harvesting lines 30 pulled out are not equal. In this case, it can be known through analysis that the energy harvesting line 30 with larger pulled-out length is less pulled and the energy harvesting line with smaller pulled-out length is more pulled, so that the energy harvesting line with smaller pulled-out length has more slide friction and comes up with the energy harvesting line with larger pulled-out length, and the two energy harvesting lines are the same in length. That is, this scheme has a function of automatically adjusting the lengths of the two energy harvesting lines.

The seventh type is a double-catenary-chain and stop rod type. With reference to FIG. 5, anchor chains 22 are tied on two sides of the counterweight 18 connected to the reset line 50, respectively, and the two anchor chains are bifurcated downward to two sides; the other end of each anchor chain 22 is connected to a gravity anchor 17/a holding power anchor 46 (the anchor chains 22 may also be replaced with anchor cables, but a weight should be tied in the middle of each anchor cable). It is also possible to omit the counterweight 18, so the reset line 50 is directly connected to two anchor chains 22 (or anchor cables) to form an inverse Y-shaped structure.

The principle is as follows: in this scheme, the rotation of the counterweight 18 about the energy harvesting line 30 is prevented by the collision of the catenary anchor chains 22 with the energy harvesting line 30, so that the mutual entanglement of the energy harvesting line and the reset line is prevented. Apparently, no matter how the counterweight 18 moves, the energy harvesting line 30 is always located on one side of the connection line of the two anchor chains 22. However, in order to prevent the wear of energy harvesting line 30, a lower half of the energy harvesting line 30 may be replaced with a rigid straight rod 61, and the bottom end of the rigid straight rod 61 is in flexible/universal connection 84 to the gravity anchor 17, so that the rigid straight rod 61 can be inclined freely.

The eighth type is a straight cylinder guiding type (not shown). The frame of the rope control mechanism is a semi-closed housing with an opening on its bottom surface. The bottom surface of the housing is connected to a vertical sliding cylinder, and the top port of the vertical sliding cylinder is communicated with the housing cavity of the rope control mechanism. There is a gap reserved between the counterweight and the sliding cylinder. The fairlead through which the reset line above the counterweight passes is omitted, and the fairlead through which the energy harvesting line passes is mounted on the outer side of the bottom of the sliding cylinder. Apparently, the sliding cylinder limits the reset line and the counterweight therein, so the mutual entanglement of the reset line and the energy harvesting line is avoided. Meanwhile, since the fairlead through which the energy harvesting line passes is mounted on the outer side of the bottom of the sliding cylinder, the friction and entanglement between the energy harvesting line and the sliding cylinder is also avoided.

The ninth type is passing through a suspended anchor type. With reference to FIG. 14, a suspended anchor (i.e., a gravity anchor) 17 below the floating body D is suspended in the water by two cables 57. The reset line 50 passes through a vertical through hole on the gravity anchor 17 and then continuously extends downward to be connected to the counterweight 18. Similarly, the reset line 50 below the floating body B of the WEC may also adopt a similar anti-entanglement mechanism, but the pulley bracket of the pulley 56 is required to be securely fixed to the gravity anchor 17. Additionally, the frame 13 of the rope control mechanism should be constrained from rotating. It is possible that the WEC is securely fixed to the frame of the rope control mechanism or the floating body of the WEC is connected to the frame of the rope control mechanism by ropes on two sides in order to prevent the relative rotation of the WEC and the frame of the rope control mechanism. Also, the floating body of the WEC also needs to be constrained from rotating by itself. The floating body of the WEC in this figure is drawn by third ropes 44 on two sides and is thus unable to rotate by itself.

The principle is follows: during the self-rotation of the gravity anchor, the cables 57 on two sides of the suspended anchor 17 will generate a reset torque to suppress the self-rotation.

Therefore, the gravity anchor 117 does not rotate by itself. In this way, for the reset line 50, the upper end is constrained by the fairlead/double-roller chock on the bottom of the frame of the rope control mechanism, and the lower end is constrained by the vertical through hole on the gravity anchor, so the reset line cannot be entangled with the energy harvesting line 30. Preferably, fairleads 11/double-roller chocks are mounted at upper and lower inlets of the through hole, and the reset rope line 50 passes through the fairleads/double-roller chocks. In this way, the friction applied to the reset line 50 can be reduced.

The tenth type is a F-shaped guiding rod type. With reference to FIG. 1, the lower half of the energy harvesting line (welded chain 22) is replaced with a F-shaped guiding rod 19. That is, the energy harvesting line is first connected to a right-angle inflection point of the F-shaped guiding rod 19, and the bottom end of the long rod portion of the F-shaped guiding rod 19 is connected to the gravity anchor 17 through a pair of mutually hooked lock rings 84. The reset line (the welded chain between the rope control frame 13 and the counterweight 18) passes through the fairlead 11/double-roller chock mounted at the outer end of the short rod of the F-shaped guiding rod. A vertical through hole is formed on the counterweight 18. The long rod portion of the F-shaped guiding rod passes through the fairleads 11 mounted at the upper and lower outlets/inlets of the vertical through hole. The long rod portion of the F-shaped guiding rod 19 has a rectangular cross-section, and four side faces of the long rod portion closely abut four rollers of the fairlead 11 on the counterweight 18 one by one, respectively.

The principle is as follows: the long rod portion of the F-shaped guiding rod 19 serves as a guide rail for allowing the counterweight 18 to move up and down, and the fairlead 11 on the counterweight 18 is equivalent to a roller for guiding, so that the counterweight will not rotate relative to the F-shaped guiding rod 19. Since the F-shaped guiding rod 19 is connected to the gravity anchor 17 through a pair of lock rings (one lock ring is securely fixed to the bottom end of the F-shaped guiding rod, while the other lock ring is securely fixed to the gravity anchor), the F-shaped guiding rod cannot rotate at a large angle. Therefore, as long as the angle of rotation of the frame 13 of the rope control mechanism is limited (the available self-rotation limiting method refers to the anti-entanglement mechanism of the ninth type), the energy harvesting line and the reset line above the F-shaped guiding rod will not be entangle with each other.

The anti-entanglement mechanism in this section may also be applied to other similar rope anti-entanglement occasions on the sea, for example, FIG. 6, FIGS. 7 and 2C in US20130200626, the tow rope 3 in FIG. 1 of CN101344063A, and the energy harvesting line and the reset line in Application No. 201610523880X.

Section VII: For the rope control mechanism using the friction wheel+rope as the linear-rotary motion conversion mechanism, there may be more than two friction wheels to form a friction wheel set. With reference to FIG. 7, a front view of the friction wheel set (FIG. 6 is an axial view, but there are five friction wheel units), there are two energy harvesting lines 30, and one of the energy harvesting lines 30 is in friction fit with two friction wheels. The friction wheel 48 is coupled to a gear 47 through a shaft. The friction wheel 48, the gear 47, the shaft 41 and the bearing & housing 54 form a friction wheel & gear unit. The shaft 41 is mounted on the frame 13 of the rope control device through the bearing & housing 54. Two identical friction wheel & gear units have parallel axes, same directions and aligned end faces and are sequentially and adjacently mounted on the frame 13, and the gears of the two friction wheel & gear units are meshed with each other. However, the diameter of the outer edge of each friction wheel 48 is less than the diameter of the reference circle of the gear 47, the friction wheels 48 do not contact with each other. The gear 47 of one unit in the friction wheel set is in shaft connection to the rotor of the electric bake 16 (through an overrunning clutch in this figure), and each rope (i.e., the energy harvesting line 30) successively bypasses the friction wheels 48 in each friction wheel & gear unit in a zigzagged manner. In addition, the gears of the two friction wheel & gear units may be different in diameter and the two friction wheels may also be different in diameter, but the ratio of the diameter of the friction wheel to the diameter of the gear in each friction wheel & gear unit is the same. As shown in FIG. 6, the gears of the friction wheel gear units A, B are different in diameter and the friction wheels A, B are also different in diameter, but the ratio of the diameter of the gear A to the diameter of the friction wheel A is equal to the ratio of the diameter of the gear B to the diameter of the friction wheel B. Preferably, a plurality of (e.g., 5) friction wheel & gear units are mounted according to the above rules of parallel, same direction and aligned end faces, and the gears of the friction wheel gear units are meshed serially (similar to the connection of carriages of a train), i.e., A-B-C-D-E. A rope 24 bypasses the friction wheels of each friction wheel & gear unit in the meshing order in a zigzagged manner, and the shaft 41 of only one friction wheel & gear unit in the whole friction wheel set is in shaft connection to the rotor of the electric brake. The principle is as follows: when the electric brake 16 is in the braked state, the main shaft 41 in shaft connection thereto is unable to rotate, the gear 47 on the shaft 41 is also unable to rotate, and all gears 47 meshed or indirectly meshed with this gear 47 are unable to rotate, so all friction wheels are unable to rotate. At this time, when a tension is applied to the rope 24, each friction wheel 48 in the whole column will generate a friction force to the rope 24, so that the rope can generate a larger friction fore, and the same effect as winding the rope on a column at multiple circles is achieved. On the side where the counterweight 18 is located, a very small force is only required to resist against a very large force on the side where the gravity anchor 17 is located. When the electric brake 16 is in the released state, the main shaft 41 in shaft connection thereto can rotate, and all gears 47 and friction wheels 48 can rotate, so that the rope 24 can drive the friction wheels 48 in the whole column to move. Since the friction wheels wound by the rope 24 must be equal in linear velocity and the gears are meshed with each other, the all the gears are also equal in linear velocity. When the gears are not equal in diameter, it is still possible that all the gears are equal in linear velocity and all the friction wheels are equal in linear velocity, as long as the ratio of the diameter of the gear to the diameter of the friction wheel in each friction wheel unit is the same.

Preferably, the electric brake 16 is coupled to the first friction wheel & gear unit on the side where the reset line 30 is located. Advantageously, when the electric brake 16 is locked, the floating body of the WEC rises and falls with the wave, and the energy harvesting line 30 will be subjected to a varying tension pulse; every time the floating body rises, the tension of the energy harvesting line 30 is increased and the energy harvesting line 30 is extended somewhat (although the rope 24 may be UHMWPE but is still extended slightly); and, every time the floating body falls, the energy harvesting line 30 is less tensed and retracted somewhat. The meshing transmissions of the all gears have a clearance, that is, a gear is fixed and adjacent gear can still freely rotate slightly. At the first tension peak of the energy harvesting line 30, all the friction wheels will be rotated to certain angles by the friction force, and all the friction wheels at the angles generate a frictional resistance against the rope 24 (the friction force is different in magnitude and successively decreases in an order of ABCDE). When the tension of the energy harvesting line 30 is decreased, the energy harvesting line is retracted; and, due to the clearance, the energy harvesting line drives each friction wheel (except for E, because the shaft of E is in shaft connection to the electric brake 16 and the electric brake 16 is in the braked state) to reversely rotate at a certain angle (the angles of reverse rotations are different and successively decrease in an order of ABCD, because the former friction wheel may superimpose a clearance angle on the angle of reserve rotation of the latter friction wheel) by the friction. During this process, there is static friction between the friction wheels 48 and the rope 24. When the rope 24 is tensioned again, the friction wheels A, B, C and D 48 are also rotated with the rope 24 to the angles at the previous tension peak, and there is still static friction between the friction wheels 48 and the rope 24. As a result, the sliding friction of the rope on the friction wheels is avoided, and the rope 24 is protected from wear.

The combination of the friction wheel set 48, the rope 24 and the electric brake 16 may also be applied to other occasions where the release and retraction of the rope needs to be controlled. The electric brake 16 may also be manual. In order to prevent the disengagement of the rope from the friction wheels due to the inclination of the rope, preferably, fairleads 11 may be mounted, on the frame, at positions where the rope 24 enters and exits the friction wheel set. It is to be noted that the gravity of the counterweight 18 in FIG. 6 is used as the tension for retracting the rope, but the tension for retracting the rope may also be generated in other ways, such as a hand, an extension spring or the like.

The windlass 107 in FIGS. 13 and 14 functions to control the release and retraction of the rope, so the windlass 107 may also be replaced with the mechanism "friction wheel set+rope 24+electric brake 16+frame 13+fairlead 11+counterweight 18" in FIG. 6.

Section VIII: For the wave generators (not limited to the wave generator mentioned herein) that do work by using the relative motion between the floating body on the water surface and the underwater gravity anchor, the gravity anchor may use the suspended anchor scheme. As shown in FIGS. 13 and 14, the following schemes are available.

Directly-connected suspended anchor: for the floating body B in FIG. 13 and the floating body D in FIG. 14, buoys C and E are moored on two sides of the floating body, each buoy is tied with a cable 57, and the other end of each of the two cables 57 is connected to the gravity anchor 17 of the WEC.

2) Pulley suspended anchor: for the floating bodies B and F in FIG. 13 and the floating body B in FIG. 14, buoys 59 are moored on two sides of the floating body, two ends of a cable 57 are respectively tied onto the two buoys 59, the middle portion of the cable 57 bypasses a pulley 56 close to the gravity anchor 17, the bottom end of the pulley bracket of the pulley 56 is connected to the top surface of the gravity anchor 17 of the WEC, and the energy harvesting rope 30 from the top to be connected to the gravity anchor 56 is instead connected to the top end of the pulley bracket 56.

Figure 17:
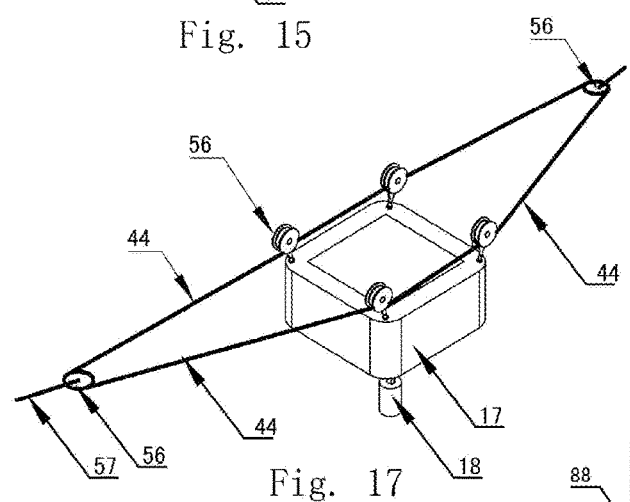
FIG. 17: a structural diagram of a double-ropeway suspended anchor.

3) Double-ropeway suspended anchor: with reference to FIG. 17, the gravity anchor 17 is a horizontal cube, and pulleys 56 are mounted at four vertices of the top surface of the gravity anchor 17, respectively, so that there are two pulleys 56 on each of two opposite edges of the top surface of the gravity anchor. The pulleys 56 (*two*) on each opposite edge roll on one ropeway 44. The two ropeways 44 are merged on the left side of the gravity anchor 17 and pass by a pulley 56, and the pulley bracket of the pulley 56 is connected to the cable 57 for suspending the gravity anchor on the left side. The same is also applicable to the right side, and the left and right sides are symmetrical. The pulleys 56 on two sides uniformly distribute the tension applied to the cable 57 by the buoys to the two ropeways 44, and the two ropeways 44 provide an upward tension to the pulleys 56 through which the ropeways 44 pass through and which are mounted on two edges of the gravity anchor, so that the gravity anchor 17 is suspended in the water.

4) Lateral-passing-by suspended anchor: with reference to FIG. 23, the gravity anchor 17 is a horizontal cube, fairleads 11 are mounted in upper portions of front and rear side faces of the gravity anchor 17, and two guiding pulleys 56 are mounted on two vertical edges on the right side of the gravity anchor 17. A cable 57 successively passes through the rear fairlead 11, bypasses the guiding pulley 56 on the right rear edge and the guiding pulley 56 on the right front edge, and passes through the front fairlead 11. The two fairleads 11 and the two guiding pulleys 56 have the same distance from the top surface of the gravity anchor 17. The suspended cable 57 equivalently bypasses one side of the gravity anchor, and the point of force application is located on the fairleads on the two sides. Apparently, by means of the fairleads and the guiding pulleys, the gravity anchor 17 can slide along the cable 57.

5) Stretcher suspended anchor: with reference to FIG. 29, two parallel rigid straight rods 61 with aligned end faces respectively pass through two transverse through holes that are formed at a certain distance on the gravity anchor 17. Left ends of the two rigid straight rods 61 are securely fixed to a steel frame 88, while right ends thereof are securely fixed to another steel frame 88. Suspended cables 57 on two sides are connected to the steel frames 88 on two sides through a V-shaped rope 55, respectively. That is, two vertices of the V-shaped rope 55 are connected to two ends of the steel frames 88, and the bottom end of the V-shaped rope 56 is connected to the suspended cables 57. The suspended cables on two sides provide an upward tension to the two rigid straight rods, and the rigid straight rods provide an upward lifting force to the gravity anchor, like a stretcher. The gravity anchor may slide left and right by using the rigid straight rods as guide rails.

In the above three suspended anchor schemes 3), 4) and 5), the other ends of the suspended cables 57 on two sides of the gravity anchor are connected to two buoys that are moored on the water surface at a certain distance, and the floating body of the WEC is moored between the two buoys, similar to the suspended anchor schemes 1) and 2). For the above five suspended anchor schemes, the wet weight of the gravity anchor is greater than the upward tension of the WEC when it does work, the maximum buoyancy that can be provided by the two buoys is greater than the wet weight of the gravity anchor, and it is better to have sufficient redundant reserve buoyancy.

The principle is as follows. With reference to FIG. 14, the gravity anchor 17 is suspended in the water by the buoys 59 on two sides, and the upward and downward motion of the gravity anchor 17 depends on the motion of the buoys 59 on two sides. The buoys 59 on two sides are often more than ten meters away from the floating body 1 and subjected to a different wave force from that of the floating body 1, so the motion of the gravity anchor 17 is completely different from the motion of the floating body 1, and the wave generator can utilize the relative motion of the floating body 1 and the gravity anchor 17 to generate electricity. When the tension of the energy harvesting line 30 is very small or even 0, the wet weight of the gravity anchor 17 is almost borne by the buoys 59; however, when the tension of the energy harvesting line 30 is very large, a part of the wet weight of the gravity anchor 17 is borne by the floating body 1, and the tension of the cables 57 become smaller. Therefore, the buoys 59 should be flat. Accordingly, the change in draft depth of the buoys 59 caused by the change in tension of the cables 57 is small, so that the amplitude of the upward and downward motion of the gravity anchor 17 can be reduced and the loss of wave height utilization can be reduced. As we all know, if the gravity anchor 17 is fixed on the seabed, the sea current will make the floating body 1 deviate too far from the gravity anchor 17. As a result, the energy harvesting line 30 of the floating body 1 is inclined too much, and the power generation using waves is influenced. This problem is addressed by the suspended anchor scheme. In the directly-connected suspended anchor mode, if the floating body 1 moves in a longitudinal direction (in the queue of the buoys and the floating body), the gravity anchor 17 cannot move longitudinally since it is directly connected to the cables 57 on two sides. When the floating body 1 moves in a transverse direction, the floating body 1 provides a horizontal component force to the gravity anchor 17 through the energy harvesting line 30. This component force enables the gravity anchor to do a transverse motion with the floating body 1 (because the cables 57 on two sides of the gravity anchor 17 are not constrained in the transverse direction). With the transverse movement of the cables 57, the resultant force of the cables 57 on two sides of the gravity anchor 17 will have a horizontal reset force that gradually increases. Finally, the horizontal component force provided to the gravity anchor 17 by the cables 57 on two sides of the gravity anchor 17 counteracts the horizontal component force to be provided to the gravity anchor 17 by the floating body 1, and the gravity anchor 17 will not continuously move transversely with the floating body 1. Therefore, the transverse pursuit of the gravity anchor 17 for the floating body 1 has a certain limit range.

For the suspended anchor schemes 2), 3), 4) and 5), during the longitudinal movement of the floating body 1, the floating body 1 pulls the gravity anchor 17 obliquely upward through the energy harvesting line 30, and a horizontal component force will be generated. Due to the presence of the pulley 56/fairlead 1/rigid straight rod 51, the gravity anchor 17 can longitudinally move along the cable 57, so that the gravity anchor 17 can always be located below the floating body 1 (of course, it has a certain inclination, but the inclination is not large) and the suspended anchor has the ability to pursue the floating body in both the transverse and longitudinal directions. However, the longitudinal movement also has a certain range. When the gravity anchor 17 longitudinally moves to a certain side, the resultant force of the tensions of the cables 57 on two sides of the gravity anchor 17 generates a gradually increasing horizontal reset component force for allowing the gravity anchor to return to the center of the cables. Finally, the movement of the gravity anchor 17 cannot keep pace with the floating body 1, so the energy harvesting line 30 is inclined at a large angle.

Preferably, in the above suspended anchor schemes, the floating body 1 is connected to the buoys 59 by ropes 44 (as shown in FIG. 13). In this way, the floating body 1 and the buoys 59 are pulled by each other as a whole. During movement, the floating body 1 will be pulled by the buoys 59 on two sides, so that the floating body is prevented from deviation too much. As a result, the transverse and longitudinal pursuit motion of the gravity anchor below the floating body 1 is avoided from reaching the limit. With reference to FIG. 14, the buoy A is of a streamlined droplet type with a horizontal axis (similar to a submarine) to reduce the horizontal impact force from the seawater, and an empennage 123 is mounted at the tip end of the buoy so that the buoy A automatically adjusts the direction by means of the sea current. A lifting swivel ring/8-shaped swivel ring 120 is mounted on the bottom of the buoy A, and the bottom end of the lifting swivel ring/8-shaped swivel ring 120 serves as a connection point to other ropes 44, cables 57 and mooring chains/cables.

Preferably, with reference to FIGS. 13 and 14, floating bodies of a plurality of wave generators are arranged in a row, buoys 59 are arranged between the floating bodies and at the head and tail of the queue, anchor chains 58 are tied onto the buoys 59 at the head and tail, and the other ends of the anchor chains 58 extend to the outer side of the queue to be eventually connected to an anchor 46. Further, preferably, the floating bodies 1 are connected to the buoys 59 by ropes. All the buoys 59 and the floating bodies 1 are connected in series as a whole, so that it is convenient for anchoring and management. Weights 51 are tied onto the ropes connecting the floating bodies and the buoys to provide buffer. The weights 51 may also be replaced with extension springs 33 to prevent the floating bodies and the buoys from sudden straightening to generate a great impact force during the operation at sea. Additionally, with reference to the right part of FIG. 14, when the floating body D approaches the buoy E, the mooring point at the weight 51 sinks and, at the position on the rope 44 near the buoy E, is most likely to come into contact with other underwater cables 57. Therefore, a float 60 is tied onto the rope 44 near the buoy E to lift the rope 44. Additionally, the floating body B and D are connected to the rope 44 through a V-shaped rope. That is, the rope 44 is connected to the bottom end of the V-shaped rope, and two vertices of the V-shaped rope are connected to the top ends and bottom ends of the floating body B and D, respectively. The V-shaped connection can enhance the inclination resistance of the floating body B.

Figure 15:
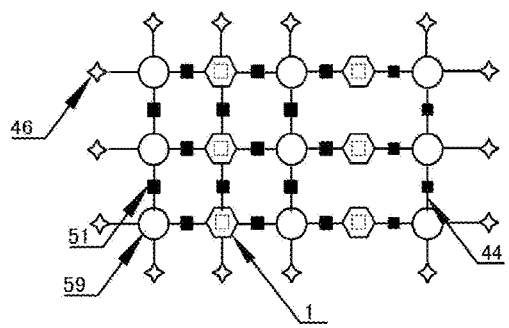
FIG. 15: a schematic diagram of a WEC square array with suspended anchors.

As shown in FIG. 13, preferably, for the buoys 59 and floating bodies 1 of the wave generators in the queue, it is also possible to throw anchor chains 58 in a direction perpendicular to the queue (a transverse direction) to enhance the resistance to transverse sea current impact. Preferably, with reference to the top view of FIG. 15, three identical queues of wave generator+buoy are transversely arranged in parallel to form a square array, where the four-pointed stars are anchors 46, the black square blocks are weights 51, the circles are buoys 59, the hexagons are WEC floating bodies 1, and the lines are ropes 44. For the floating body 1, its two sides are flexibly anchored in the transverse direction, and it is also connected to the floating bodies 1 in other queues in the longitudinal direction. On two sides of the whole square array, the floating body 1/buoy 59 is also anchored by anchors 46 in the lateral direction. Therefore, the whole square array is anchored in both the transverse and longitudinal directions, and the flow resistance is improved.

With reference to FIG. 14, since the motion of the gravity anchor 17 depends on the buoys 59 on two sides, the motion phase difference between the buoys 59 on two sides and the floating body 1 in waves may be allowed to close to 180° by appropriately adjusting the distance from the buoys 59 to the floating body 1, so that the relative motion stroke between the floating body 1 and the gravity anchor 17 can be increased. Therefore, preferably, a windlass/winch 107 that can be controlled manually or by electronic intelligence (for example, the MCU receives instructions wirelessly or according to the wave condition data sent by a wave height meter) is mounted on the buoy 59/floating body C to retract or release the rope 44 according to the sea wave condition, so that the distance between the buoy C and the floating body B is increased or decreased. It is to be noted that, when the rope 44 between the floating body B and the buoy C is shortened or enlarged, the length of the whole queue will also be shortened or enlarged. In FIG. 13, the windlass/winch 107 is mounted only on the buoy A at the head of the queue to adjust the length of the mooring chain 58. The purpose of adjusting the distance between the buoy 59 and the floating body 1 in the whole queue can also be achieved. The suspended anchor scheme in this section may also be applied to other types of wave energy generators which "use the relative motion between the floating body and the gravity anchor below the floating body to generate electricity", for example, floating-body rope wheel wave-activated generators, referring to CN2013101779808 and CN105257463A.

Section IX: This section describes an embodiment in which the frame of the rope control mechanism is mounted on a gravity anchor. Referring to FIG. 22, the gravity anchor 17 is suspended by the float 59 through the cable 57 in the water, and there is a vertical through hole in the center of the gravity anchor 17 as shown in the section D-D of FIG. 22A. The frame 13 of the rope control mechanism is located in the vertical through hole, and can be connected to the inner wall of the hole through an X-shaped chain or a annular universal connection.

The specific structure of the rack gear rope control mechanism is: a rack 94 is vertically placed and passed through the frame 13, as shown in the partial view F of FIG. 22D, and a guide rail for guiding the rack to move up and down is mounted on the frame 13 (three rollers 65 are formed in one layer, a total of two layers), and the shaft of the gear 47 meshing with the rack 94 is mounted on the frame 13 of the rope control mechanism through the bearing & seat. As shown in the partial view G of FIG. 22B, the shaft of the gear 47 is coupled to the rotor of the electric brake 16 through a bevel gear transmission 90 (either directly connected to the rotor shaft of the electric brake or through a chain transmission); Referring to FIG. 22, the bottom end of the rack 94 is connected to a counterweight 18 (the counterweight 18 can be omitted, and the pull-down force is provided by the wet weight of the rack 94 itself). The top end of the rack 94 is connected to the WEC;

Principle: see FIG. 22B, partial view G, When the electric brake 16 is in the braking state, and the gear 47 coupled therewith is locked, and the rack 94 meshed therewith is locked, and the distance between the top end of the rack 94 and the gravity anchor is fixed. The WEC can use the top end of the rack 94 as a reference point to utilize the relative motion between the floating body and the reference point for wave energy acquisition conversion. When the electric break 16 is unlocked, the gear 47 can be freely rotated, and the rack 94 meshing therewith can move up and down, and the distance between the top end of the rack 94 and the gravity anchor 17 can be changed. When the wave rises, the WEC rises with the rack 94, and when the wave falls, the WEC falls with the rack 94.

Preferably, the gears 47 are two or more of the same size. Each of the gears 47 is linked to the same main shaft 41 by a respective bevel gear transmission mechanism. All bevel gear transmission mechanisms are the same size. The main shaft 41 is coupled to the rotor shaft of the electric brake 16; principle: when the electric brake is in the braking state, each of the teeth on the rack that mesh with the gear generates a braking force on the rack, thereby Improving the utilization of the rack.

The gear transmission mechanism has meshing clearance, so it is difficult to achieve that multiple gears arrive at the best position the same time. Therefore, it is preferable that the gears 47 are connected to the respective bevel gear transmission mechanisms via the friction coupling 95. The friction coupling 95 corresponding to the gear which has been acted by force first (at this time the other gears have not yet been acted by forces) is slippery because it cannot resist the tension of the rack alone, until all the gears are in the best position. At this time, the sum of the torques transmitted by all of the friction couplings 95 together prevents the rack from moving up and down.

For the brake-bar and brake rope control mechanism, the specific structure is: see FIGS. 28 and 29, a brake bar 98 having a section of rectangular steel shape is placed vertically and passed through the upper and lower two fairleads 11 mounted on the frame 13 of the rope control mechanism, and the electronic brake calipers 99 corresponding to the brake bar 98 is mounted on the frame 13, and a weight 18 is connected to the bottom end of the brake bar 98. (The counterweight 18 can be saved, and the pull-down force is provided by the wet weight of the brake bar 98 itself). The top of the brake bar 98 is connected to the WEC.

The rope control electrical module controls the brake caliper 99, of which the structure is similar to the mechanism shown in FIG. 3, but the brake drum is replaced by the brake calipers. The slave cylinder 36 directly pushes the two brake calipers 99. Principle: When the electric caliper 99 clamps the brake bar 98, the brake bar 98 cannot move up and down relative to the frame 13. The frame 13 is connected to the gravity anchor, so the distance between the top end of the brake bar 98 and the gravity anchor is fixed. WEC can use the top of the brake bar 98 as a reference point for wave energy acquisition. When the electric control clamp 99 is released, the brake bar 98 can move up and down, and the distance between the top end of the brake bar 98 and the gravity anchor 17 can be changed. The WEC can rise and fall with the brake bar 98 up and down.

Referring to FIG. 22C, for the rack type rope control mechanism, the outer shape of the frame 13 of the rope control mechanism is the same as the U-shaped magnet, but hollow; The rack 94 is placed vertically and passes through the U-shaped middle of the frame of the rope control mechanism. Referring again to the partial view F of FIG. 22D, the shaft of the gear 47 passes through the sealing ring 26 embedded in the hole on the opposite walls of the inner side of the U-shaped frame, and enters the U-shaped frame cavity. See 22B, the electric brake 16 and the bevel gear transmission mechanism 90 are all in the U-shaped cavity.

For the brake bar type rope control mechanism, as shown in FIG. 29, the frame outline of the rope control mechanism is U-shaped like the frame of rack type. The brake bar 98 is placed vertically and passes through the middle of the U-shaped frame 13 of the rope control mechanism. The brake caliper 99 is mounted on the opposite walls of the inner of the U-shaped frame. The rope control electrical module and the like are installed in the sealed cavity of the U-shaped frame.

There are two ways to connect the above two rope control mechanisms to the gravity anchor: X-chain connection or annular cross universal connection.

The specific structure of the X-shaped connection is: see FIG. 22B partial view one ends of the two chains 22 are connected to the left side of the frame 13 of the rope control mechanism. The other ends of the two chains 22 extend to the upper left and lower left respectively, and are finally connected to the inner wall of the vertical hole of the gravity anchor 17. The same is true on the right side of the rack 13. The four chains 22 form an X word And the frame 13 is at the center.

Principle: Take a partial view G of FIG. 22B, when the frame 13 is subjected to an upward pulling force, the lower two of the X-shaped chains are pulled and clamp the frame 13. When the electric brake 16 is released, the gear 47 can rotate freely. The frame 13 does not get the upward pulling force from the rack 94, and it has a tendency to fall downward. At this time the upper two chains 22 of the X-shaped chain will hold it. At the same time, since the connection between the two sides of the frame 13 and the chain is flexible, the frame 13 can be tilted at a certain angle. This can be such that when the WEC does various movements with the top end of the rack 94, the rack 94 can be tilted without being bent.

The structure of the annular cross universal connection: see FIG. 30, a two-dimensional square ring/circle ring that lies flat on the XY coordinate plane. The center of the square ring (or round ring) is at the origin of the XY coordinates. A short shaft 64 extends outward from both sides of the square ring (or circle ring) along the X direction, respectively. The holes 96 fitted with the two shafts 64 are respectively located on opposite inner walls of the vertical hole of the gravity anchor 17 (FIG. 26). A short shaft extends inwards from each of the two inner sides of the square ring (or circle ring) along the Y direction, respectively. The two holes fitted with the shafts are located on both sides of the rope control frame 13.

Principle: FIG. 28, when the WEC is moving with the top of the brake bar 98, since the gravity anchor 17 is relatively stationary, the brake bar 98 must be able to follow the WEC for various tilting swings. Since the brake bar 98 is clamped by the fairleads 11 (as a guide rail) on the frame 13 of the rope control mechanism, the frame 13 of the rope control mechanism must also be capable of various tilting movements. The annular cross universal connection can make it capable. As shown in FIG. 30, when the frame 13 of the rope control mechanism is rotated about the X axis, the short shafts in the X direction will rotate in the hole with which it fits. The same is true for the Y direction. The annular cross universal connection is actually equivalent to the cross universal connection.

The rack 94/brake bar 98 of the above suspension-anchor-based rope control mechanism is to occupy the space above the gravity anchor, so it is impossible to adopt the pulley suspension structure as shown in FIG. 11. The connection between the suspension cable and the gravity anchor can be carried out by the aforementioned direct connection, double ropeway (FIG. 17), side around (FIG. 23), and stretcher-shaped (FIG. 26). However, there should be a vertical through hole in center of the gravity anchor center. The rope control mechanism frame is installed at the hole of the gravity anchor through the X-shaped chain 22 or the annular cross joint, and the rack 94/brake bar 98 passes through the hole of the gravity anchor.

Section X: In various rope control mechanism using the linear-rotary motion conversion mechanism mentioned in this specification, it is possible to insert an overrunning clutch 15/a torque limiter 45 into the power transmission path from the rotating member of the linear-rotary motion conversion mechanism to the electric brake. Specifically, the rotating member of the linear-rotary motion conversion mechanism is coupled to one end of the overrunning clutch 15 (for example, the main drum 23 in FIG. 4 or the friction wheel 48 in FIG. 7; in FIG. 22, the gear 47 may also be a rotating member) or one end of the torque limiter 45 (see FIG. 18), or linked with the end of the overrunning clutch 15/the torque limiter 45 through a chain/gear/belt transmission; and the other end of the overrunning clutch 15/the torque limiter 45 is coupled to the rotor of the electric brake 16. The stator of the electric brake 16 is fixed on the frame. In FIGS. 4 and 7, when the electric brake 16 is braked, the direction of rotation of the main drum and the friction wheel 48 should be the same as the direction of torque generated by the tension of the reset line (in FIG. 22, it is the same as the torque generated by the gravity of the counterweight).

During the operation process of the wave generator, sometimes, it is necessary to stop the telescopic motion of the hydraulic cylinder (for example, in the case of very small waves, the generated electricity is too small, and the reciprocating extension and contraction of the hydraulic cylinder will result in the wear of the seal ring, or the maintenance is required). For a rope control mechanism without the overrunning clutch, the MCU can control the electric brake to enter the braked state when the floating body moves to the highest point, so that the rope is not retracted and the rope cannot generate tension. However, for the rope control mechanism with an overrunning clutch, regardless of the state of the electric brake, the counterweight can retract the rope due to the unidirectional transmission of the overrunning clutch. Therefore, it is necessary to additionally provide a second electric friction brake. With reference to FIG. 4, the rope control mechanism already contains the overrunning clutch 15, the stator of the second electric friction brake 112 is mounted on the frame 13 of the rope control mechanism, and the rotor of the second electric friction brake 112 is coupled to the rotating member (i.e., the main drum 23) of the linear-rotary motion conversion mechanism or linked with the rotating member (i.e., the main drum 23) of the linear-rotary motion conversion mechanism through a chain/gear/belt transmission. When the MCU/PLC controls the second electric friction brake 112 to lock and release the electric brake 16, the second electric brake operates, and the main shaft 41 enters a braked state where the forward and backward rotations are hindered. The resistance of the second electric friction brake should be slightly greater than the tension of the counterweight 18, but is less than the tension of the energy harvesting line (i.e., the main rope 21) when it does work. When the floating body drives the rope control mechanism 13 to rise, although the second electric friction brake 112 is in the braked state, the tension of the energy harvesting line 21 can still drive the main shaft 41 to rotate, and the second electric friction brake 112 is in a sliding friction state. However, when the floating body falls, due to the weight of the counterweight is small, it is unable to break the resistance of the second electric friction brake 112 to drive the main shaft 41 to rotate, so the counterweight 18 cannot retract the rope. As a result, the main rope 21 cannot be retracted, and the main rope 21 will be bent. When the floating body rises again, the main rope 21 will be straightened from bent, and no tension is generated to pull the hydraulic cylinder. When the wave generator needs to operate again, the MCU/PLC releases the second electric friction brake 112 and also locks the electric brake 16. The scheme of the shaft-connection/linkage of the linear-rotary motion conversion mechanism and the second electric friction brake in this section may also be applied to all rope control mechanisms with the overrunning clutch mentioned in this specification.

Section XI: Preferably, for the floating-body-based rope control mechanism in the scheme 5, the frame of the rope control mechanism is a semi-closed housing with only an opening at its bottom end; and, for the suspended-anchor-based rope control mechanism in the schemes 9-1 and 9-2, the frame of the rope control mechanism is a fully-closed U-shaped housing, and the rotating member of the linear-rotary motion conversion mechanism, the electric brake and the like are all mounted in the inner cavity of the frame. Preferably, an air supply device is further included. There are the following several schemes.

First scheme: With reference FIG. 2, the structure is as follows: the frame 13 of the rope control mechanism is a semi-closed housing with only an opening at its bottom end, and the main shaft 41 and the bearing & housing 54 thereof, the electric brake 16 and the linear-rotary motion conversion mechanism of the rope control mechanism are all mounted in the inner cavity of the rope control mechanism. The air supply system includes an electric air pump 38, an air tube 39, a waterlogging sensor 40, a MCU control module and an auxiliary power supply. The electric air pump 38 is mounted in an air environment on the floating body on the sea surface. One end of the air tube 39 is connected to the exhaust port of the air pump, while the other end thereof extends into the cavity of the rope control mechanism. The waterlogging sensor 40 is mounted in the cavity of the rope control mechanism. The waterlogging sensor 40 sends information to the MCU control module through a signal line, and the MCU control module controls the turn-on/turn-off of the power supply of the air pump 38. If the electric air pump 38 is a type where air will flow back after shutdown, it is also required to connect the outlet of the air pump 38 to the air tube 39 through a check valve which is to prevent air from flowing back.

Principle: Once the water enter, the waterlogging sensor 40 sends a signal to the MCU, the MCU opens the power switch of the air pump 38, and the air pump 38 starts to operate to suck air from the atmosphere and then injects the air into the inner cavity of the rope control mechanism through the air tube 39. With the continuous injection of the air, the water inside will be drained. At this time, the waterlogging sensor detects that the water is drained, and thus sends a signal to the MCU. The MCU turns off the power switch of the air pump 38, and the air pump 38 stops operating.

Second scheme: With reference to FIG. 4, a waterlogging sensor 40, a MCU and auxiliary power supply, a solenoid valve and a high pressure gas tank 110 are included. Except for the waterlogging sensor 40, all the components are mounted in the upper portion of the cavity of the semi-closed housing 13. The mounting position of the waterlogging sensor 40 should be lower than the height of the main shaft 41. Once the water is detected, the waterlogging sensor 40 immediately sends a signal to the MCU, and the MCU controls the turn-on and turn-off of the solenoid valve. The air tube 39 connected to the outlet of the high pressure gas tank is communicated with the cavity of the housing 13 of the rope control mechanism through the solenoid valve.

Principle: Once the water is detected, the waterlogging sensor 40 immediately sends a signal to the MCU, and the MCU turns on the relay, so that the solenoid valve is powered on and the high pressure gas stored inside the high pressure gas tank 110 overflows from the air tube 39. As a result, the gas in the semi-closed housing 13 is increased, and the water entering the semi-closed housing is drained. The MCU turns on the solenoid valve for a period of time through a delay program, so that a certain amount of gas is discharged from the high pressure gas tank 110 to drain a certain amount of water. Subsequently, the MCU turns off the solenoid valve. At this time, the air tube 39 is closed, and the high pressure gas tank 110 does not release gas until the waterlogging sensor 40 detects the water again.

Third scheme: A chemical solid (e.g., calcium carbide) that generates a large amount of gas when encountering water is placed on the frame of the rope control mechanism near the main shaft.

Fourth scheme: As shown in FIG. 19, positive and negative cables (externally coated with insulating skin) with DC voltage are arranged on the rope control mechanism; the negative cables leads to the cavity of the frame and is connected to an exposed graphite electrode which is located at the main shaft and insulated from the frame; and, a graphite electrode 122 connected to the positive cable is mounted outside the housing of the frame and insulated from the frame.

Principle: Usually, since only the positive electrode is immersed in seawater, no circuit is formed. When water enters the chamber of the floating body, the water immerses the negative graphite electrode. At this time, a circuit is formed, and the seawater is electrolyzed. The positive electrode outside the housing of the rope control mechanism generates oxygen, while the negative electrode in the cavity generates hydrogen. The hydrogen removes the seawater. When the water is drained to be lower than the negative graphite electrode, the circuit is disconnected again, the electrolysis is stopped, and no gas is generated.

Section XII: The electrical control portion of the rope control device refers to FIGS. 1, 11 and 12 (the electrical portion is not shown in the remaining drawings). The rope control electrical module includes a sensor 9 for monitoring the end of the working stroke of the single-action hydraulic cylinder, an MCU control module and auxiliary power supply (not shown) and a lead (showed by the dashed line). The MCU control module acquires a signal indicating the end of the working stroke of the piston from the working stroke ending sensor and then controls the turn-on or turn-off of the power supply to the electric brake in the rope control mechanism (in FIG. 11, the SSR is a solid state relay). For the gravity reset type wave energy harvest and conversion system with double floating bodies, as shown in FIG. 11, the stroke ending sensor 9 may also be mounted on a limit block at the top end of the upright column 81, and sends a signal to the MCU when the annular floating body 80 approaches the top end. The basic functions of the rope control device are as follows.

1) When the tension of the energy harvesting line is less than the tension generated by the rope retracting member, the energy harvesting line will be retracted. It corresponds to the falling stage of the WEC.

2) When the tension of the rope is large, the energy harvesting line will be locked. It corresponds to the rising and working of the floating body of the WEC, and the rope control device is in the braked state.

3) When a release signal is received, the rope control device will release a segment of rope. It corresponds to the end of the working stroke of the hydraulic cylinder.

There may be three rope control schemes for the rope control device.

Algorithm 1: The most important task of the rope control device is to protect the hydraulic cylinder and the floating body. During the operation process of the WEC, if the working stroke of the hydraulic cylinder does not end, the stroke ending sensor does not send any signal. If the working stroke ends, the stroke ending sensor sends a signal to the MCU, and the MCU immediately controls the rope control mechanism to do a rope release action, so that the piston of the hydraulic cylinder is prevented from striking the cylinder body and resulting in damage. Subsequently, the MCU can use its own delay/timing program to brake the rope control mechanism after a period of time (e.g., 10 s or 20 s) (at this time, the floating body of the WEC may be at a peak or a trough or be ascending/descending). The above delay/timing program is a working ending protection program. In this way, the energy harvesting line of the rope control mechanism is fixed again, and the WEC works by taking a new relative reference point. Of course, the new braking point of the rope control mechanism may not be good. For example, sometimes, the length of the adjusted energy harvesting line is too large that will cause the bending of the energy harvesting line during the second half of the falling process of the floating body of the WEC, resulting in the loss of wave height utilization. However, the MCU can refer to the generated power of the WEC into the program, and makes multiple attempts (i.e., releasing the rope control mechanism again and locking the rope control mechanism after a period of time) to find a better braking point.

Algorithm 2: The working ending protection program continues to be used, but the delay time is shorter, for example 1s. Then, a probe 103 for sensing the end of the reset stroke of the hydraulic cylinder is additionally provided. This probe 103 may be mounted at the tail end of the cylinder body of the hydraulic cylinder (FIGS. 2 and 19); but for a gravity reset type WEC with double floating bodies, the probe 103 may also be mounted on the upright column 81 (FIG. 18). By using the reset ending probe 103, the MCU can determine that the floating body of the WEC has changed from falling to rising by the following method: when the piston has been reset to the endpoint and remains resident at this endpoint, the reset ending probe 103 will send a signal to the MCU (before that, the rope control mechanism is in the braked state), and the MCU considers that the floating body is falling (since the electric brake is locked, the reset ending probe 103 is impossible to always send the reset ending signal if the floating body is rising). Hence, the MCU applies a square wave pulse control to the electric brake 16, so as to allow the electric brake to be released for a period and to be braked for a period. This is similar to an Antilock Braking System (ABS) on an automobile. If the floating body of the WEC is falling at this time, the rope control mechanism will retract the rope at the release moment. However, if the floating body suddenly rises, at the moment of braking the electric brake, the hydraulic cylinder of the WEC will be pulled so that the piston leaves the endpoint and the reset ending probe 103 will not send the reset endpoint signal. At this time, the MCU stops sending the square wave pulse.

Algorithm 3: In the section X, the addition of the overrunning clutch 15 makes the rope control mechanism have one more function: in the braked state of the electric brake 16, the rope control mechanism has a function of only retracting the rope but not releasing the rope. The significance is that the electrical module can handle the working conditions of the floating body of the WEC during the falling process, without need for the reset stroke ending probe 103. In the early stage, since the WEC has an upward tension and this tension is greater than the tension of the rope retracting member, the rope control mechanism can neither release the rope nor retract the rope, and the WEC is reset first. After the hydraulic cylinder 2 of the WEC is reset to the endpoint, if the WEC continues to fall, the tension applied to the energy harvesting line by the WEC is greatly decreased. At this time, due to the acting force of the rope retracting member and the unidirectional transmission of the overrunning clutch, the rope control mechanism begins to retract the rope. Here, it is unnecessary to perform square wave pulse control on the electric brake 16 as described above. When the floating body of the WEC suddenly changes from falling to rising, the unidirectional transmission of the overrunning clutch 15 immediately plays a role in stopping the rope retraction action of the rope control mechanism, so that the WEC quickly enters the harvesting working state and the overrunning clutch 15 makes the timing of braking just at the time when the floating body falls to the lowest point. For the MCU, the executed algorithm is similar to the algorithm 1. When the working stroke ending probe of the hydraulic cylinder sends a signal to the MCU, the MCU turns on the rope control mechanism, and then locks the rope control mechanism after a period of time (the delay time is shorter, for example 1s).

Supplementary description of the specification of the accompanying drawings:

FIG. 2: The chain transmission 25 and the electric brake 16 are mounted in a compartment of the semi-closed housing 13, and the main shaft 41 is inserted into the compartment from a rotary seal ring 26 at a hole on the wall of the compartment and then coupled to the chain wheel of the chain transmission 25. The compartment is advantageous to better protect devices that are susceptible to water, humidity and salt, and the rotary seal ring 26 can prevent the salty moisture in the semi-open inner cavity from entering the compartment. The design of the compartment may also be applied to other rope control mechanisms in this specification (referring to other Figures).

FIG. 6: The upper portion of the energy harvesting line 30 is a rope 24 and the lower portion thereof is a welded chain 22. The total length of the welded chain exceeds the required length, so that there is an excessive segment of the welded chain. The gravity anchor 17 is connected to somewhere on the welded chain 22 through a quick link ring 119 (a racetrack-shaped ring that is typically used for lifting and hoisting and can be quickly assembled or disassembled). After the wave generator operates for a period of time (e.g., half a year), the segment of the rope 24 that frequently rubs with the friction wheel set (since the frequency of occurrence of small waves far exceeds that of big waves, most of the wear is caused by small waves with a magnitude of less than 1.5 meters; of course, due to the influence from tides, the main wear segment will change within a certain range, and the range is generally 2 to 3 meters) will be worn to a certain extent. In this case, the quick link 119 may be disassembled by a diver, and the connection point of the gravity anchor 17 and the welded chain 22 is moved down for a certain length (e.g., 2 meters). In this way, after the WEC operates, the rope 24, on the energy harvesting line side, will move up under the action of the counterweight 18, the rope 24, on the reset line side, will move down, and the segment of the rope 24 worn by the friction wheel set will also leave the friction wheel set and be no longer the main wear segment. Thus, the breakage of the rope 24 caused by wearing a certain segment of the rope 24 all the time is avoided. If this adjustment is carried out once in a period of time, it can be ensured that the energy harvesting line 24 can be used for a longer term. Similarly, the scheme in this section may also be applied to other energy harvesting lines mentioned in this specification. Additionally, the diver can also tie counterweight 18 onto a higher point of the rope 24 when adjusting the welded chain 22, so that the depth of the counterweight 18 in the water remains unchanged substantially.

FIG. 7A: The sectional view A-A shows the top view of the counterweight 18. The counterweight 18 is a homogeneous (uniform density) cement block/iron block, and the origin O of the XY coordinate axes is a geometrical center and a center of mass. Two vertical holes through which the energy harvesting line 30 passes are symmetrical about the Y-axis on the x-axis, and the mooring points of the reset line 50 are also symmetrical about the Y-axis on the X-axis. This design has the following advantages. Since the counterweight 18 moves in the water and the point of force application of the inertia force of the counterweight 18 is the point O, no torque will be generated by the mooring points and holes designed according to this figure. Additionally, since the counterweight 18 is also subjected to the impact force of the sea current, the cylindrical counterweight 18 can ensure that the point of force application of the impact force of the sea current in any direction and the point of force application of the resultant force thereof are located at the point O, avoiding the generation of torque.

FIG. 8: Double ropes 30 in FIG. 7 are replaced with a webbing 66, and the design of the V-shaped rope 55 is also used to ensure the equal tension across the width of the webbing.

FIG. 10: In order to suppress the swing of the gravity reset type WEC with double floating bodies, the rope 44 for mooring the floating body adopts a Y-shaped connection. One of two vertices of the Y is connected to the annular floating body 80, while the other one thereof is connected to the bottom end of the upright column 81. The Y-shaped connection is used in left and right sides of the double floating bodies (of course, it may also be used in the front-rear direction). When the double floating bodies rotate clockwise, the tension of the upper part of the Y-shaped rope on the left side is increased, and the tension of the lower part is decreased; and, the tension of the upper part of the Y-shaped rope on the right side is decreased, and the tension of the lower part is increased. The resultant force of the left and right sides generates a counterclockwise torque that prevents the double floating bodies from continuously rotating clockwise. Of course, the Y-shaped connection may also be applied to the floating bodies of other WECs, including the pressure difference reset WEC with a single floating body (referring to the floating bodies B and D in FIG. 14).

Additionally, the sectional view in this FIG. 10A is a top view of the counterweight 18. As shown, a guiding roller 82 is mounted on the side face of the counterweight 18 to avoid the friction between the counterweight 18 and the inner wall of the straight cylinder 63.

FIG. 11: The gravity anchor 17 in this figure is a suspended anchor. In order to prevent the cable 57 from pressing against the side face of the groove on the pulley 56 during its transverse motion (perpendicular to the paper), near two sides of the contacting pulley 56 of the cable 57, two double-roller chocks 20 (or fairleads) are mounted, respectively. During the transverse swing, the cable 57 will first apply a pressure to the double-roller chocks 20, so that the pulley 56 is defected by a certain angle along with the cable 57. Since the gravity anchor has large mass and large inertia, the pulley 56 is in flexible/universal connection 84 to the gravity anchor 17, which prevents the inertia of the gravity anchor 17 from obstructing the deflection of the pulley 56. This design may also be applied to other pulley suspended anchor schemes. The SSR is a solid state relay, with rapid response speed and long service life. The MCU indirectly controls the power supply to the electric brake by controlling the SSR. This design may also be applied to the electrical control modules of all rope control devices.

FIG. 14: The buoy E is flexibly connected to the pulley bracket of a pulley 56, and the cable 57 bypasses the pulley 56. Gravity anchors 17 (the gravity anchor on the right side is not shown) on two sides of the pulley 56 are suspended at two ends of the cable 57, respectively. In order to prevent the cable 57 from moving on the pulley 56, knots 91 are tied on the cable 57 near two sides of the pulley 56. This is a connection mode for the buoys and the cable 57 for suspension. As long as the two knots 91 are very close to the pulley 56, the effect is almost the same as that of the direction connection of the buoys and the cable 57. Therefore, the connection of the buoys and the cable mentioned in the Claims and this specification also includes this connection mode. The lower part of the buoy C is connected to the pulley bracket 62 through a second rope 49, and three mooring points on the outer edge of the pulley bracket 62 serve as three eye plates to be respectively connected to ropes in three directions.

Figure 16:
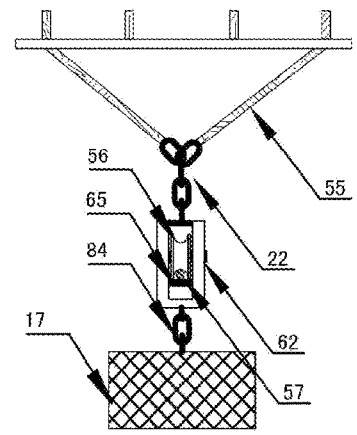
FIG. 16: a structural diagram of a combination of a V-shaped rope and a suspended anchor.

FIG. 16: How the V-shaped rope is connected to the pulley suspended anchor is shown. The bottom end of the V-shaped rope 55 is connected to the top end of the pulley bracket 62 through the welded chain 22, and the bottom end of the pulley bracket 62 is connected to the suspended anchor 17 through a flexible/universal connection 84, i.e., a welded chain. In order to prevent the cable 57 from disengaging from the pulley 56 to rub with the pulley bracket 62, the outer edge of the groove of the pulley 56 is externally tangent to a roller 65, and a shaft of the roller 65 is mounted on the pulley bracket 62 through the bearing & housing. The cable 57 is clamped into the groove of the pulley 56 by the roller 65.

FIGS. 22 and 27: The connection of the WEC and the top end of the rack 94/brake bar 98 of the rope control mechanism is a flexible/universal connection 84. Since the floating body of the WEC will do various inclination motions, the rack/brake bar is certainly broken if the connection employs consolidation. FIG. 22: The rack 94 is similar in shape to a channel steel, except that there are transverse teeth on the middle face on the outer side of the channel steel (the electric cable 12 looks like a spring and is embedded in the groove in the rear of the rack 94). When the distance between the floating body of the WEC and the frame 13 of the rope control mechanism is increased or decreased, the spring electric cable 12 is longitudinally extended and contracted in the groove. One end of the electric cable is connected with the electrical control module of the WEC, while the other end thereof is connected to the electric brake 16 in the rope control mechanism.

With reference to FIG. 24, the rope 24 below the fairlead can freely swing before being guided, but the rope that extends to the top after entering the fairlead has been constrained in direction. When the rope 24 swings in parallel to the axis of the bottom roller, the rope 24 will generate sliding friction with the bottom roller, so that the rope 24 is worn. To avoid this problem, circular tubes 116 (e.g., rubber tubes) made of a wear-resistant, waterproof and oil-proof soft material are sheathed on two bottom rollers of the four-roller fairlead (in this figure, soft elastic tubes are also sheathed on two top rollers 65, but it is actually unnecessary; here, the main purpose is to more clearly show the structure of the soft elastic tubes). The clearances between the inner walls of the circular tubes 116 and the cylindrical surfaces of the rollers 65 are very small and filled with lubricating oil 118. Two ports of the wear-resistant soft tubes 116 are consolidated and sealed with two ends of the cylindrical surfaces of the rollers 65. Due to the lubricating oil 118, the coefficient for sliding friction between the wear-resistant soft tubes 116 and the rollers 65 is very small, so portions of the wear-resistant soft tubes 116 in contact with the rope 24 will slide left along with the rope 24 due to the friction when the lower segment of the rope 24 swings left. In this figure, the left portions of the wear-resistant soft tubes 116 are wrinkled, and there is always static friction between the wear-resistant soft tubes 116 and the rope 24, so the wear of the rope 24 is avoided.

The wear-resistant soft tubes 116 may also be replaced with barrel-shaped sleeves woven by ultra-high molecular weight polyethylene fiber (no lubricating oil is required). The barrel-shaped sleeves are externally coated with rubber, and two ports of the barrel-shaped sleeves are butt-jointed with two ends of the cylindrical surfaces of the rollers 65. The rollers are made of poly tetra fluoroethylene. The self-lubrication of the UHMWPE sleeves and the poly tetra fluoroethylene rollers enables the sleeves to swing left and right along with the rope 24, and there is always static friction between the rope 24 and the UHMWPE sleeves.

FIG. 25: The friction wheel set type rope control mechanism is mounted on the suspended anchor 17. One end of the rope 24 is connected to the WEC above the rope, while the other thereof passes through the fairlead 11 on the top surface of the gravity anchor 17, then bypasses the friction wheel set in a zigzagged manner, passes through the double-roller chock 20 on the bottom surface of the gravity anchor and continuously extends downward to be tied onto the counterweight 18. The power transmission mechanism from the friction wheel set to the electric brake 16 is the same as that in FIG. 6, but the electric brake 16 is located in a waterproof closed housing. The shaft 41 of the friction wheel set passes through the seal ring 26 at the hole on the wall of the closed housing and then enters the closed cavity. The principle is as follows: since the energy harvesting line is located above the gravity anchor 17 and the reset line is located below the gravity anchor 17, the entanglement problem does not exist. FIG. 27: A damping disc 97 is suspended in the water by four floats 60. The damping disc 97 has a hole in its center, and can also be used as a mounting base for the rack/brake bar type rope control mechanism. The frame 13 of the rack/brake bar type rope control mechanism is mounted at the hole on the damping disc 97 through an X-shaped welded chain (or an annular cross universal joint).

The following contents are preferred suggestions. All the floating bodies and the housing of the rope control mechanism herein may be made of steel or glass fiber reinforced plastics, and the floats can be made of high-density plastic foam materials. The ropes used as energy harvesting lines mentioned herein may be sheathed with sleeves made of wear-resistant soft materials (e.g., rubber) to reduce wear. The energy harvesting lines and the suspended cables on two sides of the suspended anchor may be ropes with high strength and high modulus, for example, UHMWPE ropes. Other ropes & cables may be PP, polyethylene and nylon ropes. All the bearings (including bearings in the fairleads/double-roller chocks and the guiding rollers) mentioned herein may be copper-based graphite self-lubricating bearings/ceramic bearings. The anti-corrosion means are as follows: the housing is made of glass fiber reinforced plastics/urea-coated steel or is externally painted; and, the gravity anchor, the counterweight and the weight may be cement blocks/iron blocks.

Since the floating body swings on the sea surface, in order to prevent the hydraulic oil from spilling out, the open oil tank mentioned herein may be a rubber bag (the increase or decrease of the hydraulic oil in the oil tank is adapted by using the elasticity of the rubber bag). The oil drain tube and the hydraulic tube for sucking oil are inserted into the rubber bag, and the joint seam of the hydraulic tube with the bag should be sealed. In view of poor heat dissipation of the rubber material, the open oil tank may also be a structure of a closed steel tank body (the steel has good heat dissipation)+a rubber bag. Specifically, the joint seams at the insertion of the oil inlet tube and the oil outlet tube of the steel tank body should be sealed, and a thin tube is introduced from the steel tank body (the joint seam of the thin tube with the oil tank should also be sealed). The thin tube is connected to a closed rubber bag, and communicated with the cavity of the bag to form a chamber that is sealed from the outside.

To ensure the stable voltage output of the generator, the rotation speed of the generator needs to be stabilized, but the flow output from the hydraulic cylinder in the case of big waves and small waves is different. The hydraulic motor mentioned herein may be an electro-hydraulic variable motor. The MCU controls the displacement of the variable motor according to the voltage output by the generator, so as to realize the general stability of the rotation speed of the motor and the generator at different flows. The hydraulic motor may also be a constant-displacement hydraulic motor, and an electric speed changer is provided between the hydraulic motor and the generator. The MCU controls the transmission ratio of the electric speed changer according to the voltage of the generator. Although the hydraulic motor is influenced by the wave condition, the rotation speed of the generator can still be kept stable by changing the transmission ratio.

The invention claimed is:

1. A rope control mechanism, comprises: a frame, a linear-rotary motion conversion mechanism connected to the gravity anchor, and an electric brake; a rotating member of the linear-rotary motion conversion mechanism is coupled to a rotor of the electric brake by a main shaft, or linked with the rotor of the electric brake through a chain/gear/belt transmission mechanism; a stator of the electric brake is fixed on the frame, and the main shaft of the rotating member of the linear-rotary motion conversion mechanism is installed on the frame through a bearing and housing;

the linear-rotary motion conversion mechanism is a round link sprocket and welded chain type, or a friction wheel and rope type;

when the linear-rotary motion conversion mechanism is the round link sprocket and welded chain type, one end of the welded chain is connected to the gravity anchor, and the other end extends upward to passed through a fairlead/double-roller chock installed at the bottom end of the frame of the rope control mechanism, then passes around a round link sprocket, and extends downward to pass through another fairlead/double-roller chock installed at the bottom end of the frame, and continues to extend downward to be finally connected to a counterweight;

when the linear-rotary motion conversion mechanism is the friction wheel and rope type, one end of the rope is connected to the gravity anchor, and the other end extends upward to pass through a fairlead/double-roller chock installed at the bottom end of the frame, then passes around a friction wheel, and extends downward to pass through another fairlead/double-roller chock installed at the bottom end of the frame, and continues to extend downward to be finally connected to a counterweight;

the rope/welded chain between the rotating member of the linear-rotary motion conversion mechanism and the gravity anchor is defined as an energy harvesting line; the rope/welded chain between the rotating member of the linear-rotary motion conversion mechanism and the counterweight is defined as a reset line, wherein an overrunning clutch/torque limiter is inserted into a power transmission path from the rotating member of the linear-rotary motion conversion mechanism to the electric brake, specifically, the rotating member of the linear-rotary motion conversion mechanism and one end of the overrunning clutch/torque limiter are couples by a shaft or linked with each other through a chain/gear/belt transmission mechanism, and the other end of the overrunning clutch/torque limiter and the rotor of the electric break are couples by a shaft; the stator of the electric brake if fixed on the frame; if the overrunning clutch is introduced, the rotatable direction of the rotating member of the linear-rotary motion conversion mechanism is the same as the direction of the torque generated by the pulling force of the reset line, when the electric brake is in the braking mode.

2. The rope control mechanism according to claim 1, further comprising an anti-entanglement mechanism which comprises a buoy provided at a certain distance around a floating body of a wave generator, and the floating body and the buoy are anchored at a certain position by a mooring system; one end of a cord is tied to the counterweight, and the other end extends below the buoy to pass around a pulley, then extends downward to be finally connected to a weight; a pulley bracket of the pulley is connected to the bottom surface of the buoy through a second rope.

3. The rope control mechanism according to claim 2, wherein the cord for laterally pulling the counterweight is connected to the counterweight through a rigid straight rod, rather than being directly connected to the counterweight, namely, one end of the rigid straight rod is connected with the end of the cord, and the other end of the rigid straight rod is in a flexible/universal connection with the counterweight.

4. The rope control mechanism according to claim 1, wherein a rope control mechanism of the friction wheel and rope type comprises one rope and two friction wheels; each of the friction wheels is coupled to a gear through a shaft; the friction wheel, the gear, the shaft and its bearing and housing form a friction wheel gear unit; the shaft is mounted on the frame of the rope control mechanism through the bearing and housing; two identical friction wheel gear units have parallel axes, same directions and aligned end faces and are sequentially and adjacently mounted on the frame, and the gears of the two friction wheel gear units are meshed with each other; however, the diameter of the rim of the friction wheel is not greater than the diameter of a reference circle of the gear in each of the friction wheel gear units, the friction wheels do not interfere with each other; the gear of one of the friction wheel gear units is coupled to the rotor of the electric bake, and the rope successively passes by the friction wheels in each friction wheel gear unit in a zigzagged manner, namely a direction of the rope passing around the first friction wheel and a direction of the rope passing around the second friction wheel are opposite; alternatively, the gears of the two friction wheel gear units are different in diameter and the two friction wheels are different in diameter, but the ratio of the diameter of the friction wheel to the diameter of the gear in each friction wheel gear unit is the same.

5. The rope control mechanism according to claim 4, wherein more than two friction wheel gear units are mounted according to the said rules of parallel to form a friction wheel gear set, the same direction and aligned end faces, and the gears of the friction wheel gear units are meshed in series; the rope passes by the friction wheels of each friction wheel gear unit in the meshing order in a zigzagged manner, and the shaft of only one friction wheel gear unit in the whole friction wheel gear set is coupled to the rotor of the electric brake; the said friction wheel gear unit coupled to the rotor is the first friction wheel gear unit on the side where the reset line is located.

6. The rope control mechanism according to claim 5, wherein meshing transmissions of the all gears have a clearance.

7. The rope control mechanism according to claim 1, wherein if the rope control mechanism is already provided with the said overrunning clutch, a second electric brake is installed, and the stator of the second electric brake is installed on the frame of the rope control mechanism; the rotor of the second electric brake and the rotating member of the linear-rotary motion conversion mechanism are coupled by a shaft, or linked through a chain/gear/belt transmission mechanism.

8. The rope control mechanism according to claim 1, wherein the frame of the rope control mechanism is a semi-enclosed housing with an opening only at its bottom, and the rotating member of the linear-rotary motion conversion mechanism, the main shaft and its bearing and housing, and the electric brake are all installed inside the inner cavity of the frame.

9. The rope control mechanism according to claim 8, further comprising an air supply system which includes a gas tube, a waterlogging sensor, a Microcontroller Unit module, an electric air pump and an auxiliary power supply; the electric air pump is installed in the air environment of the floating body on the sea surface; one end of the gas tube is connected to the air outlet of the air pump, and the other end extends into the cavity of the rope control mechanism; the waterlogging sensor is installed on the frame below the shaft of the linear-rotary motion conversion mechanism inside the cavity of the rope control mechanism, and the waterlogging sensor sends information to the MCU module through a signal line; the MCU module performs switching control of the power supply of the electric air pump; if the gas returns after the air pump is stopped, the air outlet of the air pump is connected to the air tube through a permitting-out check valve.

10. The rope control mechanism according to claim 1, wherein a lower segment of the energy harvesting line is a chain, and a point on the chain is connected to the gravity anchor by a quick link.

11. The rope control mechanism according to claim 1, wherein the rope control mechanism is connected to a Wave Energy Collection and Conversion System (WEC) through a square tube; the bottom end of the square tube is connected to a top surface of the rope control mechanism.

12. The rope control mechanism according to claim 11, wherein a electric cable connecting the rope control mechanism enters the square tube from a top inlet of the square tube, and comes out from a bottom outlet of the square tube.

13. The rope control mechanism according to claim 1, wherein the fairlead is a four-roller fairlead, and the first pair of the rollers that the rope is contacted with when just enters in the fairlead are sleeved with circular tubes; the circular tubes are made of a soft and wear-resistant material, and both ends of the soft wear-resistant tubes are in fixed and sealed connection with the two ends of cylindrical surfaces of the rollers, respectively; the gaps between the inner wall of the soft wear-resistant circular tube and the cylindrical surfaces of the rollers are small and filled with lubricating oil.

14. A rope control mechanism, comprises: a rope, a frame, an electric brake, and two friction wheel gear units, each of the friction wheel gear unit is formed by a gear, a friction wheel coupled to the gear through a shaft, the shaft mounted on the frame through the bearing and housing;
   wherein (a) the two friction wheel gear units are identical and sequentially and adjacently installed on the frame, axes of the two friction wheel gear units are parallel and in the same direction, and end faces of the two friction wheel gear units are aligned; the gears of the two friction wheel gear units are meshed with each other, and outer diameters of the friction wheels are smaller than a diameter of a reference circle of the gears, so that the friction wheels do not contact with each other; the rope passes around the friction wheel of each of the friction wheel gear units successively in a zigzagged manner, namely a direction of the rope passing around the first friction wheel and direction of the rope passing around the second friction wheel are opposite during an extension of the rope;
   alternatively, (b) the diameters of the gears of the two friction wheel gear units are different, and the diameters of the friction wheels of the two friction wheel gear units are different, while the ratio of the diameter of the friction wheel to the diameter of the reference circle of the gear in each friction wheel gear unit is the same, wherein the two friction wheel gear units are sequentially and adjacently installed on the frame, axes of the two friction wheel gear units are parallel and in the same direction, and end faces of the two friction wheel gear units are aligned, the gears of the two friction wheel gear units are meshed with each other, and an outer diameter of the friction wheel is smaller than a diameter of the reference circle of the gear in each friction wheel gear unit, so that the friction wheels do not contact with each other, the rope passes around the friction wheel of each of the friction wheel gear units successively in zigzagged manner, namely a direction of the rope passing around the first friction wheel and a direction of the rope passing around the second friction wheel are opposite during an extension of the rope,
   the gear of the friction wheel gear units is couples to a rotor of the electric break through a shaft, and a stator of the electric brake is fixed on the frame, if one end of the rope is subjected to a large pulling force, then a small pulling force is applied to the other end of the rope to resist.

15. The rope control mechanism according to claim 14, wherein the rotor of the electric brake is coupled to only the shaft of the friction wheel gear unit that farthest from the side where the pulling force is large.

16. A rope control mechanism, comprises: a frame, a linear-rotary motion conversion mechanism, and an electric brake; a stator of the electric brake is fixed on the frame; the linear-rotary motion conversion mechanism is a friction wheel and rope type; one end of the rope is connected to a gravity anchor, and the other end extends upward to pass through a fairlead/double-roller chock installed at the bottom end of the frame of the rope control mechanism, then passes around two friction wheels successively, and extends downward to pass through another fairlead/double-roller chock installed at the bottom end of the frame, and continues to extend downward to be finally connected to a counterweight;
   the rope between the rotating member of the linear- rotary motion conversion mechanism and the gravity anchor is defined as an energy harvesting line; the rope between the rotating member of the linear-rotary motion conversion mechanism and the counterweight is defined as a reset line;
   each of the friction wheels is coupled to a gear through a shaft; the friction wheel, the gear, the shaft and its bearing and housing form a friction wheel gear unit; the shaft is mounted on the frame of the rope control mechanism through the bearing and housing;
   wherein (a) two identical friction wheel gear units have parallel axes, same directions and aligned end faces and are sequentially and adjacently mounted on the frame, and the gears of the two friction wheel gear units are meshed with each other; however, a diameter of the rim of the friction wheel is than a diameter of a reference circle of the gear in each of the friction wheel gear units, the friction wheels do not interfere with each other; the gear of only one of the friction wheel gear units is coupled to a rotor of the electric bake, and the rope successively passes the friction wheels in each of the friction wheel gear units in a zigzagged manner, namely, a direction of the rope passing around the first friction wheel and a direction of the rope passing around the second friction wheel are opposite during an extension of the rope;
   alternatively, (b) the gears of the two friction wheel gear units are different in diameter and the two friction wheels are different in diameter, but the ratio of the diameter of the friction wheel to the diameter of the gear in each friction wheel gear unit is the same, wherein the two friction wheel gear units have parallel axes, same directions and aligned end faces and are sequentially and adjacently mounted on the frame, and the gears of the two friction wheel gear units are meshed with each other, a diameter of the rim of the friction wheel is not greater than a diameter of a reference circle of the gear in each friction wheel gear unit, the friction wheels do not interfere with each other, the gear of only one of the friction wheel gear units is couples to a rotor of the electric brake, and the rope successively passes the friction wheels in each of the friction wheel ear units in a zigzagged manner, namely, a direction of the rope passing around the first friction wheel and a direction of the rope passing around the second friction wheel are opposite during an extension of the rope.

17. The rope control mechanism according to claim 16, wherein more than two friction wheel gear units are mounted on the frame in parallel, at the same direction and having aligned end faces, and the gears of the friction wheel gear units are meshed in series; the rope passes the friction wheels of each friction wheel gear units in order of meshing and in a zigzagged manner, and the shaft of only one of the friction wheel gear units is coupled to the rotor of the electric brake; the said friction wheel gear unit coupled to the rotor is the first friction wheel gear unit on the side where the reset line is located.

18. The rope control mechanism according to claim 17, wherein five friction wheel gear units are mounted in parallel at the same direction and having aligned end faces, and the gears of the friction wheel gear units are meshed in series; meshing transmissions of the all gears have a clearance; the friction wheel gear units are arranged sequentially starting from a side of the energy harvesting line defining a first, second, third, fourth and fifth friction wheel gear units respectively, the rope successively passes the friction wheels of each of the friction wheel gear units in order starting from the first to the fifth friction wheel gear units in a zigzagged manner; and only the shaft of the fifth friction wheel gear unit is coupled to the rotor of the electric brake; the friction wheel of the first friction wheel gear unit is greater than the friction wheel of the second friction wheel gear unit; a ratio of a diameter of the friction wheel to a diameter of the gear in each of the friction wheel gear unit is the same; an upper portion of the energy harvesting line is the rope and a bottom end of the rope is connected to the gravity anchor through a welded chain; the gravity anchor is connected to the welded chain through a quick link ring.

19. The rope control mechanism according to claim 18, wherein an overrunning clutch/torque limiter is inserted into a power transmission path from the rotating member of the linear-rotary motion conversion mechanism to the electric brake; specifically, the friction wheel of the fifth friction wheel gear unit and one end of the overrunning clutch/torque limiter are coupled by a shaft or linked with each other through a chain/gear/belt transmission mechanism, and the other end of the overrunning clutch/torque limiter and the rotor of the electric brake are coupled by a shaft; the stator of the electric brake is fixed on the frame; if the overrunning clutch is introduced, the rotatable direction of the rotating member of the linear-rotary motion conversion mechanism should be the same as the direction of the torque generated by the pulling force of the reset line, when the electric brake is in the braking mode.

20. A rope control mechanism, comprises: a frame, a linear-rotary motion conversion mechanism connected to a gravity anchor, and an electric brake; a rotating member of the linear-rotary motion conversion mechanism is coupled to a rotor of the electric brake by a main shaft, or linked with the rotor of the electric brake through a chain/gear/belt transmission mechanism; a stator of the electric brake is fixed on the frame, a top of the frame is connected to a Wave Energy Collection and Conversion System (WEC), and the main shaft of the rotating member of the linear-rotary motion conversion mechanism is installed on the frame through a bearing and housing;

wherein the WEC comprises a hydraulic cylinder having one end connecting to a floating body and another end connecting to the frame, the WEC collects wave energy through a relative movement between the frame and the floating body and then converts the wave energy collected through the relative movement to electricity, the linear-rotary motion conversion mechanism is a round link sprocket and welded chain type, or a friction wheel and rope type;

when the linear-rotary motion conversion mechanism is the round link sprocket and welded chain type, one end of the welded chain is connected to the gravity anchor, and the other end extends upward to passed through a fairlead/double-roller chock installed at the bottom end of the frame of the rope control mechanism, then passes around a round link sprocket, and extends downward to pass through another fairlead/double-roller chock installed at the bottom end of the frame, and continues to extend downward to be finally connected to a counterweight;

when the linear-rotary motion conversion mechanism is the friction wheel and rope type, one end of the rope is connected to the gravity anchor, and the other end extends upward to pass through a fairlead/double-roller chock installed at the bottom end of the frame, then passes around a friction wheel, and extends downward to pass through another fairlead/double-roller chock installed at the bottom end of the frame, and continues to extend downward to be finally connected to a counterweight;

the rope/welded chain between the rotating member of the linear-rotary motion conversion mechanism and the gravity anchor is defined as an energy harvesting line; the rope/welded chain between the rotating member of the linear-rotary motion conversion mechanism and the counterweight is defined as a reset line.

* * * * *